(12) United States Patent
Wada

(10) Patent No.: US 12,461,541 B2
(45) Date of Patent: Nov. 4, 2025

(54) CONTROL DEVICE, FLYING OBJECT SYSTEM, CONTROL METHOD, AND PROGRAM

(71) Applicant: FUJIFILM CORPORATION, Tokyo (JP)

(72) Inventor: Tetsu Wada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 55 days.

(21) Appl. No.: 18/523,880

(22) Filed: Nov. 30, 2023

(65) Prior Publication Data

US 2024/0103538 A1    Mar. 28, 2024

Related U.S. Application Data

(63) Continuation of application No. PCT/JP2022/019850, filed on May 10, 2022.

(30) Foreign Application Priority Data

Jun. 9, 2021   (JP) .................. 2021-096907

(51) Int. Cl.
| | |
|---|---|
| *G05D 1/00* | (2024.01) |
| *H04N 23/61* | (2023.01) |
| *H04N 23/90* | (2023.01) |
| *B64U 101/26* | (2023.01) |
| *B64U 101/30* | (2023.01) |

(52) U.S. Cl.
CPC .............. *G05D 1/106* (2019.05); *H04N 23/61* (2023.01); *H04N 23/90* (2023.01); *B64U 2101/26* (2023.01); *B64U 2101/30* (2023.01); *B64U 2201/20* (2023.01)

(58) Field of Classification Search
None
See application file for complete search history.

(56) References Cited

U.S. PATENT DOCUMENTS

2017/0248969 A1    8/2017   Ham et al.
2020/0012297 A1*   1/2020   Ishikawa ................ B64C 13/18

FOREIGN PATENT DOCUMENTS

| JP | 2004-101616 A | 4/2004 |
|---|---|---|
| JP | 2016-101774 A | 6/2016 |
| JP | 2017-024616 A | 2/2017 |

(Continued)

OTHER PUBLICATIONS

International Search Report issued in International Application No. PCT/JP2022/019850 on Aug. 9, 2022.

(Continued)

*Primary Examiner* — Heather R Jones
(74) *Attorney, Agent, or Firm* — SOLARIS Intellectual Property Group, PLLC

(57) ABSTRACT

There is provided a control device including a processor and a memory connected to or built into the processor. The processor acquires, for a marker of which a position in a vertical direction is variable with a displacement mechanism, the position of the marker in the vertical direction detected by an optical sensor mounted on a flying object and performs control of maintaining or changing a position of the flying object in the vertical direction, with respect to the flying object, based on the position of the marker in the vertical direction.

37 Claims, 44 Drawing Sheets

(56) References Cited

FOREIGN PATENT DOCUMENTS

| | | | |
|---|---|---|---|
| JP | 2017-224123 A | 12/2017 | |
| JP | 2018-095105 A | 6/2018 | |
| JP | 2019-055780 A | 4/2019 | |
| JP | 2019-144052 A | 8/2019 | |
| JP | 2019-156242 A | 9/2019 | |
| JP | 2020-032804 A | 3/2020 | |
| WO | WO-2020204201 A1 * | 10/2020 | ............. B64D 47/08 |

OTHER PUBLICATIONS

Written Opinion of the ISA issued in International Application No. PCT/JP2022/019850 on Aug. 9, 2022.
International Preliminary Report on Patentability issued in International Application No. PCT/JP2022/019850 on Dec. 6, 2022.

* cited by examiner

CONTROL DEVICE, FLYING OBJECT SYSTEM, CONTROL METHOD, AND PROGRAM

CROSS-REFERENCE TO RELATED APPLICATIONS

This application is a continuation application of International Application No. PCT/JP2022/019850, filed May 10, 2022, the disclosure of which is incorporated herein by reference in its entirety. Further, this application claims priority under 35 USC 119 from Japanese Patent Application No. 2021-096907, filed Jun. 9, 2021, the disclosure of which is incorporated herein by reference in its entirety.

BACKGROUND OF THE INVENTION

1. Field of the Invention

The present disclosed technology relates to a control device, a flying object system, a control method, and a program.

2. Description of the Related Art

JP2020-032804A discloses an unmanned flying transport device including a flying object that has a plurality of rotor blades and that can fly, and a fork that is provided to fly together with the flying object and that is provided with a workpiece.

JP2017-024616A discloses a flying object that flies using propulsive force generated by a propulsion device, the flying object includes: a posture detection unit that detects a posture of the flying object; a light receiving unit that receives light; and a flight control unit that controls a position and/or speed of the flying object by controlling the propulsive force of the propulsion device based on a posture angle obtained from the posture detection unit and a light intensity obtained from the light receiving unit so that the flying object maintains a constant position with respect to a light emitting body that emits light.

JP2019-055780A discloses a control system for a flying object that is used for controlling the flying object, the control system includes: a marking portion that is disposed on a flight route of the flying object and that displays control information for controlling the flying object as an image or a character, or a combination thereof; a flight control unit that controls the flying object based on the control information; an imaging unit that captures the image or the character or, the combination thereof displayed on the marking portion, and a correction unit that corrects the control information based on a positional relationship between the flying object and the marking portion, in a case where the imaging unit captures the image or the character, or the combination thereof.

JP2019-156242A discloses a flying object system that flies using driving force of a motor, the flying object system includes: an aerial part that is installed on the ground and that includes a power source apparatus; a cable of which a first end part is connected to the aerial part; a flying object that is connected to a second end part of the cable; a reel device that is installed on the ground and that winds a surplus portion of the cable; and a controller that steers the flying object, in which the flying object includes a DC motor that drives a main rotor blade, a flying object altitude measurement unit that measures an altitude of the flying object, and a flying object position grasping unit that grasps a position of the flying object, the reel device includes a cylinder-shaped drum on which the cable is wound, a motor that drives and rotates the drum, a rotation sensor that is capable of measuring a rotation direction and rotation speed of the drum, a current detection unit that detects a current flowing through a coil of the motor, a motor controller that controls torque generated by the motor based on a current value detected by the current detection unit, a reel device altitude measurement unit that measures an altitude of the reel device, and a reel device position grasping unit that grasps a position of the reel device, and the motor controller basically generates torque in a direction in which the drum winds up the cable to control the motor by matching the current value detected by the current detection unit with a standard set value set in advance and then in a case where it is determined that the flying object is moved away from the reel device at a predetermined speed or higher, the motor controller corrects and controls a set value of the detected current value to be smaller than the standard set value based on information obtained from the flying object altitude measurement unit, the flying object position grasping unit, the reel device altitude measurement unit, and the reel device position grasping unit, and operation information of the controller in a case where an operator operates the controller.

JP2018-095105A discloses a safety device for a flying object including: a master rope that is stretched along an inspection target object; and a connection rope of which one end portion is joined to the flying object provided with an inspection part for inspecting the inspection target object and the other end portion is engaged with the master rope to be movable in the longitudinal direction of the master rope.

JP2019-144052A discloses an inspection device for an examination target that evaluates the examination target based on an inspection result of a state of the examination target, the inspection device includes: a detection unit that detects the state of the examination target and generates inspection information representing the state of the examination target; an index part that is provided in the detection unit and that indicates a state inspection location of the examination target; a flying object that is moved along the examination target; a power source unit that is connected to the flying object via a wired cable and that is capable of continuously supplying power to the flying object; an imaging unit that is mounted on the flying object and that images a range including a plurality of reference points, which are set at least two locations apart from each other on a surface of the examination target, and the index part to generate image information; a flight control unit that causes the flying object to fly in a position, where the range including the plurality of reference points and the index part can be imaged by the imaging unit, with respect to the examination target; an inspection position information generation unit that generates, as inspection position information of the examination target, relative positions of the index part with respect to positions of the plurality of reference points, based on the image information imaged by the imaging unit; and an examination target evaluation information generation unit that generates evaluation information in which the inspection information in the detection unit and the inspection position information are associated and the state of the examination target is evaluated.

SUMMARY OF THE INVENTION

One embodiment according to the present disclosed technology provides a control device, a flying object system, a control method, and a program capable of positioning a flying object in a vertical direction without using a satellite positioning system, for example.

A control device of a first aspect according to the present disclosed technology comprises: a processor; and a memory connected to or built into the processor, in which the processor is configured to: acquire, for a marker of which a position in a vertical direction is variable with a displacement mechanism, the position of the marker in the vertical direction detected by an optical sensor mounted on a flying object; and perform control of maintaining or changing a position of the flying object in the vertical direction, with respect to the flying object, based on the position of the marker in the vertical direction.

A second aspect according to the present disclosed technology is the control device according to the first aspect, in which the optical sensor includes a first imaging device.

A third aspect according to the present disclosed technology is the control device according to the second aspect, in which the processor is configured to perform control of causing the first imaging device to capture an imaging scene that includes the marker in a part thereof.

A fourth aspect according to the present disclosed technology is the control device according to the third aspect, in which the imaging scene includes a first inspection target positioned in a vicinity of the marker.

A fifth aspect according to the present disclosed technology is the control device according to the third or fourth aspect, in which the position of the marker in the vertical direction is a position detected based on an image obtained by capturing the imaging scene with the first imaging device.

A sixth aspect according to the present disclosed technology is the control device according to the fifth aspect, in which the processor is configured to perform control of setting the position of the flying object in the vertical direction at a height at which the marker is disposed at a center part of the image in a longitudinal direction on the image, with respect to the flying object.

A seventh aspect according to the present disclosed technology is the control device according to any one of the first to sixth aspects, in which the processor is configured to perform control of setting the position of the flying object in the vertical direction to the same position as the position of the marker in the vertical direction, with respect to the flying object.

An eighth aspect according to the present disclosed technology is the control device according to the first or second aspect, in which the optical sensor includes a LiDAR scanner, and the position of the marker in the vertical direction is a position detected based on scan data obtained by scanning a target region that includes the marker in a part thereof with the LiDAR scanner.

A ninth aspect according to the present disclosed technology is the control device according to any one of the first to eighth aspects, in which the marker includes a light emitting body.

A tenth aspect according to the present disclosed technology is the control device according to the ninth aspect, in which the processor is configured to perform first control in accordance with a first light emission mode of the light emitting body, with respect to the flying object.

An eleventh aspect according to the present disclosed technology is the control device according to the tenth aspect, in which the first control includes the control of maintaining or changing the position of the flying object in the vertical direction.

A twelfth aspect according to the present disclosed technology is the control device according to the tenth or eleventh aspect, in which the first control includes control of maintaining or changing a movement speed of the flying object.

A thirteenth aspect according to the present disclosed technology is the control device according to any one of the tenth to twelfth aspects, in which the first control includes movement control of moving the flying object in a horizontal direction.

A fourteenth aspect according to the present disclosed technology is the control device according to the thirteenth aspect, in which the movement control includes control of adjusting a first distance between the marker and the flying object by moving the flying object in the horizontal direction.

A fifteenth aspect according to the present disclosed technology is the control device according to any one of the tenth to fourteenth aspects, in which the first light emission mode is a mode including blinking.

A sixteenth aspect according to the present disclosed technology is the control device according to any one of the ninth to fifteenth aspects, in which the processor is configured to perform control of causing the flying object to hover according to a second light emission mode of the light emitting body.

A seventeenth aspect according to the present disclosed technology is the control device according to the sixteenth aspect, in which the second light emission mode is a mode including lighting-out.

An eighteenth aspect according to the present disclosed technology is the control device according to any one of the ninth to seventeenth aspects, in which the processor is configured to perform imaging control of causing a second imaging device, which is mounted on the flying object, to perform imaging for a still image according to a third light emission mode of the light emitting body.

A nineteenth aspect according to the present disclosed technology is the control device according to the eighteenth aspect, in which the processor is configured to perform the imaging control in a case where the flying object hovers.

A twentieth aspect according to the present disclosed technology is the control device according to the eighteenth or nineteenth aspect, in which the light emitting body includes a plurality of light sources, and the third light emission mode is a mode that includes alternate blinking of the plurality of light sources.

A twenty-first aspect according to the present disclosed technology is the control device according to any one of the ninth to twentieth aspects, in which the processor is configured to repeatedly perform control of moving the flying object in a horizontal direction in a state in which the position of the flying object in the vertical direction is maintained and control of causing a third imaging device, which is mounted on the flying object, to image a second inspection target, according to a fourth light emission mode of the light emitting body.

A flying object system of a twenty-second aspect according to the present disclosed technology comprises: the control device according to any one of claims 1 to 21; the displacement mechanism; the marker; and the flying object.

A twenty-third aspect according to the present disclosed technology is the flying object system according to the twenty-second aspect, in which the displacement mechanism includes a cable that is provided with the marker, and a reel for performing winding and unwinding with respect to the cable.

A twenty-fourth aspect according to the present disclosed technology is the flying object system according to the twenty-third aspect, in which the displacement mechanism includes a sensor that detects an unwinding amount of the cable with respect to the reel.

A twenty-fifth aspect according to the present disclosed technology is the flying object system according to the twenty-second aspect, in which the displacement mechanism includes an ascending/descending mechanism that makes the marker ascend or descend.

A twenty-sixth aspect according to the present disclosed technology is the flying object system according to any one of the twenty-second to twenty-fifth aspects, in which a rope that connects the displacement mechanism and the flying object is provided.

A twenty-seventh aspect according to the present disclosed technology is the flying object system according to the twenty-sixth aspect, in which the displacement mechanism and the rope include a power transmission cable that transmits power to the flying object.

A twenty-eighth aspect according to the present disclosed technology is the flying object system according to any one of the twenty-second to twenty-seventh aspects, in which a fourth imaging device that is provided in the displacement mechanism and that images the flying object, is provided.

A twenty-ninth aspect according to the present disclosed technology is the flying object system according to the twenty-eighth aspect, in which the processor is configured to perform control with respect to the flying object based on an image obtained by imaging the flying object with the fourth imaging device.

A thirtieth aspect according to the present disclosed technology is the flying object system according to the twenty-ninth aspect, in which the processor is configured to perform control of moving the flying object to a center part of an angle of view of the fourth imaging device, with respect to the flying object.

A thirty-first aspect according to the present disclosed technology is the flying object system according to any one of the twenty-eighth to thirtieth aspects, in which the fourth imaging device is disposed at a position adjacent to the marker.

A thirty-second aspect according to the present disclosed technology is the flying object system according to any one of the twenty-second to thirty-first aspects, in which a distance measurement device that is provided in the displacement mechanism is included, and the distance measurement device measures a second distance between the distance measurement device and the flying object.

A thirty-third aspect according to the present disclosed technology is the flying object system according to the thirty-second aspect, in which the processor is configured to perform second control with respect to the flying object based on distance measurement information obtained by measuring the second distance with the distance measurement device.

A thirty-fourth aspect according to the present disclosed technology is the flying object system according to the thirty-third aspect, in which the second control is control of setting the second distance to a default distance.

A thirty-fifth aspect according to the present disclosed technology is the flying object system according to any one of the thirty-second to thirty-fourth aspects, in which the distance measurement device is disposed at a position adjacent to the marker.

A control method of a thirty-sixth aspect according to the present disclosed technology comprises: acquiring, for a marker of which a position in a vertical direction is variable with a displacement mechanism, the position of the marker in the vertical direction detected by an optical sensor mounted on a flying object; and performing control of maintaining or changing a position of the flying object in the vertical direction, with respect to the flying object, based on the position of the marker in the vertical direction.

A program of a thirty-seventh aspect according to the present disclosed technology that causes a computer to execute a process comprises: acquiring, for a marker of which a position in a vertical direction is variable with a displacement mechanism, the position of the marker in the vertical direction detected by an optical sensor mounted on a flying object; and performing control of maintaining or changing a position of the flying object in the vertical direction, with respect to the flying object, based on the position of the marker in the vertical direction.

DESCRIPTION OF THE PREFERRED EMBODIMENTS

In the following, an example of an embodiment of a control device, a flying object system, a control method, and a program according to the present disclosed technology will be described with reference to the accompanying drawings.

The terms used in the following description will be described first.

CPU refers to an abbreviation of "Central Processing Unit". GPU refers to an abbreviation of "Graphics Processing Unit". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". HDD refers to an abbreviation of "Hard Disk Drive". EEPROM refers to an abbreviation of "Electrically Erasable and Programmable Read Only Memory". SRAM refers to an abbreviation of "Static Random Access Memory". I/F refers to an abbreviation of "Interface". USB refers to an abbreviation of "Universal Serial Bus". CMOS refers to an abbreviation of "Complementary Metal Oxide Semiconductor". CCD refers to an abbreviation of "Charge Coupled Device". LED refers to an abbreviation of "Light-Emitting Diode". EL refers to an abbreviation of "Electro Luminescence". LiDAR refers to an abbreviation of "Light Detection And Ranging".

In the description of the present specification, "vertical" indicates vertical in a meaning including an error that is generally allowed in the technical field to which the present disclosed technology belongs, and an error to such an extent not contrary to the spirit and scope of the present disclosed technology, in addition to completely vertical. In the description of the present specification, a "position in a vertical direction" indicates a position in the vertical direction in a meaning including an error that is generally allowed in the technical field to which the present disclosed technology belongs, and an error to such an extent not contrary to the spirit and scope of the present disclosed technology, in addition to a position in the completely vertical direction. In the description of the present specification, the "parallel" indicates a parallel in the sense of including an error generally allowed in the technical field, to which the present disclosed technology belongs, in addition to the perfect parallel, and an error that does not go against the gist of the present disclosed technology. In the description of the present specification, the "horizontal" indicates a horizontal in the sense of including an error generally allowed in the technical field, to which the present disclosed technology belongs, in addition to the perfect horizontal, and an error that does not go against the gist of the present disclosed technology.

Figure 1:
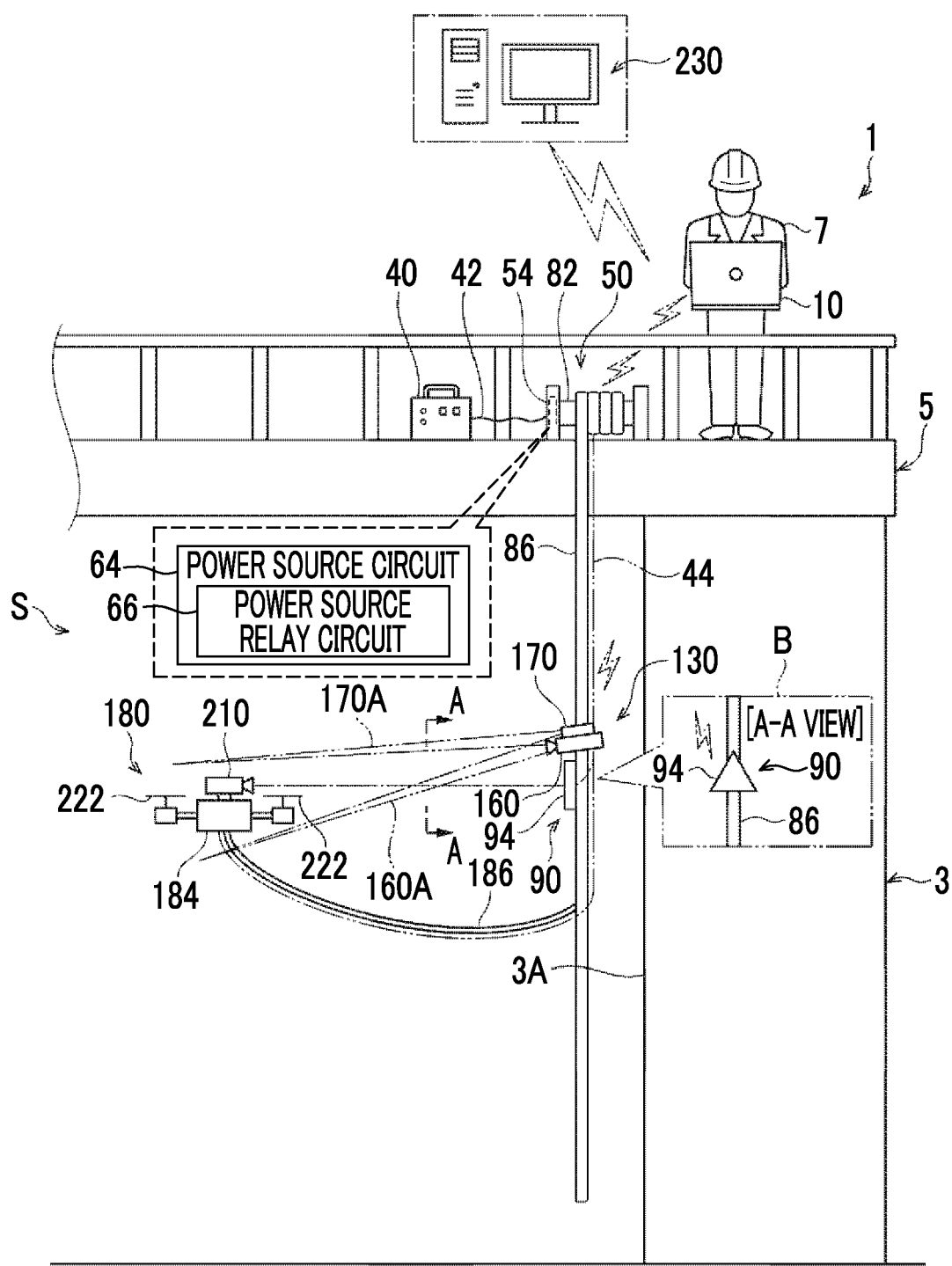
FIG. 1 is a side view showing an example of a configuration of an entire inspection system according to an embodiment of the present disclosed technology.

As an example shown in FIG. 1, an inspection system 1 according to an embodiment of the present disclosed technology includes an imaging system S and an image analysis apparatus 230, and inspects an inspection target 3.

As an example, the inspection target 3 is a pier of a bridge 5. As an example, the pier is made of reinforced concrete. Here, although a pier is exemplified as an example of the inspection target 3, the inspection target 3 may be a road facility other than a pier. Examples of the road facility include a road surface, a tunnel, a guard rail, a traffic light, and/or a windshield. The inspection target 3 may be social infrastructure (for example, an airport facility, a port facility, a water storage facility, a gas facility, a medical facility, a firefighting facility, an educational facility, and/or the like) other than road facilities or may be private property. Further, the inspection target 3 may be land (for example, state-owned land, private land, and/or the like). The pier exemplified as the inspection target 3 may be a pier other than the pier made of reinforced concrete.

In the present embodiment, the inspection refers to, for example, an inspection of a state of the inspection target 3. For example, the inspection system 1 inspects the presence or absence of damage of the inspection target 3, the degree of damage, and/or the like. The inspection target 3 is an example of an "inspection target" according to the present disclosed technology.

The imaging system S includes an imaging support apparatus 10, a power source apparatus 40, an ascending/descending apparatus 50, a marker apparatus 90, an imaging distance measurement apparatus 130, and a flying object 180. The flying object 180 has a function of imaging a subject (in the example shown in FIG. 1, the inspection target 3). The imaging system S is a system that provides an image obtained by imaging the inspection target 3 with the flying object 180 to the image analysis apparatus 230. The image analysis apparatus 230 inspects the presence or absence of damage to the inspection target 3 and/or the degree of damage by executing image analysis processing on the image provided by the inspection system 1, and outputs an inspection result. As an example, the image analysis processing is processing of analyzing an image using artificial intelligence or the like. The imaging system S is an example of a "flying object system" according to the present disclosed technology.

The imaging support apparatus 10 is, for example, a laptop personal computer. Here, although a laptop personal computer is exemplified as the imaging support apparatus 10, this is only an example, and a desktop personal computer may be used. Further, it is not limited to a personal computer, a server may be used. The server may be a mainframe or may be an external server implemented by cloud computing. Further, the server may be an external server implemented by network computing such as fog computing, edge computing, or grid computing. Further, the imaging support apparatus 10 may be a tablet terminal and/or a smartphone or the like. The imaging support apparatus 10 is connected to the ascending/descending apparatus 50, the marker apparatus 90, the imaging distance measurement apparatus 130, and the image analysis apparatus 230 in a communicable manner.

An operator 7 operates the imaging support apparatus 10. The imaging support apparatus 10 transmits various commands to the ascending/descending apparatus 50, the marker apparatus 90, and the imaging distance measurement apparatus 130 in response to an operation performed by the operator 7. As an example, in the example shown in FIG. 1, although the operator 7 who operates the imaging support apparatus 10 is on a bridge girder of the bridge 5, the operator 7 may be on the ground (for example, on the ground below the bridge girder) or may be in a remote location away from the bridge 5. The remote location away from the bridge 5 may be a position where the imaging support apparatus 10 can communicate with the ascending/descending apparatus 50, the marker apparatus 90, the imaging distance measurement apparatus 130, and the image analysis apparatus 230.

The power source apparatus 40 is connected to the ascending/descending apparatus 50 via a power source cable 42. The power source apparatus 40 is, for example, a battery or a generator, and supplies DC power to the ascending/descending apparatus 50. As an example, in the example shown in FIG. 1, although the power source apparatus 40 is disposed on the bridge girder, the power source apparatus 40 may be disposed on the ground or may be disposed in a remote location away from the bridge 5.

The ascending/descending apparatus 50 includes an electric reel mechanism 54 and a cable 86. The electric reel mechanism 54 includes a reel 82. The reel 82 is formed in a drum shape and is selectively rotated in both directions of a first direction and a second direction by the power of the electric reel mechanism 54. The cable 86 is wound around the reel 82. In a case where the reel 82 is rotated in the first direction, the cable 86 is wound around the reel 82, and in a case where the reel 82 is rotated in the second direction opposite to the first direction, the cable 86 is unwound from the reel 82. As an example, the ascending/descending apparatus 50 is disposed on the bridge girder, and the cable 86 hangs down below the bridge girder along the pier. The ascending/descending apparatus 50 is an example of an "ascending/descending mechanism" and a "displacement mechanism" according to the present disclosed technology.

The marker apparatus 90 is attached to the cable 86. The marker apparatus 90 includes a marker 94. A speech bubble B in FIG. 1 shows a view of the markers 94 as viewed from the A-A direction (that is, a front view of the markers 94). The marker 94 is a plate material having a triangular shape in a front view. The marker 94 is disposed parallel to a surface 3A of the inspection target 3. In the example shown in FIG. 1, the flying object 180 is positioned in front of the marker 94. In the following, unless otherwise specified, the description will be made on the premise that the flying object 180 is positioned in front of the marker 94. Further, in the following, the description will be made on the premise that the flying object 180 flies in an orientation in which the marker 94 is positioned in front of the flying object 180. Further, in the following, unless otherwise specified, the description will be made on the premise that the flying object 180 is separated from the marker 94 by a predetermined separation distance. The predetermined separation distance refers to, for example, a distance in which the entire marker 94 falls within an imaging range in a case where the marker 94 is imaged by the flying object 180, and a position of the marker 94 was derived in advance, as a distance that is within a depth of field, by testing with a real machine and/or computer simulation.

The imaging distance measurement apparatus 130 is attached to the cable 86. The imaging distance measurement apparatus 130 is disposed at a position adjacent to the marker 94. As an example, in the example shown in FIG. 1, although the imaging distance measurement apparatus 130 is disposed above the marker 94, the imaging distance measurement apparatus 130 may be disposed below the marker 94. Further, the imaging distance measurement apparatus 130 may be disposed on the side of the markers 94. In this case, the imaging distance measurement apparatus 130 may be held on the side of the marker 94 by a bracket or the like attached to the cable 86. Further, as an example, in the example shown in FIG. 1, although the imaging distance measurement apparatus 130 is a separate body from the marker apparatus 90, the imaging distance measurement apparatus 130 may be integrated with the marker apparatus 90. As an example, the imaging distance measurement apparatus 130 being adjacent to the marker 94 preferably means that, in a case where the total length of the flying object 180 is substantially 30 cm, and a distance between the flying object 180 and the imaging distance measurement apparatus 130 is substantially 100 cm, a distance between the imaging distance measurement apparatus 130 and the marker 94 is within 20 cm, more preferably within 17 cm. Further, regarding the distance between the imaging distance measurement apparatus 130 and the marker 94, processing of calibrating position information added to an image may be performed such that the center of the image acquired by the imaging distance measurement apparatus 130 is the center of the marker 94.

The imaging distance measurement apparatus 130 includes an imaging device 160 and a distance measurement device 170. The imaging device 160 is a device having an imaging function. The imaging function of the imaging device 160 is implemented by, for example, a digital camera or a video camera. The imaging device 160 is an example of a "fourth imaging device" according to the present disclosed technology. The distance measurement device 170 is a device having a distance measurement function. The distance measurement function of the distance measurement device 170 is implemented by, for example, an ultrasonic type distance measurement device, a laser type distance measurement device, a radar type distance measurement device, or the like. A LiDAR scanner may be used as the distance measurement device 170.

The imaging device 160 images a flying object 180, and the distance measurement device 170 measures a distance between the distance measurement device 170 and the flying object 180. An orientation of the imaging device 160 and an orientation of the distance measurement device 170 are set as follows. That is, in a case where the flying object 180 is positioned in front of the marker 94, and the flying object 180 is separated from the marker 94 by a predetermined separation distance, the orientation of the imaging device 160 is set such that the flying object 180 is within an imaging range 160A of the imaging device 160. Similarly, in a case where the flying object 180 is positioned in front of the marker 94, and the flying object 180 is separated from the marker 94 by a predetermined separation distance, the orientation of the distance measurement device 170 is set such that the flying object 180 is within a distance measurement range 170A of the distance measurement device 170.

For example, in the example shown in FIG. 1, although the imaging device 160 is fixed to the cable 86 such that the imaging device 160 faces obliquely downward with respect to the horizontal direction in a state in which the cable 86 is parallel to the vertical direction, this is only an example, and the imaging device 160 may be fixed to the cable 86 such that the imaging device 160 is horizontal in a state in which the cable 86 is parallel to the vertical direction. Similarly, although the distance measurement device 170 is fixed to the cable 86 such that the distance measurement device 170 faces obliquely downward with respect to the horizontal direction in a state in which the cable 86 is parallel to the vertical direction, this is only an example, and the distance measurement device 170 may be fixed to the cable 86 such that the distance measurement device 170 is positioned horizontally in a state in which the cable 86 is parallel to the vertical direction.

As an example, in the example shown in FIG. 1, although the imaging distance measurement apparatus 130 includes the imaging device 160 and the distance measurement device 170, this is only an example, and the imaging distance measurement apparatus 130 may be an imaging device having an imaging function and a distance measurement function. Examples of the imaging device having the imaging function and the distance measurement function include a stereo camera or a phase difference pixel camera.

In a case where the cable 86 is wound around the reel 82 by rotating the reel 82 of the ascending/descending apparatus 50 in the first direction, the marker apparatus 90 and the imaging distance measurement apparatus 130 ascend. On the other hand, in a case where the cable 86 is unwound from the reel 82 by rotating the reel 82 of the ascending/descending apparatus 50 in the second direction, the marker apparatus 90 and the imaging distance measurement apparatus 130 descend. The position of the marker 94 in the vertical direction can be changed by the ascending/descending apparatus 50. That is, in a case where the cable 86 is wound with respect to the reel 82, the position of the marker 94 in the vertical direction is changed to the upper side in the vertical direction, and in a case where the cable 86 is unwound with respect to the reel 82, the position of the marker 94 in the vertical direction is changed to the lower side in the vertical direction.

The flying object 180 is an unmanned aerial vehicle such as a drone and includes a flying object main body 184 and an imaging device 210. The flying object main body 184 is, for example, a multirotor including a plurality of rotor blades 222. The number of the plurality of rotor blades 222 is, for example, three or more.

The imaging device 210 is a device having an imaging function. The imaging function of the imaging device 210 is implemented by, for example, a digital camera or a video camera. As an example, in the example shown in FIG. 1, although the imaging device 210 is mounted on an upper part of the flying object main body 184, this is only an example, and the imaging device 210 may be mounted on a lower part of the flying object main body 184. The imaging device 210 is disposed in an orientation of imaging the front of the flying object 180. As an example, in the example shown in FIG. 1, although the imaging device 210 is fixed to the flying object main body 184 such that an optical axis of the imaging device 210 is horizontal in a state in which the flying object 180 is positioned horizontally, this is only an example, and the imaging device 210 may be fixed to the flying object main body 184 such that the optical axis of the imaging device 210 is inclined with respect to the horizontal direction in a state in which the flying object 180 is positioned horizontally. Further, the flying object 180 may have an angle change mechanism that changes an angle of the imaging device 210 with respect to the horizontal direction. The imaging device 210 is an example of an "optical sensor", a "first imaging device", a "second imaging device", and a "third imaging device" according to the present disclosed technology.

The flying object 180 is connected to the cable 86 via a rope 186. As an example, a first end of the rope 186 is connected to a lower part of the flying object main body 184, and a second end of the rope 186 is connected to the cable 86 below the marker apparatus 90. A power transmission cable 44 is provided in the cable 86 and the rope 186. In FIG. 1, the power transmission cable 44 is shown by an imaginary line (that is, a two-dot chain line). The power transmission cable 44 may be provided inside the cable 86 and the rope 186 or may be provided outside the cable 86 and the rope 186. Further, the power transmission cable 44 itself may be configured as the cable 86 and the rope 186.

The ascending/descending apparatus 50 includes a power source circuit 64. The power source circuit 64 is connected to the power source apparatus 40 via the power source cable 42 and receives power from the power source apparatus 40 via the power source cable 42. The power source circuit 64 receives power, which is supplied from the power source apparatus 40 via the power source cable 42, as driving power for the ascending/descending apparatus 50.

The power source circuit 64 supplies the power received from the power source apparatus 40 to various electronic devices mounted on the ascending/descending apparatus 50. The power source circuit 64 is connected to the marker apparatus 90, the imaging distance measurement apparatus 130, and the flying object 180 via the power transmission cable 44. This is only an example, and the marker apparatus 90, the imaging distance measurement apparatus 130, and the flying object 180 may be connected to the power source apparatus 40 without passing through the power source circuit 64. Further, the power source circuit 64 may be provided inside the ascending/descending apparatus 50 or may be provided outside the ascending/descending apparatus 50. Further, a power source relay circuit 66 may be provided in a power source relay apparatus (not shown) that is an apparatus different from the ascending/descending apparatus 50.

The power source relay circuit 66 is built into the power source circuit 64. The power source relay circuit 66 relays the power, which is supplied from the power source apparatus 40 to the power source circuit 64 via the power source cable 42, for the marker apparatus 90, the imaging distance measurement apparatus 130, and the flying object 180. That is, the power source relay circuit 66 supplies the power generated by the power source apparatus 40 to the marker apparatus 90, the imaging distance measurement apparatus 130, and the flying object 180 via the power transmission cable 44.

Figure 2:
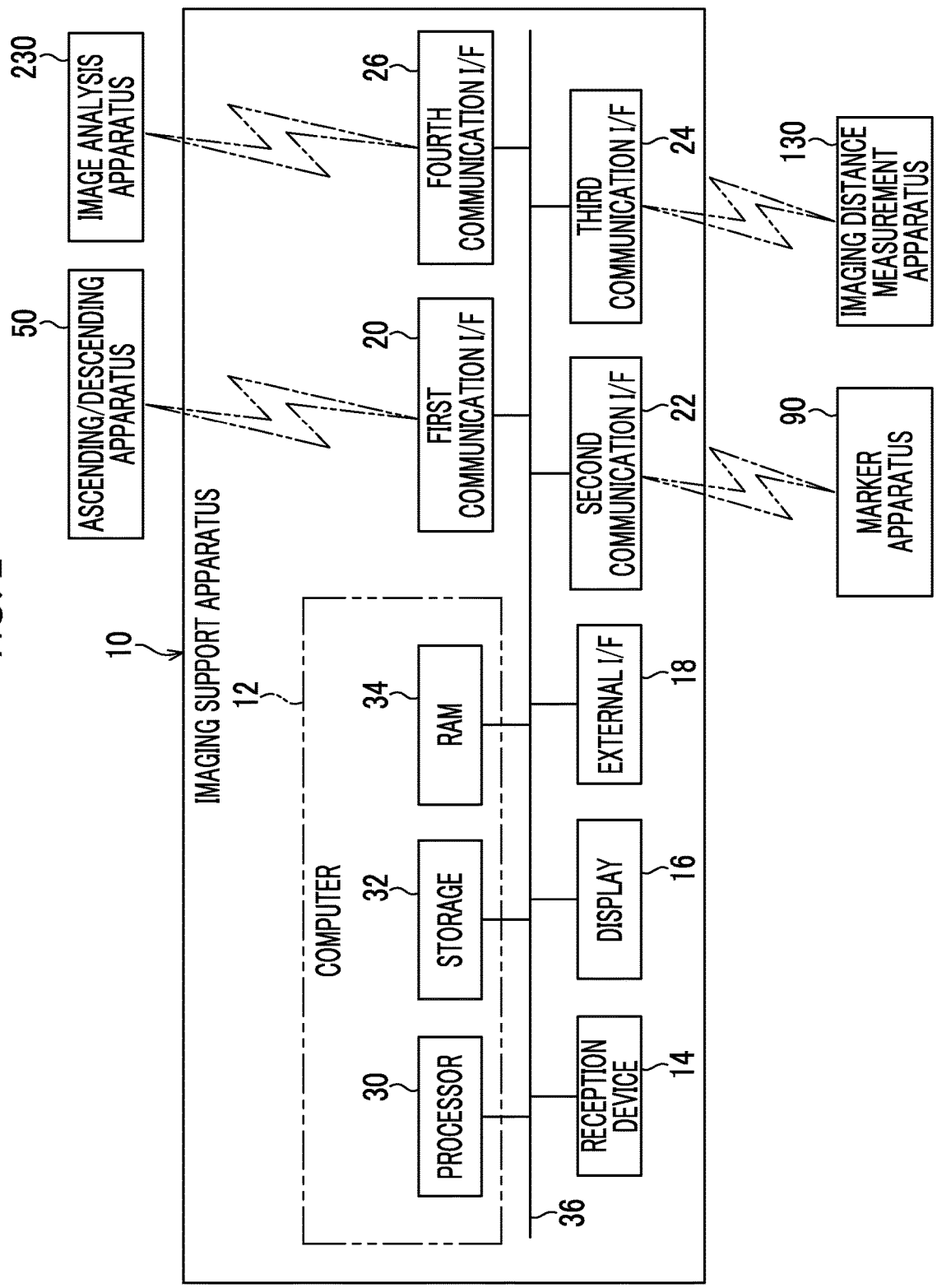
FIG. 2 is a block diagram showing an example of an electrical configuration of an imaging support apparatus according to the present embodiment.

As an example shown in FIG. 2, the imaging support apparatus 10 includes a computer 12, a reception device 14, a display 16, an external I/F 18, a first communication I/F 20, a second communication I/F 22, a third communication I/F 24, and a fourth communication I/F 26.

The computer 12 includes a processor 30, a storage 32, and a RAM 34. The processor 30, the storage 32, the RAM 34, the external I/F 18, the first communication I/F 20, the second communication I/F 22, the third communication I/F 24, and the fourth communication I/F 26 are connected to a bus 36. In the example shown in FIG. 2, one bus is shown as the bus 36 for convenience of illustration, but a plurality of buses may be used. The bus 36 may be a serial bus or may be a parallel bus including a data bus, an address bus, a control bus, and the like.

The processor 30 includes, for example, a CPU, and controls the entire imaging support apparatus 10. Here, although an example in which the processor 30 includes a CPU is exemplified, this is only an example. For example, the processor 30 may include a CPU and a GPU. In this case, for example, the GPU operates under the control of the CPU and executes image processing.

The storage 32 is a non-volatile storage device that stores various programs, various parameters, and the like. Examples of the storage 32 include an HDD, an SSD, and the like. The HDD and the SSD are only examples, and a flash memory, a magnetoresistive memory, and/or a ferroelectric memory may be used instead of the HDD and/or the SSD or together with the HDD and/or the SSD.

The RAM 34 is memory in which information is temporarily stored and is used as a work memory by the processor 30. Examples of the RAM 34 include a DRAM and/or an SRAM.

The reception device 14 includes a keyboard, a mouse, a touch pad, and the like and receives an instruction from the operator 7. The display 16 displays various types of information (for example, an image and a character) under the control of the processor 30. Examples of the display 16 include an EL display (for example, an organic EL display or an inorganic EL display), and the like. It should be noted that the display is not limited to the EL display, and another type of display, such as a liquid crystal display, may be applied.

The external I/F 18 controls exchange of various types of information between the imaging support apparatus 10 and an apparatus (for example, a smart device, a personal computer, a server, a USB memory, a memory card, a printer, and/or the like) present outside of the imaging support apparatus 10. Examples of the external I/F 18 include a USB interface, and the like. The various apparatuses (not shown) such as a smart device, a personal computer, a server, a USB memory, a memory card, and/or a printer is directly or indirectly connected to the USB interface.

The first communication I/F 20 is connected to the ascending/descending apparatus 50 in a communicable manner. Here, the first communication I/F 20 is connected to the ascending/descending apparatus 50 in a wirelessly communicable manner with the default wireless communication standard. Examples of the default wireless communication standard include Bluetooth (registered trademark), and the like. Other wireless communication standards (for example, Wi-Fi, 5G, or the like) may be used. Here, although wireless communication is exemplified, the present disclosed technology is not limited to this, and wired communication may be applied instead of wireless communication. The first communication I/F 20 controls exchange of information with the ascending/descending apparatus 50. For example, the first communication I/F 20 transmits the information in response to a request from the processor 30 to the ascending/descending apparatus 50. Further, the first communication I/F 20 receives the information transmitted from the ascending/descending apparatus 50 and outputs the received information to the processor 30 via the bus 36.

The second communication I/F 22 is connected to the marker apparatus 90 in a communicable manner. Here, the second communication I/F 22 is connected to the marker apparatus 90 in a wirelessly communicable manner with the default wireless communication standard. Further, here, although wireless communication is exemplified, the present disclosed technology is not limited to this, and wired communication may be applied instead of wireless communication. The second communication I/F 22 controls exchange of information with the marker apparatus 90. For example, the second communication I/F 22 transmits the information in response to a request from the processor 30 to the marker apparatus 90. Further, the second communication T/F 22 receives the information transmitted from the marker apparatus 90 and outputs the received information to the processor 30 via the bus 36.

The third communication I/F 24 is connected to the imaging distance measurement apparatus 130 in a communicable manner. Here, the third communication I/F 24 is connected to the imaging distance measurement apparatus 130 in a wirelessly communicable manner with the default wireless communication standard. Further, here, although wireless communication is exemplified, the present disclosed technology is not limited to this, and wired communication may be applied instead of wireless communication. The third communication I/F 24 controls exchange of information with the imaging distance measurement apparatus 130. For example, the third communication I/F 24 transmits the information in response to a request from the processor 30 to the imaging distance measurement apparatus 130. Further, the third communication I/F 24 receives the information transmitted from the imaging distance measurement apparatus 130 and outputs the received information to the processor 30 via the bus 36.

The fourth communication I/F 26 is connected to the image analysis apparatus 230 in a communicable manner. Here, the fourth communication I/F 26 is connected to the image analysis apparatus 230 in a wirelessly communicable manner with the default wireless communication standard. Further, here, although wireless communication is exemplified, the present disclosed technology is not limited to this, and wired communication may be applied instead of wireless communication. The fourth communication I/F 26 controls exchange of information with the image analysis apparatus 230. For example, the fourth communication I/F 26 transmits the information in response to a request from the processor 30 to the image analysis apparatus 230. Further, the fourth communication I/F 26 receives the information transmitted from the image analysis apparatus 230 and outputs the received information to the processor 30 via the bus 36.

Figure 3:
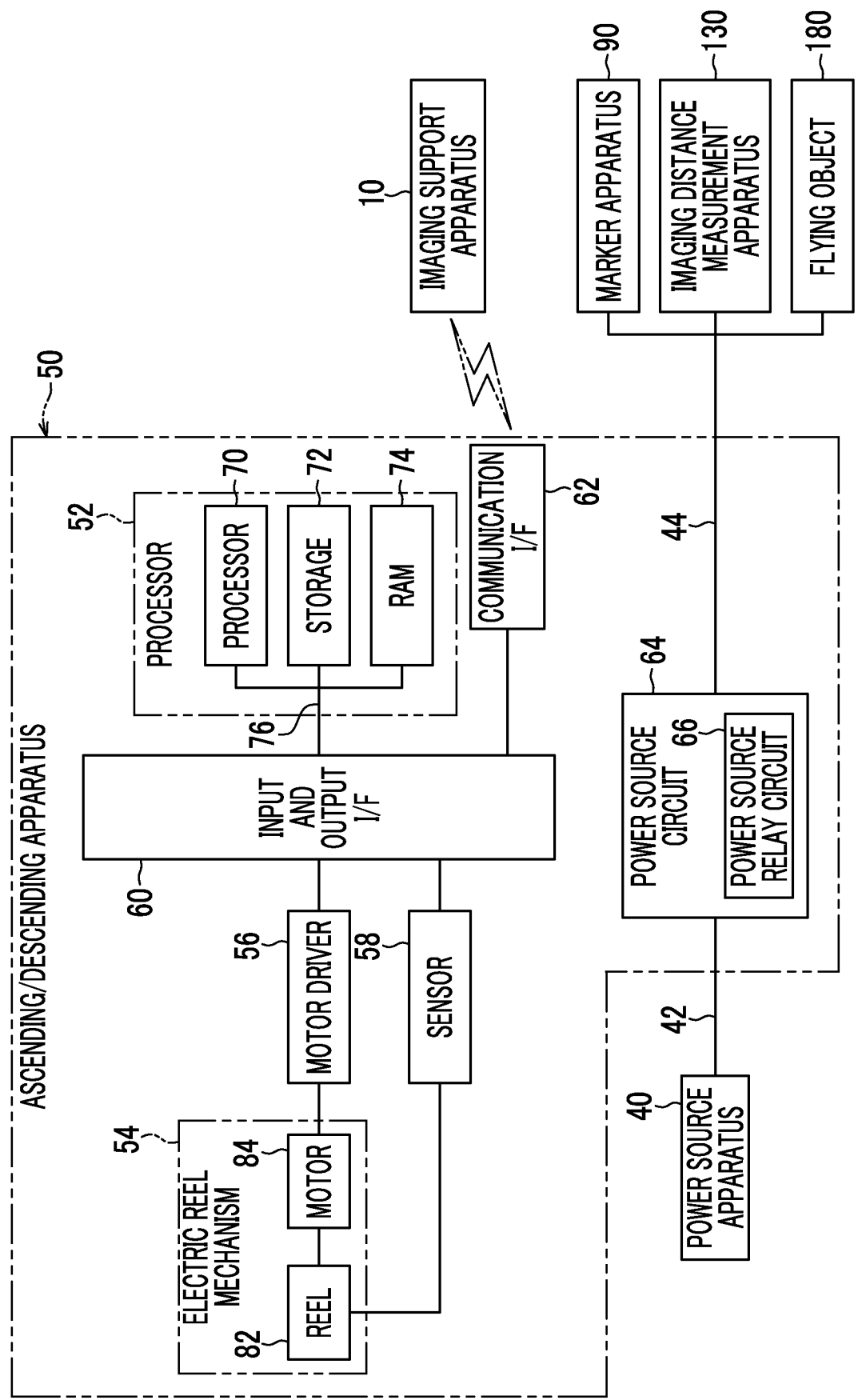
FIG. 3 is a block diagram showing an example of an electrical configuration of an ascending/descending apparatus according to the present embodiment.

As an example shown in FIG. 3, the ascending/descending apparatus 50 includes a computer 52, the electric reel mechanism 54, a motor driver 56, a sensor 58, an input and output I/F 60, a communication I/F 62, and the power source circuit 64.

The computer 52 includes a processor 70, a storage 72, and a RAM 74. The processor 70, the storage 72, and the RAM 74 are connected to each other via a bus 76, and the bus 76 is connected to the input and output I/F 60. In the example shown in FIG. 3, one bus is shown as the bus 76 for convenience of illustration, but a plurality of buses may be used. The bus 76 may be a serial bus or may be a parallel bus including a data bus, an address bus, a control bus, and the like.

The storage 72 is a non-temporary storage medium that stores various parameters and various programs. For example, the storage 72 is an EEPROM. However, this is only an example, and an HDD and/or SSD or the like may be applied as the storage 72 instead of or together with the EEPROM. Further, the RAM 74 temporarily stores various types of information and is used as a work memory.

The processor 70 includes, for example, a CPU. The processor 70 reads out a necessary program from the storage 72 and executes the read program in the RAM 74. The processor 70 controls the entire ascending/descending apparatus 50 in accordance with the program executed on the RAM 74.

The electric reel mechanism 54 includes the reel 82 and a motor 84. The reel 82 is connected to the motor 84 via a reduction mechanism (not shown). The motor 84 is, for example, a motor such as a motor with a DC brush, a brushless motor, or a stepping motor. The motor driver 56 and the sensor 58 are connected to the processor 70 via the input and output I/F 60 and the bus 76. The motor driver 56 controls the motor 84 in accordance with an instruction from the processor 70.

The sensor 58 is, for example, a sensor that has a function of detecting a rotation amount of a rotary encoder, a potential meter, a pickup sensor, or the like. The sensor 58 detects a rotation amount of the reel 82 and outputs a signal corresponding to the detected rotation amount to the processor 70. The rotation amount of the reel 82 is proportional to an unwinding amount of the cable 86 (see FIG. 1) with respect to the reel 82. The reel 82 may be provided with gradations indicating the rotation amount of the reel 82 instead of the sensor 58. In a case where gradations indicating the rotation amount of the reel 82 are provided on the reel 82, the operator 7 (see FIG. 1) can understand the rotation amount of the reel 82 and the unwinding amount of the cable 86 by checking the gradations. Further, a manual reel mechanism that manually rotates the reel 82 may be used instead of the electric reel mechanism 54. In a case where the manual reel mechanism is used, the operator 7 can manually rotate the reel 82 to wind and unwind the cable 86 with respect to the reel 82.

The communication I/F 62 controls transmission and reception of information with respect to the imaging support apparatus 10 by the ascending/descending apparatus 50. The communication I/F 62 controls exchange of information between the processor 30 (see FIG. 2) of the imaging support apparatus 10 and the processor 70 of the ascending/descending apparatus 50. For example, the communication I/F 62 transmits the information in response to a request from the processor 70 to the imaging support apparatus 10. Further, the communication T/F 62 receives the information transmitted from the processor 30 of the imaging support apparatus 10 via the first communication I/F 20 (see FIG. 2) and outputs the received information to the processor 70 via the bus 76.

The power source circuit 64 is connected to the power source apparatus 40 via the power source cable 42. The DC power is supplied to the power source circuit 64 from the power source apparatus 40 via the power source cable 42. In a case where the DC power is supplied to the power source circuit 64, the DC power is supplied to each part of the ascending/descending apparatus 50. Further, the marker apparatus 90, the imaging distance measurement apparatus 130, and the flying object 180 are connected to the power source circuit 64 via the power transmission cable 44.

Figure 4:
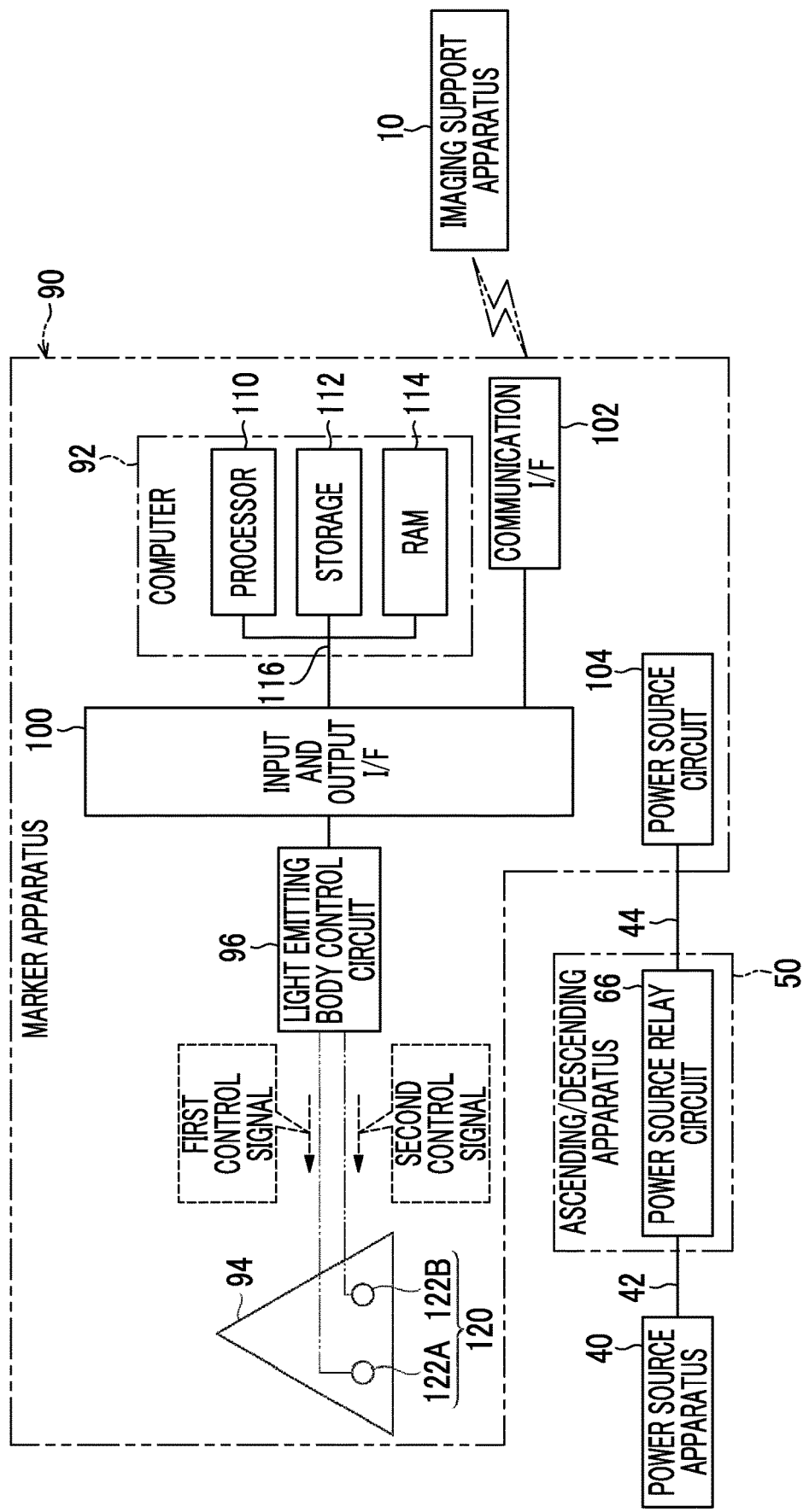
FIG. 4 is a block diagram showing an example of an electrical configuration of a marker apparatus according to the present embodiment.

As an example shown in FIG. 4, the marker apparatus 90 includes a computer 92, a marker 94, a light emitting body control circuit 96, an input and output I/F 100, a communication I/F 102, and a power source circuit 104.

The computer 92 includes a processor 110, a storage 112, and a RAM 114. The processor 110, the storage 112, and the RAM 114 are connected to each other via a bus 116, and the bus 116 is connected to the input and output I/F 100. In the example shown in FIG. 4, one bus is shown as the bus 116 for convenience of illustration, but a plurality of buses may be used. The bus 116 may be a serial bus or may be a parallel bus including a data bus, an address bus, a control bus, and the like.

The storage 112 is a non-temporary storage medium that stores various parameters and various programs. For example, the storage 112 is an EEPROM. However, this is only an example, and an HDD and/or SSD or the like may be applied as the storage 112 instead of or together with the EEPROM. Further, the RAM 114 temporarily stores various types of information and is used as a work memory.

The processor 110 includes, for example, a CPU. The processor 110 reads out a necessary program from the storage 112 and executes the read program in the RAM 114. The processor 110 controls the entire marker apparatus 90 according to the program executed on the RAM 114.

The marker 94 includes a light emitting body 120. The light emitting body 120 includes a plurality of light sources 122A and 122B. As an example, in the example shown in FIG. 4, although the two light sources 122A and 122B are provided in the light emitting body 120, the number of the plurality of light sources 122A and 122B may be three or more. The light sources 122A and 122B are, for example, LEDs or filament lamps. Hereinafter, one of the two light sources 122A and 122B is referred to as a first light source 122A, and the other of the two light sources 122A and 122B is referred to as a second light source 122B. The light emitting body control circuit 96 is connected to the processor 110 via the input and output I/F 100 and the bus 116.

The light emitting body control circuit 96 controls the light emitting body 120 in accordance with an instruction from the processor 110. Specifically, the light emitting body control circuit 96 outputs a first control signal with respect to the first light source 122A and outputs a second control signal with respect to the second light source 122B. The light emitting body control circuit 96 switches a level of the first control signal between a HIGH level (hereinafter, referred to as an H level) and a LOW level (hereinafter, referred to as an L level). The first light source 122A is turned on in a case where the first control signal is an H level and is turned off in a case where the first control signal is an L level. In a case where the first control signal is maintained at an H level, the first light source 122A is maintained at a turned-on state, and in a case where the first control signal is maintained at an L level, the first light source 122A is maintained at a turned-off state. Further, in a case where the first control signal is alternately repeatedly switched between an H level and an L level, the first light source 122A is turned on and off.

Similarly, the light emitting body control circuit 96 switches a level of the second control signal between an H level and an L level. The second light source 122B is turned on in a case where the second control signal is an H level and is turned off in a case where the second control signal is an L level. In a case where the second control signal is maintained at an H level, the second light source 122B is maintained at a turned-on state, and in a case where the second control signal is maintained at an L level, the second light source 122B is maintained at a turned-off state. Further, in a case where the second control signal is alternately repeatedly switched between an H level and an L level, the second light source 122B is turned on and off.

The communication I/F 102 controls transmission and reception of information with respect to the imaging support apparatus 10 by the marker apparatus 90. The communication I/F 102 controls exchange of information between the processor 30 (see FIG. 2) of the imaging support apparatus 10 and the processor 110 of the marker apparatus 90. For example, the communication I/F 102 transmits the information in response to a request from the processor 110 to the imaging support apparatus 10. Further, the communication I/F 102 receives the information transmitted from the processor 30 of the imaging support apparatus 10 via the second communication I/F 22 (see FIG. 2) and outputs the received information to the processor 110 via the bus 116.

The power source circuit 104 is connected to the power source relay circuit 66 of the ascending/descending apparatus 50 via the power transmission cable 44. The DC power is supplied to the power source circuit 104 from the power source apparatus 40 via the power source cable 42, the power source relay circuit 66, and the power transmission cable 44. In a case where the DC power is supplied to the power source circuit 104, the DC power is supplied to each part of the marker apparatus 90.

Figure 5:
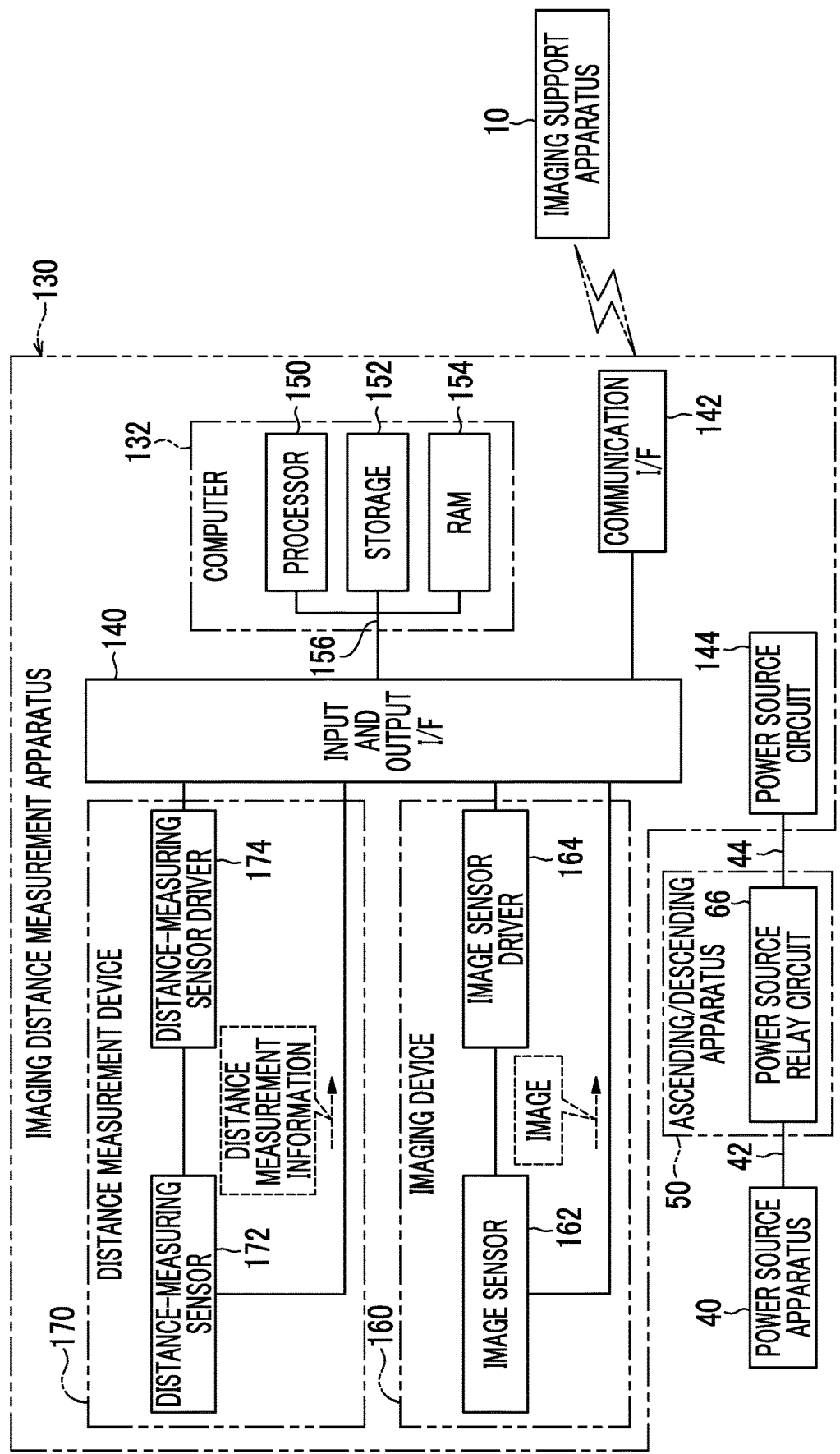
FIG. 5 is a block diagram showing an example of an electrical configuration of an imaging distance measurement apparatus according to the present embodiment.

As an example shown in FIG. 5, the imaging distance measurement apparatus 130 includes a computer 132, the imaging device 160, the distance measurement device 170, an input and output I/F 140, a communication I/F 142, and a power source circuit 144.

The computer 132 includes a processor 150, a storage 152, and a RAM 154. The processor 150, the storage 152, and the RAM 154 are connected to each other via a bus 156, and the bus 156 is connected to the input and output I/F 140. In the example shown in FIG. 5, one bus is shown as the bus 156 for convenience of illustration, but a plurality of buses may be used. The bus 156 may be a serial bus or may be a parallel bus including a data bus, an address bus, a control bus, and the like.

The storage 152 is a non-temporary storage medium that stores various parameters and various programs. For example, the storage 152 is an EEPROM. However, this is only an example, and an HDD and/or SSD or the like may be applied as the storage 152 instead of or together with the EEPROM. Further, the RAM 154 temporarily stores various types of information and is used as a work memory.

The processor 150 includes, for example, a CPU. The processor 150 reads out a necessary program from the storage 152 and executes the read program in the RAM 154. The processor 150 controls the entire imaging distance measurement apparatus 130 according to the program executed on the RAM 154.

The imaging device 160 includes an image sensor 162 and an image sensor driver 164. The image sensor 162 is a CMOS image sensor, for example. Here, although a CMOS image sensor is exemplified as the image sensor 162, the present disclosed technology is not limited to this, and other image sensors may be used. The image sensor 162 and the image sensor driver 164 are connected to the processor 150 via the input and output I/F 140 and the bus 156. The image sensor driver 164 controls the image sensor 162 in accordance with an instruction from the processor 150. Under the control of the image sensor driver 164, the image sensor 162 images a subject (for example, the flying object 180 shown in FIG. 1) and outputs an image obtained by the imaging to the processor 150.

Although not particularly shown, the imaging device 160 includes optical components such as an objective lens, a focus lens, a zoom lens, and a stop. Further, although not particularly shown, the imaging device 160 includes a drive mechanism that drives the optical components such as a focus lens, a zoom lens, and a stop. In a case where imaging is performed by the imaging device 160, the drive mechanism is controlled to drive the optical components such as a focus lens, a zoom lens, and a stop.

The distance measurement device 170 includes a distance-measuring sensor 172 and a distance-measuring sensor driver 174. The distance-measuring sensor 172 is a sensor having a distance measurement function. The distance measurement function of the distance-measuring sensor 172 is implemented by, for example, an ultrasonic type distance-measuring sensor, a laser type distance-measuring sensor, a radar type distance-measuring sensor, or the like. The distance-measuring sensor 172 and the distance-measuring sensor driver 174 are connected to the processor 150 via the input and output I/F 140 and the bus 156. The distance-measuring sensor driver 174 controls the distance-measuring sensor 172 in accordance with an instruction from the processor 150. Under the control of the distance-measuring sensor driver 174, the distance-measuring sensor 172 measures a distance between the distance measurement device 170 and a distance measurement target (for example, the flying object 180 shown in FIG. 1) and outputs distance measurement information according to the measured distance (for example, information indicating the distance itself) to the processor 150.

The communication I/F 142 controls transmission and reception of information with respect to the imaging support apparatus 10 by the imaging distance measurement apparatus 130. The communication I/F 142 controls exchange of information between the processor 30 (see FIG. 2) of the imaging support apparatus 10 and the processor 150 of the imaging distance measurement apparatus 130. For example, the communication I/F 142 transmits the information in response to a request from the processor 150 to the imaging support apparatus 10. Further, the communication I/F 142 receives the information transmitted from the processor 30 of the imaging support apparatus 10 via the third communication I/F 24 (see FIG. 2) and outputs the received information to the processor 150 via the bus 156.

The power source circuit 144 is connected to the power source relay circuit 66 of the ascending/descending apparatus 50 via the power transmission cable 44. The DC power is supplied to the power source circuit 144 from the power source apparatus 40 via the power source cable 42, the power source relay circuit 66, and the power transmission cable 44. In a case where the DC power is supplied to the power source circuit 144, the DC power is supplied to each part of the imaging distance measurement apparatus 130.

Figure 6:
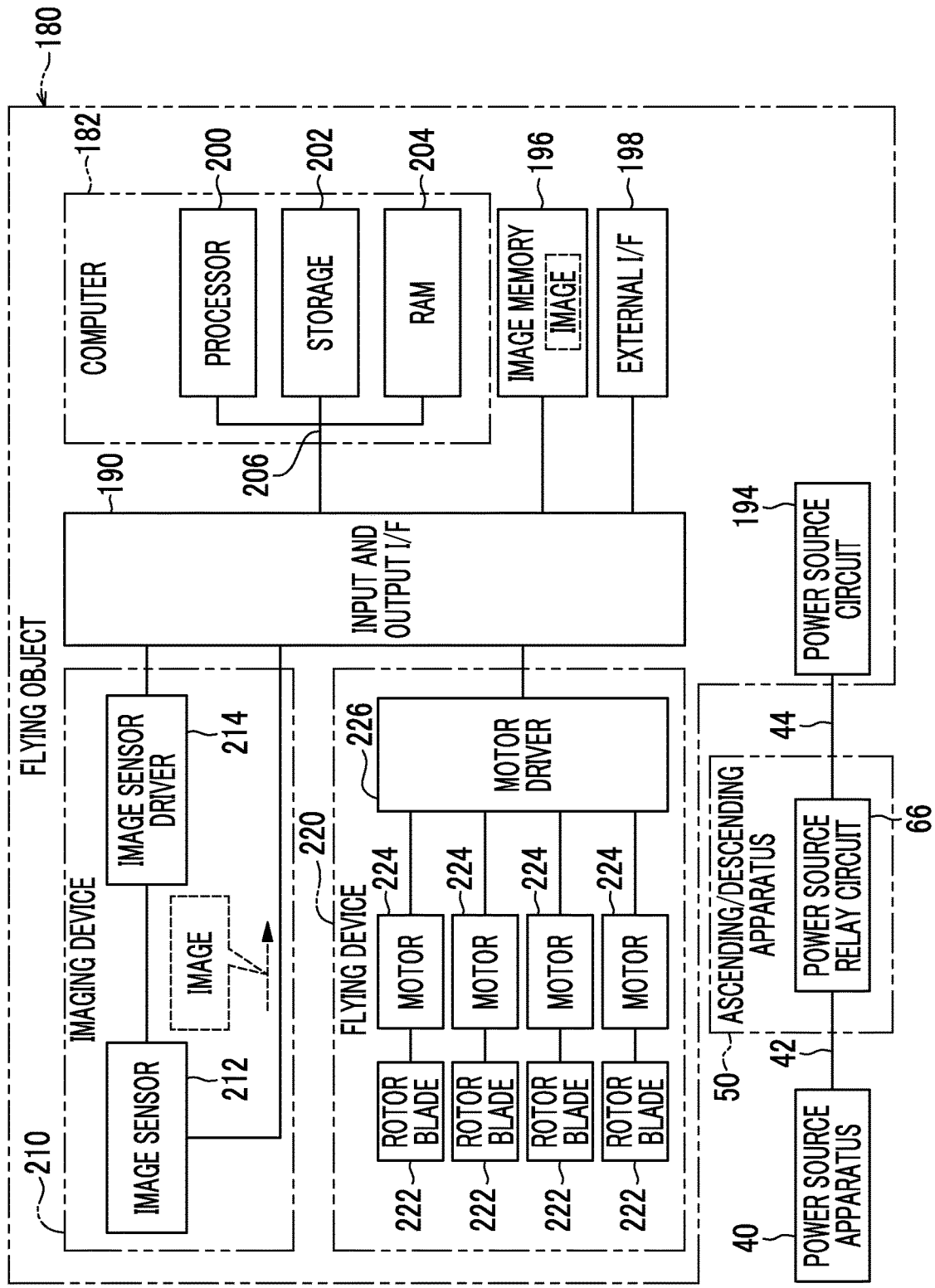
FIG. 6 is a block diagram showing an example of an electrical configuration of a flying object according to the present embodiment.

As an example shown in FIG. 6, the flying object 180 includes a computer 182, the imaging device 210, a flying device 220, an input and output I/F 190, an image memory 196, an external I/F 198, and a power source circuit 194.

The computer 182 is an example of a "control device" and a "computer" according to the present disclosed technology. The computer 182 includes the processor 200, a storage 202, and a RAM 204. The processor 200 is an example of a "processor" according to the present disclosed technology, and the RAM 204 is an example of a "memory" according to the present disclosed technology. The processor 200, the storage 202, and the RAM 204 are connected to each other via a bus 206, and the bus 206 is connected to the input and output I/F 190. In the example shown in FIG. 5, one bus is shown as the bus 206 for convenience of illustration, but a plurality of buses may be used. The bus 206 may be a serial bus or may be a parallel bus including a data bus, an address bus, a control bus, and the like.

The storage 202 is a non-temporary storage medium that stores various parameters and various programs. For example, the storage 202 is an EEPROM. However, this is only an example, and an HDD and/or SSD or the like may be applied as the storage 202 instead of or together with the EEPROM. Further, the RAM 204 temporarily stores various types of information and is used as a work memory.

The processor 200 includes, for example, a CPU. The processor 200 reads out a necessary program from the storage 202 and executes the read program in the RAM 204. The processor 200 controls the entire flying object 180 in accordance with the program executed on the RAM 204.

The imaging device 210 includes an image sensor 212 and an image sensor driver 214. The image sensor 212 is a CMOS image sensor, for example. Here, although a CMOS image sensor is exemplified as the image sensor 212, the present disclosed technology is not limited to this, and other image sensors may be used. The image sensor 212 and the image sensor driver 214 are connected to the processor 200 via the input and output I/F 190 and the bus 206. The image sensor driver 214 controls the image sensor 212 in accordance with an instruction from the processor 200. Under the control of the image sensor driver 214, the image sensor 212 images a subject (for example, the marker 94 and/or the inspection target 3 shown in FIG. 1) and outputs an image obtained by the imaging to the processor 200.

Although not particularly shown, the imaging device 210 includes optical components such as an objective lens, a focus lens, a zoom lens, and a stop. Further, although not particularly shown, the imaging device 210 includes a drive mechanism that drives the optical components such as a focus lens, a zoom lens, and a stop. In a case where imaging is performed by the imaging device 210, the drive mechanism is controlled to drive the optical components such as a focus lens, a zoom lens, and a stop.

The flying device 220 includes a plurality of rotor blades 222, a plurality of motors 224, and a motor driver 226. As an example, in the example shown in FIG. 6, the number of the plurality of rotor blades 222 is four. Further, the number of the plurality of motors 224 is the same as the number of the plurality of rotor blades 222. The motor driver 226 is connected to the processor 200 via the input and output I/F 190 and the bus 206. The motor driver 226 individually controls the plurality of motors 224 in accordance with an instruction from the processor 200. The rotor blades 222 are respectively fixed to rotation shafts of the motors 224. Each motor 224 rotates the rotor blade 222. As the plurality of rotor blades 222 rotate, the flying object 180 flies. In a case where rotation speeds of the plurality of rotor blades 222 are increased, the flying object 180 ascends, and in a case where the rotation speeds of the plurality of rotor blades 222 are decreased, the flying object 180 descends. Further, the flying object 180 is stopped in the air (that is, hovers) in a state in which the propulsive force of the plurality of rotor blades 222 and the gravity acting on the flying object 180 are balanced. Further, by making differences among the rotation speeds of the plurality of rotor blades 222, the flying object 180 revolves, moves forward, moves backward, and/or moves laterally.

The image memory 196 is, for example, an EEPROM. However, this is only an example, and an HDD and/or SSD or the like may be applied as the image memory 196 instead of or together with the EEPROM. Further, the image memory 196 may be a memory card. The image memory 196 stores an image obtained by being captured by the image sensor 212.

The external I/F 198 controls exchange of various types of information between the flying object 180 and an apparatus (for example, a smart device, a personal computer, a server, a USB memory, a memory card, a printer, and/or the like) present outside of the flying object 180. Examples of the external I/F 198 include a USB interface, and the like. The various apparatuses (not shown) such as a smart device, a personal computer, a server, a USB memory, a memory card, and/or a printer is directly or indirectly connected to the USB interface. Further, the flying object 180 is connected to the imaging support apparatus 10 through the external I/F 198 and provides the imaging support apparatus 10 with the image stored in the image memory 196.

The power source circuit 194 is connected to the power source relay circuit 66 of the ascending/descending apparatus 50 via the power transmission cable 44. The DC power is supplied to the power source circuit 194 from the power source apparatus 40 via the power source cable 42, the power source relay circuit 66, and the power transmission cable 44. In a case where the DC power is supplied to the power source circuit 194, the DC power is supplied to each part of the flying object 180.

Figure 7:
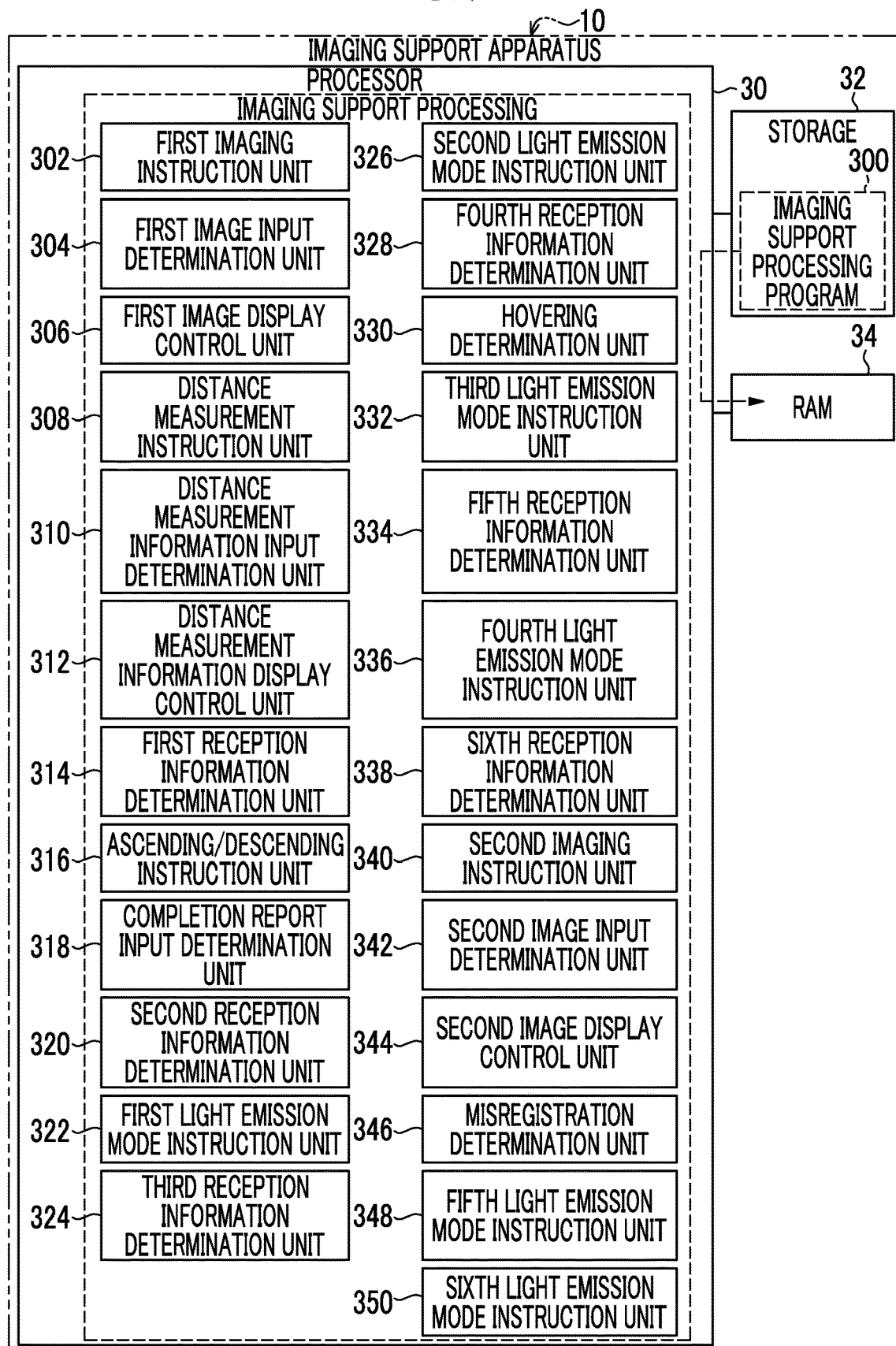
FIG. 7 is a block diagram showing an example of a functional configuration of the imaging support apparatus according to the present embodiment.

As an example shown in FIG. 7, the storage 32 of the imaging support apparatus 10 stores an imaging support processing program 300. In the imaging support apparatus 10, the processor 30 reads out the imaging support processing program 300 from the storage 32 and executes the read imaging support processing program 300 on the RAM 34. The processor 30 performs imaging support processing according to the imaging support processing program 300 executed on the RAM 34.

By executing the imaging support processing program 300, the processor 30 operates as a first imaging instruction unit 302, a first image input determination unit 304, a first image display control unit 306, a distance measurement instruction unit 308, a distance measurement information input determination unit 310, a distance measurement information display control unit 312, a first reception information determination unit 314, an ascending/descending instruction unit 316, a completion report input determination unit 318, a second reception information determination unit 320, a first light emission mode instruction unit 322, a third reception information determination unit 324, a second light emission mode instruction unit 326, a fourth reception information determination unit 328, a hovering determination unit 330, a third light emission mode instruction unit 332, a fifth reception information determination unit 334, a fourth light emission mode instruction unit 336, a sixth reception information determination unit 338, a second imaging instruction unit 340, a second image input determination unit 342, a second image display control unit 344, a misregistration determination unit 346, a fifth light emission mode instruction unit 348, and a sixth light emission mode instruction unit 350.

Figure 8:
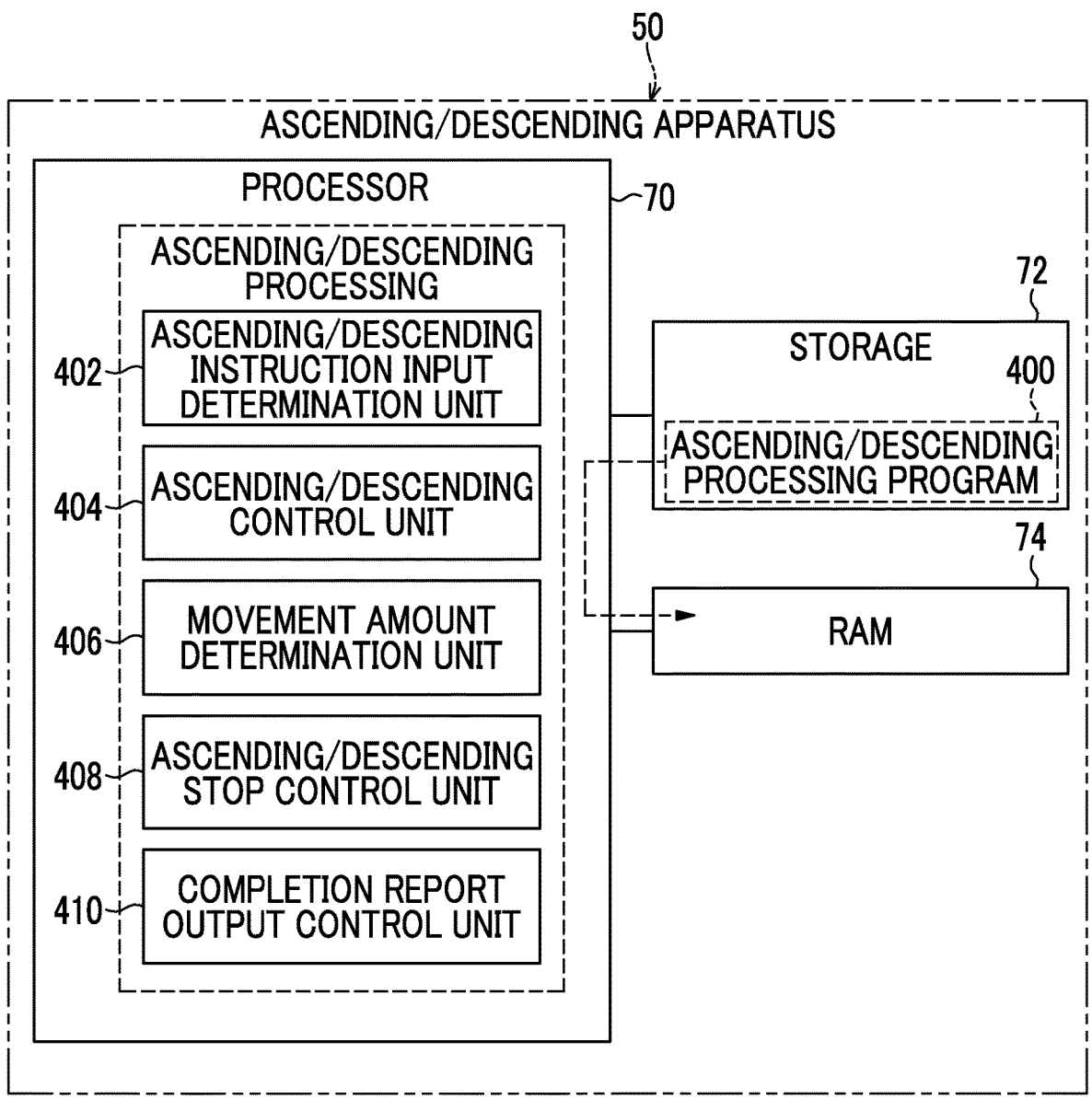
FIG. 8 is a block diagram showing an example of a functional configuration of the ascending/descending apparatus according to the present embodiment.

As an example shown in FIG. 8, an ascending/descending processing program 400 is stored in the storage 72 of the ascending/descending apparatus 50. In the ascending/descending apparatus 50, the processor 70 reads out the ascending/descending processing program 400 from the storage 72 and executes the read ascending/descending processing program 400 on the RAM 74. The processor 70 performs ascending/descending processing according to the ascending/descending processing program 400 executed on the RAM 74.

The processor 70 operates as an ascending/descending instruction input determination unit 402, an ascending/descending control unit 404, a movement amount determination unit 406, an ascending/descending stop control unit 408, and a completion report output control unit 410 by executing the ascending/descending processing program 400.

Figure 9:
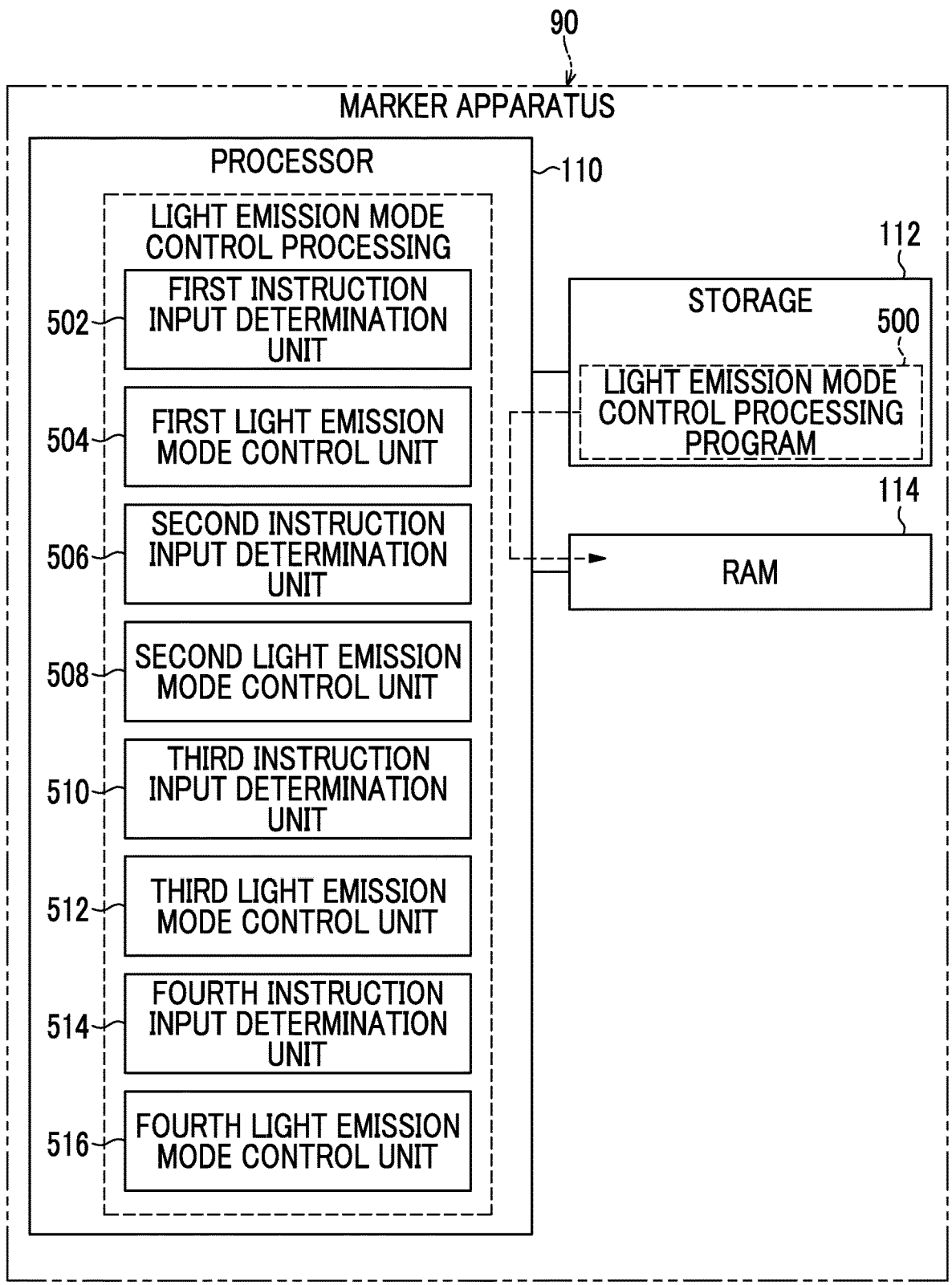
FIG. 9 is a block diagram showing an example of a functional configuration of the marker apparatus according to the present embodiment.

As an example shown in FIG. 9, a light emission mode control processing program 500 is stored in the storage 112 of the marker apparatus 90. In the marker apparatus 90, the processor 110 reads out an ascending/descending instruction processing program from the storage 112 and executes the read ascending/descending instruction processing program on the RAM 114. The processor 110 performs light emission mode control processing according to the ascending/descending instruction processing program executed on the RAM 114.

The processor 110 operates as a first instruction input determination unit 502, a first light emission mode control unit 504, a second instruction input determination unit 506, a second light emission mode control unit 508, a third instruction input determination unit 510, a third light emission mode control unit 512, a fourth instruction input determination unit 514, and a fourth light emission mode control unit 516 by executing the ascending/descending instruction processing program.

Figure 10:
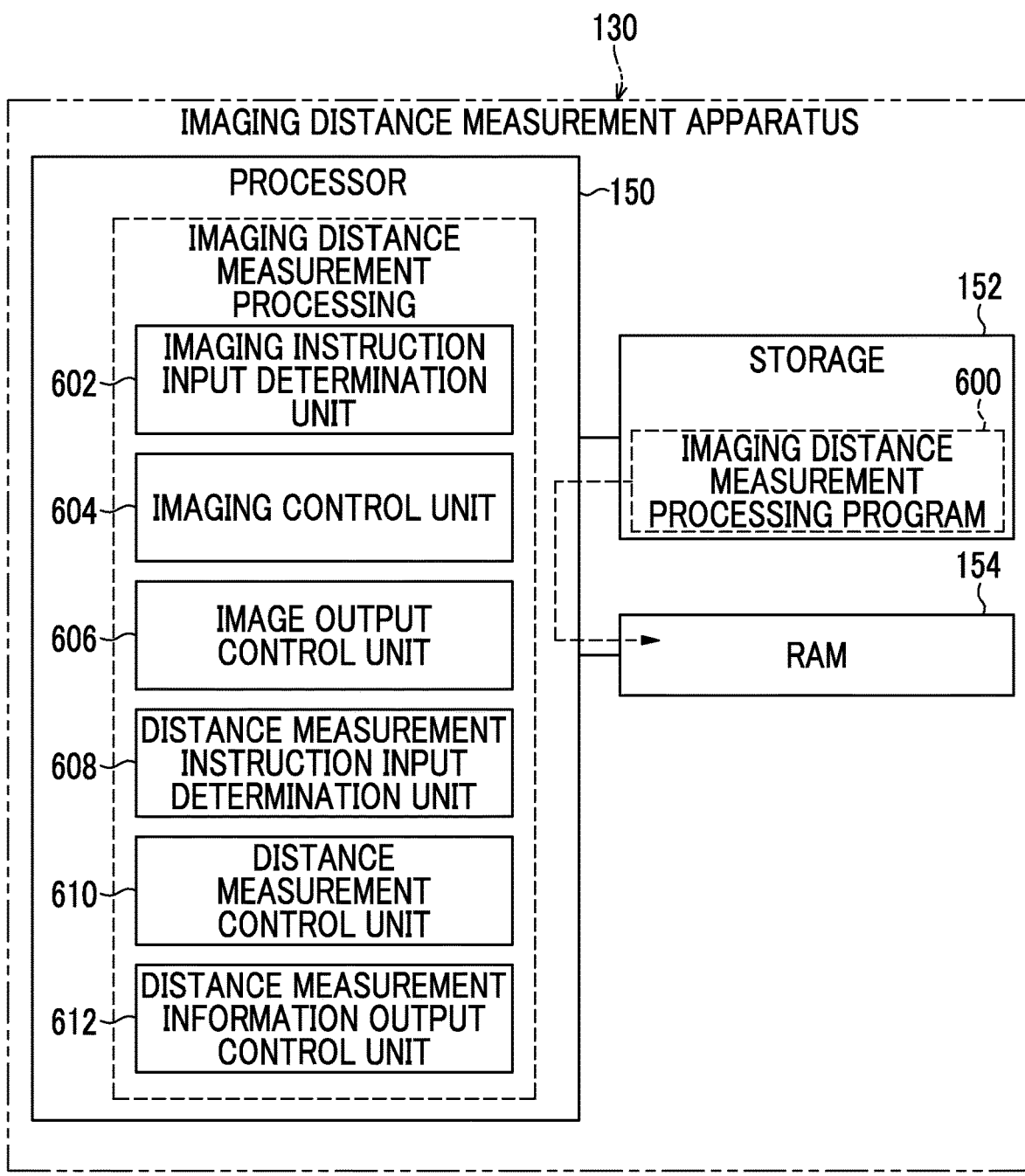
FIG. 10 is a block diagram showing an example of a functional configuration of the imaging distance measurement apparatus according to the present embodiment.

As an example shown in FIG. 10, an imaging distance measurement processing program 600 is stored in the storage 152 of the imaging distance measurement apparatus 130. In the imaging distance measurement apparatus 130, the processor 150 reads out the imaging distance measurement processing program 600 from the storage 152 and executes the read imaging distance measurement processing program 600 on the RAM 154. The processor 150 performs imaging distance measurement processing according to the imaging distance measurement processing program 600 executed on the RAM 154.

The processor 150 operates as an imaging instruction input determination unit 602, an imaging control unit 604, an image output control unit 606, a distance measurement instruction input determination unit 608, a distance measurement control unit 610, and a distance measurement information output control unit 612 by executing the imaging distance measurement processing program 600.

Figure 11:
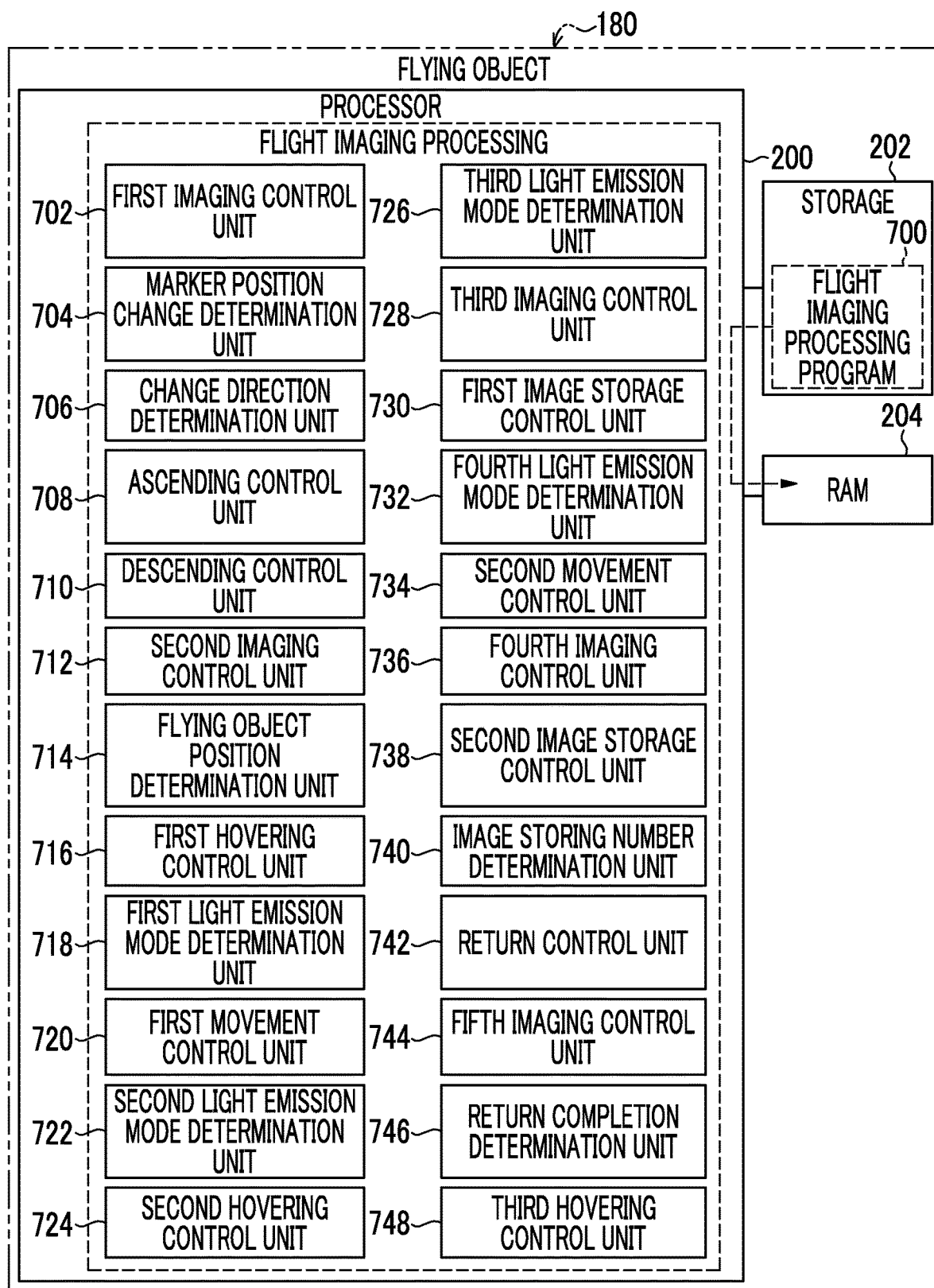
FIG. 11 is a block diagram showing an example of a functional configuration of the flying object according to the present embodiment.

As an example shown in FIG. 11, a flight imaging processing program 700 is stored in the storage 202 of the flying object 180. The flight imaging processing program 700 is an example of a "program" according to the present disclosed technology. In the flying object 180, the processor 200 reads out the flight imaging processing program 700 from the storage 202 and executes the read flight imaging processing program 700 on the RAM 204. The processor 200 performs flight imaging processing according to the flight imaging processing program 700 executed on the RAM 204.

By executing the flight imaging processing program 700, the processor 200 operates as a first imaging control unit 702, a marker position change determination unit 704, a change direction determination unit 706, an ascending control unit 708, a descending control unit 710, a second imaging control unit 712, a flying object position determination unit 714, a first hovering control unit 716, a first light emission mode determination unit 718, a first movement control unit 720, a second light emission mode determination unit 722, a second hovering control unit 724, a third light emission mode determination unit 726, a third imaging control unit 728, a first image storage control unit 730, a fourth light emission mode determination unit 732, a second movement control unit 734, a fourth imaging control unit 736, a second image storage control unit 738, an image storing number determination unit 740, a return control unit 742, a fifth imaging control unit 744, a return completion determination unit 746, and a third hovering control unit 748.

Figure 12:
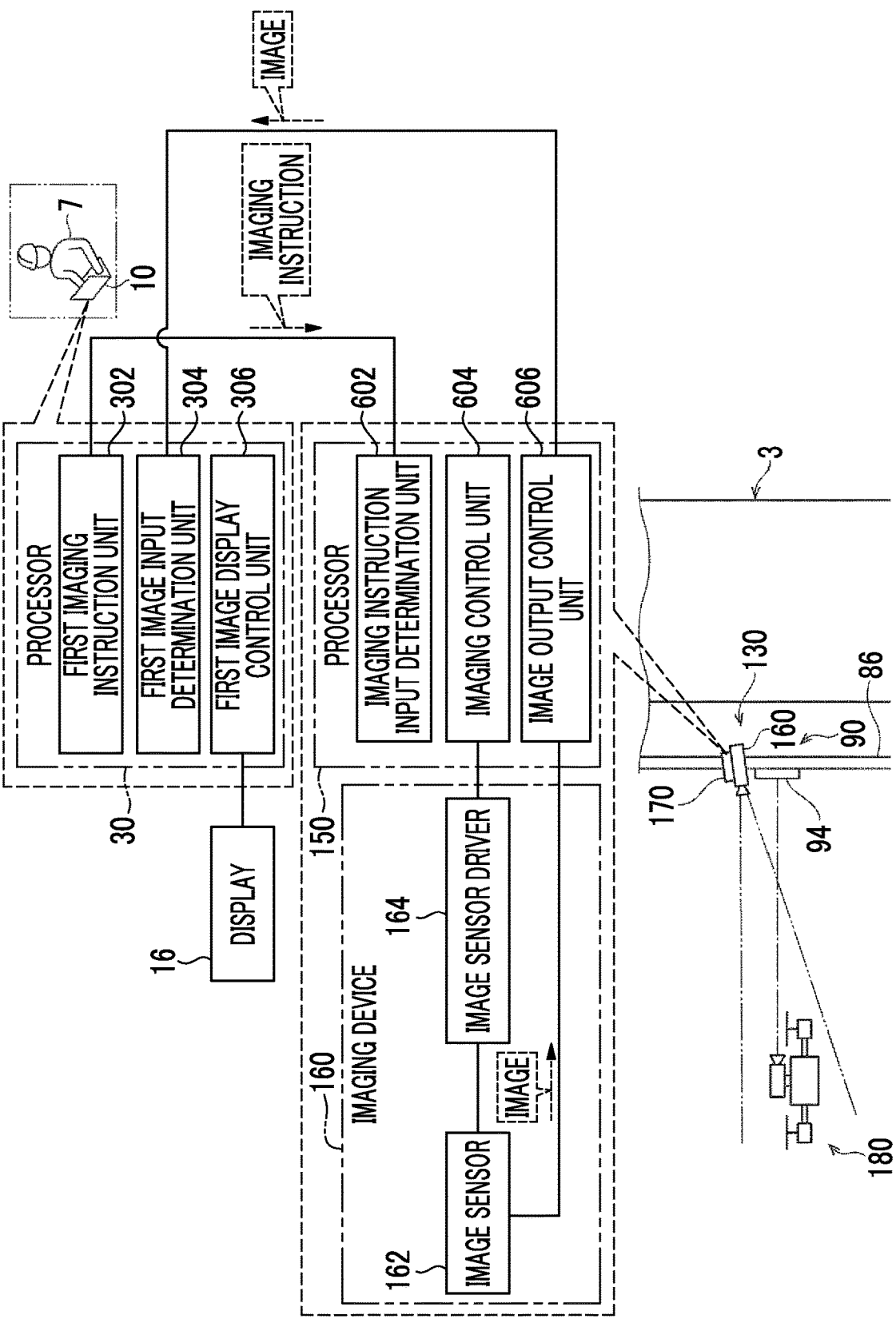
FIG. 12 is a block diagram showing an example of an operation in which the imaging distance measurement apparatus images the flying object based on control performed by the imaging support apparatus according to the present embodiment.

As an example shown in FIG. 12, in the imaging support apparatus 10, the first imaging instruction unit 302 outputs an imaging instruction to the imaging distance measurement apparatus 130.

In the imaging distance measurement apparatus 130, the imaging instruction input determination unit 602 determines whether or not the imaging instruction from the imaging support apparatus 10 is input to the imaging distance measurement apparatus 130. In a case where the imaging instruction input determination unit 602 determines that the imaging instruction from the imaging support apparatus 10 is input to the imaging distance measurement apparatus 130, the imaging control unit 604 performs control of causing the image sensor 162 via the image sensor driver 164 to image the flying object 180. The image output control unit 606 outputs an image obtained by imaging the flying object 180 by the image sensor 162 to the imaging support apparatus 10.

In the imaging support apparatus 10, the first image input determination unit 304 determines whether or not the image from the imaging distance measurement apparatus 130 is input to the imaging support apparatus 10. In a case where the first image input determination unit 304 determines that the image from the imaging distance measurement apparatus 130 is input to the imaging support apparatus 10, the first image display control unit 306 performs control of displaying the image on the display 16. The operator 7 can check a posture and/or position of the flying object 180 based on the image displayed on the display 16.

Figure 13:
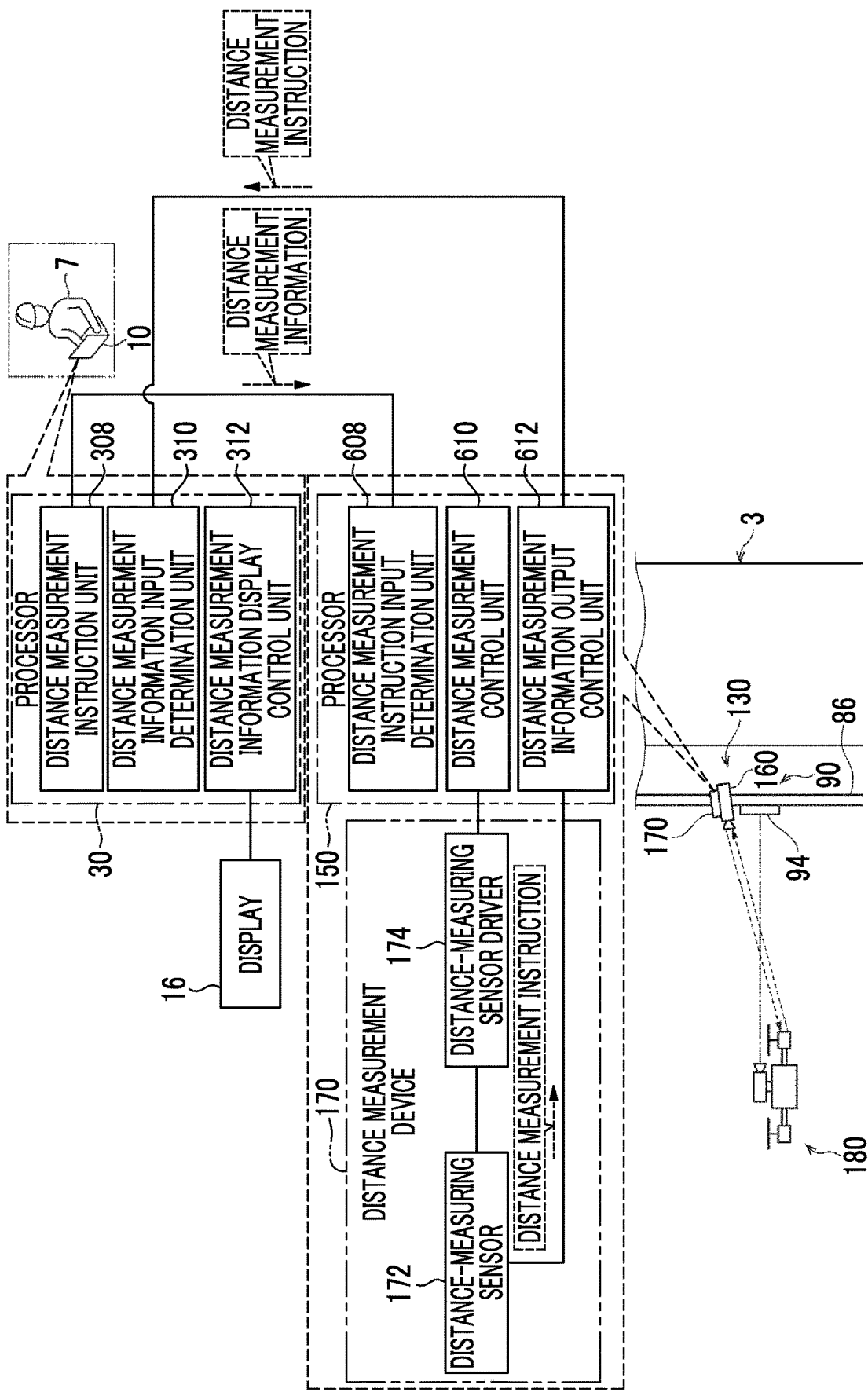
FIG. 13 is a block diagram showing an example of an operation in which the imaging distance measurement apparatus measures a distance between the imaging distance measurement apparatus and the flying object based on the control performed by the imaging support apparatus according to the present embodiment.

As an example shown in FIG. 13, in the imaging support apparatus 10, the distance measurement instruction unit 308 outputs a distance measurement instruction to the imaging distance measurement apparatus 130.

In the imaging distance measurement apparatus 130, the distance measurement instruction input determination unit 608 determines whether or not the distance measurement instruction from the imaging support apparatus 10 is input to the imaging distance measurement apparatus 130. In a case where the distance measurement instruction input determination unit 608 determines that the distance measurement instruction from the imaging support apparatus 10 is input to the imaging distance measurement apparatus 130, the distance measurement control unit 610 performs control of causing the distance-measuring sensor 172 via the distance-measuring sensor driver 174 to measure a distance between the distance measurement device 170 and the flying object 180. A distance between the marker 94 and the flying object 180 and a distance between the inspection target 3 and the flying object 180 are respectively proportional to the distance between the distance measurement device 170 and the flying object 180. The distance between the marker 94 and the flying object 180 is an example of a "first distance" according to the present disclosed technology. The distance between the distance measurement device 170 and the flying object 180 is an example of a "second distance" according to the present disclosed technology. The distance measurement information output control unit 612 outputs distance measurement information, which is obtained by measuring the distance with the distance-measuring sensor 172, to the imaging support apparatus 10.

In the imaging support apparatus 10, the distance measurement information input determination unit 310 determines whether or not the distance measurement information from the imaging distance measurement apparatus 130 is input to the imaging support apparatus 10. In a case where the distance measurement information input determination unit 310 determines that the distance measurement information from the imaging distance measurement apparatus 130 is input to the imaging support apparatus 10, the distance measurement information display control unit 312 performs control of displaying the distance measurement information (for example, a numerical value or the like representing the distance between the distance measurement device 170 and the flying object 180) on the display 16. The operator 7 can check the distance between the distance measurement device 170 and the flying object 180 based on distance measurement information displayed on the display 16. The distance between the distance measurement device 170 and the flying object 180 may be converted into the distance between the marker 94 and the flying object 180.

Figure 14:
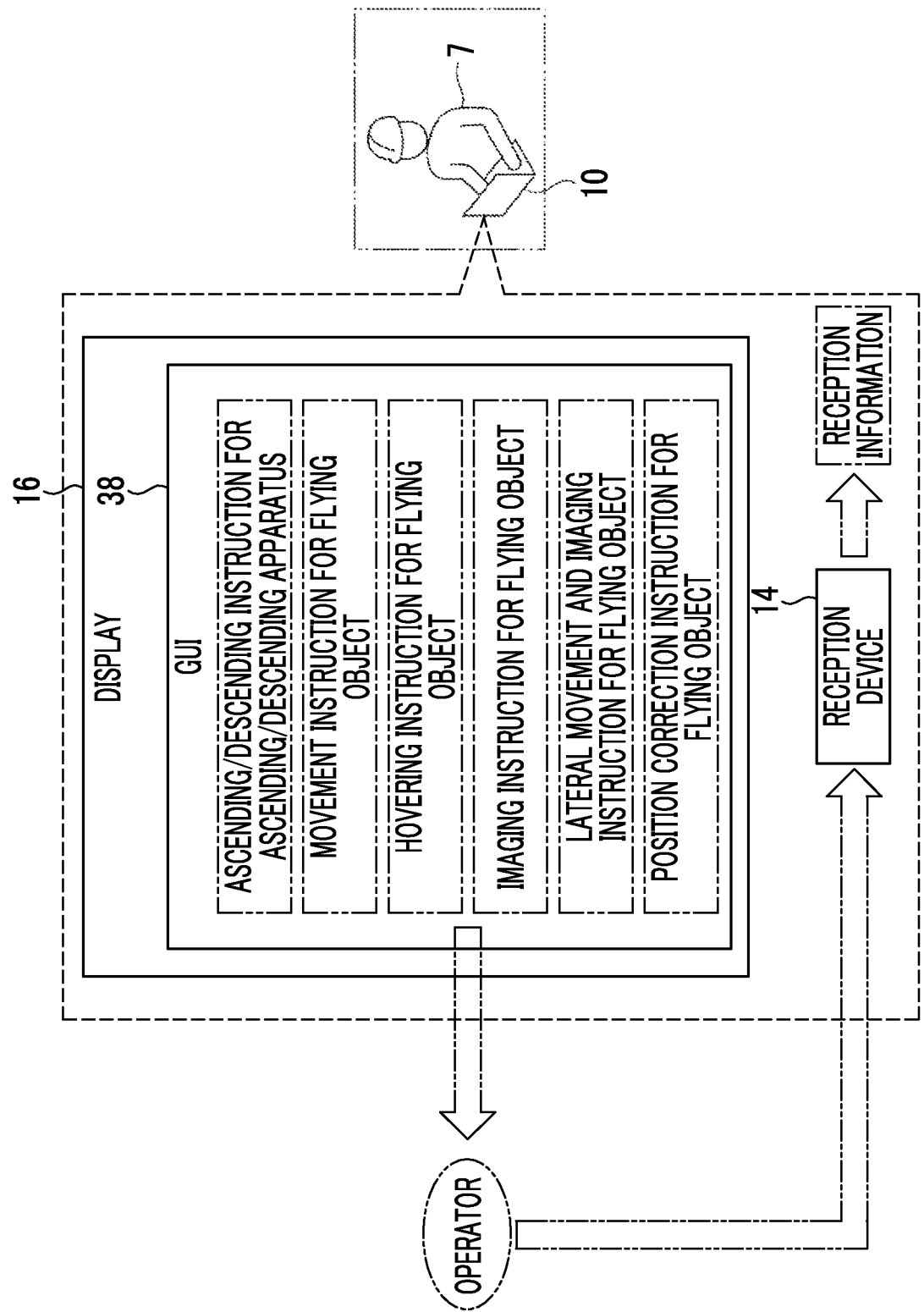
FIG. 14 is a block diagram showing an example of an operation of the imaging support apparatus in a case where an operator inputs an instruction to the imaging support apparatus according to the present embodiment.

As an example shown in FIG. 14, a GUI 38 related to an "ascending/descending instruction for ascending/descending apparatus", a "movement instruction for flying object", a "hovering instruction for flying object", an "imaging instruction for flying object", a "lateral movement and imaging instruction for flying object", and a "position correction instruction for flying object" is displayed on the display 16 of the imaging support apparatus 10. The operator 7 can provide the "ascending/descending instruction for ascending/descending apparatus", the "movement instruction for flying object", the "hovering instruction for flying object", the "imaging instruction for flying object", the "lateral movement and imaging instruction for flying object", and the "position correction instruction for flying object" to the reception device 14 of the imaging support apparatus 10 while looking at the GUI 38 displayed on the display 16. The reception device 14 outputs reception information corresponding to the instruction received by the reception device 14.

The "ascending/descending instruction for ascending/descending apparatus" includes either a first ascending instruction or a first descending instruction. The first ascending instruction is an instruction to make the marker 94 ascend, and the first descending instruction is an instruction to make the marker 94 descend. Further, the "ascending/descending instruction for ascending/descending apparatus" includes an instruction for the movement amount of the marker 94.

The "movement instruction for flying object" includes any one of a second ascending instruction, a second descending instruction, a right movement instruction, a left movement instruction, a forward instruction, or a backward instruction. The second ascending instruction is an instruction to make the flying object 180 ascend. The second descending instruction is an instruction to make the flying object 180 descend. The right movement instruction is an instruction to move the flying object 180 to the right. The left movement instruction is an instruction to move the flying object 180 to the left. The forward instruction is an instruction to move the flying object 180 forward. The backward instruction is an instruction to move the flying object 180 backward. Further, the "movement instruction for flying object" includes an instruction of a movement speed of the flying object 180.

The "hovering instruction for flying object" is an instruction to make the flying object 180 hover. The "imaging instruction for flying object" is an instruction to cause the imaging device 210 of the flying object 180 to perform imaging. The "lateral movement and imaging instruction for flying object" is an instruction to repeatedly perform lateral movement control and imaging control. The lateral movement control is control of moving the flying object 180 laterally. The imaging control is control of causing the imaging device 210 of the flying object 180 to perform imaging. The "position correction instruction for flying object" is an instruction to correct the position of the flying object 180.

The operator 7 provides an instruction to the reception device 14 based on the image and/or the distance measurement information displayed on the display 16. In this case, the operator 7 may provide the movement instruction (that is, the first ascending instruction, the first descending instruction, the second ascending instruction, the second descending instruction, the right movement instruction, the left movement instruction, the forward instruction, and/or the backward instruction) to the reception device 14 based on the image obtained by being captured by the imaging device 160. Further, the operator 7 may provide the forward instruction or the backward instruction to the reception device 14 such that the distance between the distance measurement device 170 and the flying object 180 is set to a default distance based on the distance measurement information obtained by measuring the distance with the distance measurement device 170.

Figure 15:
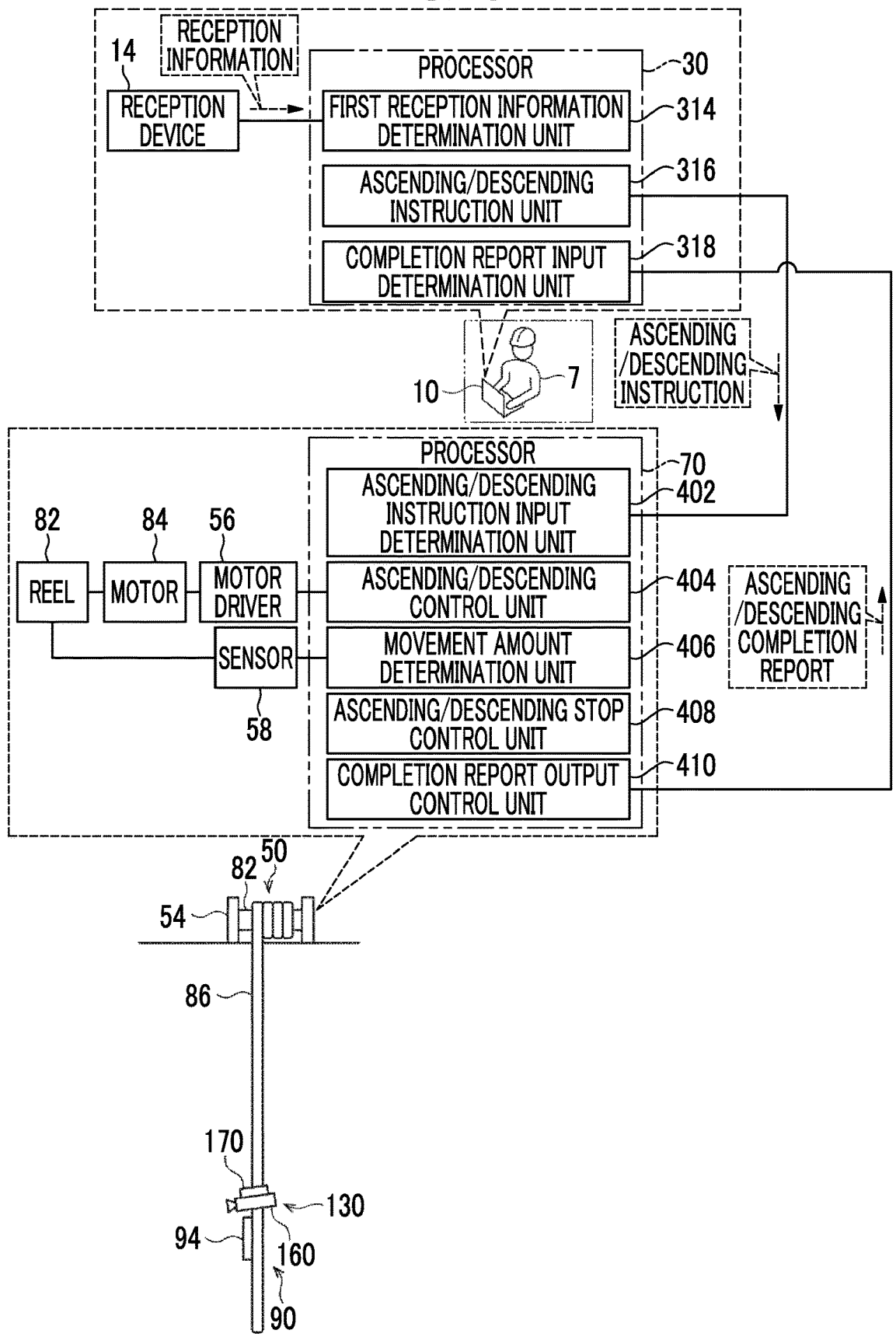
FIG. 15 is a block diagram showing an example of an operation in which the ascending/descending apparatus makes a marker ascend or descend based on the control performed by the imaging support apparatus according to the present embodiment.

As an example shown in FIG. 15, in the imaging support apparatus 10, the first reception information determination unit 314 determines whether or not the "ascending/descending instruction for ascending/descending apparatus" as the reception information is received by the reception device 14. In a case where the first reception information determination unit 314 determines that the "ascending/descending instruction for ascending/descending apparatus" as the reception information is received by the reception device 14, the ascending/descending instruction unit 316 outputs the ascending/descending instruction to the ascending/descending apparatus 50.

In the ascending/descending apparatus 50, the ascending/descending instruction input determination unit 402 determines whether or not the ascending/descending instruction from the imaging support apparatus 10 is input to the ascending/descending apparatus 50. In a case where the ascending/descending instruction input determination unit 402 determines that the ascending/descending instruction from the imaging support apparatus 10 is input to the ascending/descending apparatus 50, the ascending/descending control unit 404 performs control of causing the motor 84 via the motor driver 56 to rotate the reel 82 in accordance with the ascending/descending instruction. Specifically, in a case where the ascending/descending instruction includes the first ascending instruction, the ascending/descending control unit 404 performs control of causing the motor 84 via the motor driver 56 to rotate the reel 82 in the first direction. In a case where the reel 82 is rotated in the first direction, the cable 86 is wound around the reel 82 and then the markers 94 ascends. On the other hand, in a case where the ascending/descending instruction includes the first descending instruction, the ascending/descending control unit 404 performs control of causing the motor 84 via the motor driver 56 to rotate the reel 82 in the second direction. In a case where the reel 82 is rotated in the second direction, the cable 86 is unwound from the reel 82 and then the markers 94 descends. In a case where the reel 82 is rotated, a signal corresponding to the rotation amount of the reel 82 is output from the sensor 58. The rotation amount of the reel 82 is proportional to the movement amount of the marker 94.

The movement amount determination unit 406 determines whether or not the movement amount of the marker 94 has reached the designated movement amount that is designated through the ascending/descending instruction, based on the signal input from the sensor 58. In a case where the movement amount determination unit 406 determines that the movement amount of the marker 94 has reached the designated movement amount, the ascending/descending stop control unit 408 performs control of causing the motor 84 via the motor driver 56 to stop rotation. In a case where the rotation of the motor 84 is stopped, the rotation of the reel 82 is stopped, which stops ascending or descending of the marker 94. The completion report output control unit 410 outputs an ascending/descending completion report of the fact that the ascending/descending of the marker 94 is completed to the imaging support apparatus 10, after the ascending/descending stop control unit 408 controls the motor 84 to stop rotating.

In the imaging support apparatus 10, the completion report input determination unit 318 determines whether or not the ascending/descending completion report from the ascending/descending apparatus 50 is input to the imaging support apparatus 10.

Figure 16:
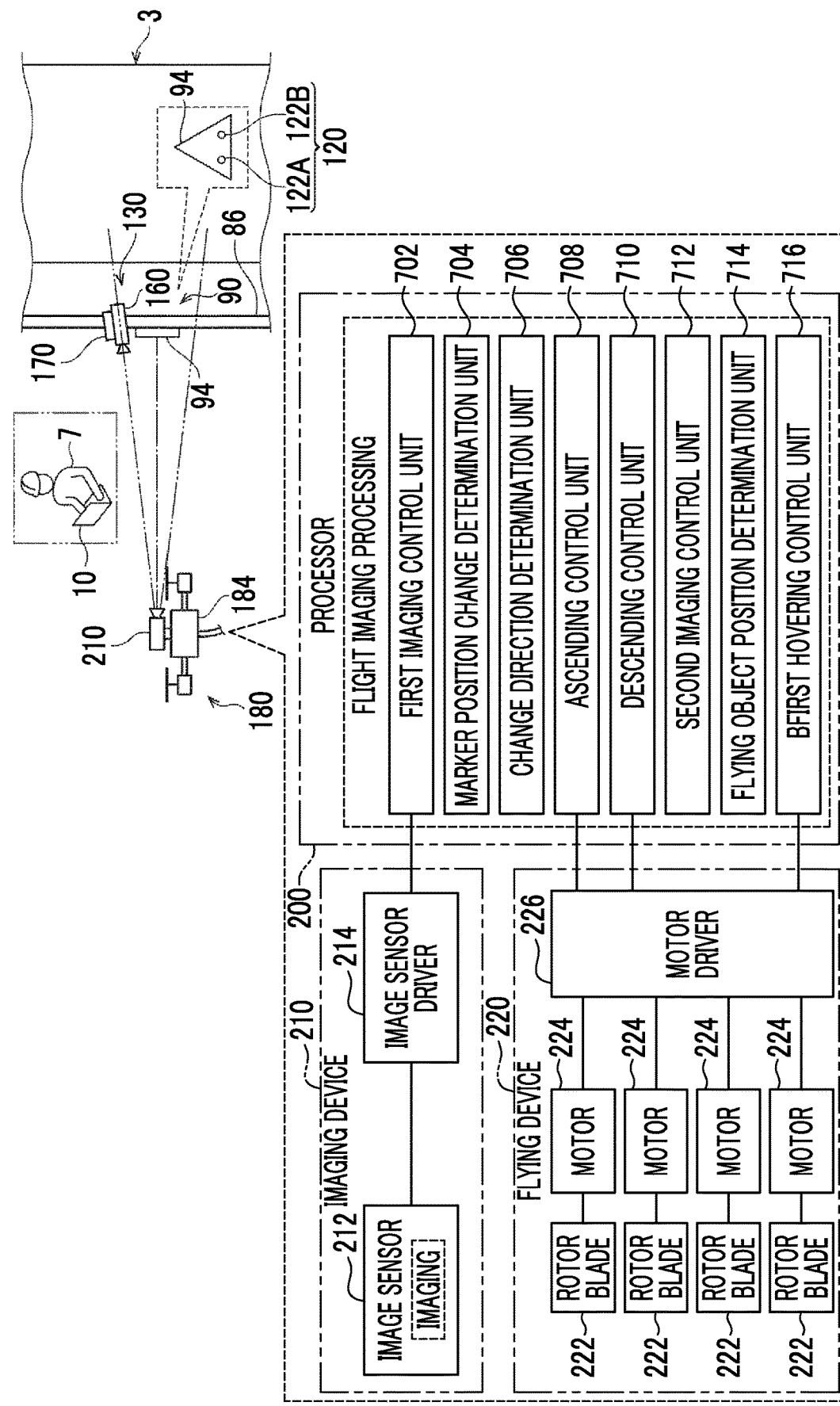
FIG. 16 is a block diagram showing an example of an operation in which the flying object sets a position in a vertical direction based on a position of the marker in the vertical direction according to the present embodiment.

As an example shown in FIG. 16, in the flying object 180, the first imaging control unit 702 performs control of causing the image sensor 212 via the image sensor driver 214 to capture an imaging scene that includes the marker 94 in a part thereof. The marker 94 is reflected as a figure in a part of the image obtained by being captured by the image sensor 212. By reflecting the marker 94 as a figure in a part of the image, a position of the marker 94 in the vertical direction with respect to the flying object 180 is detected. That is, in a case where the marker 94 is reflected as a figure on an upper side of the center part in the image, detection is made that the marker 94 is positioned on an upper side of the flying object 180 in the vertical direction, and in a case where the marker 94 is reflected as a figure on a lower side of the center part in the image, detection is made that the marker 94 is positioned on a lower side of the flying object 180 in the vertical direction. As will be described later, since a light emission mode including blinking of the light emitting body 120 is determined based on the image, the first imaging control unit 702 causes the image sensor 212 to capture an image having the number of frames that can determine the light emission mode including blinking of the light emitting body 120.

While the flight imaging processing is repeatedly executed, the marker position change determination unit 704 acquires an image obtained in the previous flight imaging processing (hereinafter, referred to as the previous image) and an image obtained in the current flight imaging processing (hereinafter, referred to as the current image). The marker position change determination unit 704 determines whether or not the position of the marker 94 is changed in the vertical direction by comparing the previous image with the current image and by using, for example, object detection processing. As described above, the position of the marker 94 in the vertical direction is detected based on the image obtained by capturing the imaging scene with the image sensor 212 in accordance with an instruction from the first imaging control unit 702. In the initial flight imaging processing, the marker position change determination unit 704 determines that the position of the marker 94 is not changed in the vertical direction.

In a case where the marker position change determination unit 704 determines that the position of the marker 94 is changed in the vertical direction, the change direction determination unit 706 determines whether or not the position of the marker 94 is changed to the upper side based on the previous image and the current image. In a case where the change direction determination unit 706 determines that the position of the marker 94 is changed to the upper side, the ascending control unit 708 performs control of causing the plurality of motors 224 via the motor driver 226 to increase the rotation speeds. In a case where the rotation speeds of the plurality of motors 224 are increased, the thrust by the plurality of rotor blades 222 is increased, and then the flying object 180 ascends. As the flying object 180 ascends, the position of the flying object 180 in the vertical direction is changed to the upper side. In a case where the change direction determination unit 706 determines that the position of the marker 94 is not changed to the upper side, the descending control unit 710 performs control of causing the plurality of motors 224 via the motor driver 226 to decrease the rotation speeds. In a case where the rotation speeds of the plurality of motors 224 are decreased, the thrust by the plurality of rotor blades 222 is decreased, and then the flying object 180 descends. As the flying object 180 descends, the position of the flying object 180 in the vertical direction is changed to the lower side.

The second imaging control unit 712 performs control of causing the image sensor 212 via the image sensor driver 214 to capture an imaging scene that includes the marker 94 in a part thereof. The marker 94 is reflected as a figure in a part of the image obtained by being captured by the image sensor 212. The flying object position determination unit 714 acquires the image obtained by being captured with the image sensor 212 in accordance with an instruction from the second imaging control unit 712. The flying object position determination unit 714 determines whether or not the position of the flying object 180 in the vertical direction is the same as the position of the marker 94 in the vertical direction by determining whether or not the marker 94 is disposed in the center part of the image in the longitudinal direction on the image. As an example, the position of the flying object 180 in the vertical direction is the same as the position of the marker 94 in the vertical direction preferably means that the position includes an error within 10 cm or less in the vertical direction, in a case where the number of pixels of the image sensor 212 in the vertical direction is 1000 pixels, and in a case where the distance between the imaging device 210 and the marker 94 is substantially 100 cm, and more preferably, means that the position includes an error within 10 mm or less in the vertical direction.

In a case where the flying object position determination unit 714 determines that the position of the flying object 180 in the vertical direction is the same as the position of the marker 94 in the vertical direction, the first hovering control unit 716 performs control of adjusting the rotation speeds with respect to the plurality of motors 224 via the motor driver 226 such that the flying object 180 hovers. As the flying object 180 hovers, the position of the flying object 180 in the vertical direction is set at a height at which the marker 94 is disposed at the center part of the image in the longitudinal direction on the image. In a case where the flying object 180 hovers, the position of the flying object 180 in the vertical direction is maintained.

As an example, in the example shown in FIG. 16, although the imaging device 210 is fixed to the flying object main body 184 in a horizontal state, in a case where the imaging device 210 is fixed to the flying object main body 184 in a inclined state with respect to the horizontal direction, the position of flying object 180 in the vertical direction with respect to the position of marker 94 in the vertical direction may be derived based on an elevation angle or a depression angle of the imaging device 210.

Figure 17:
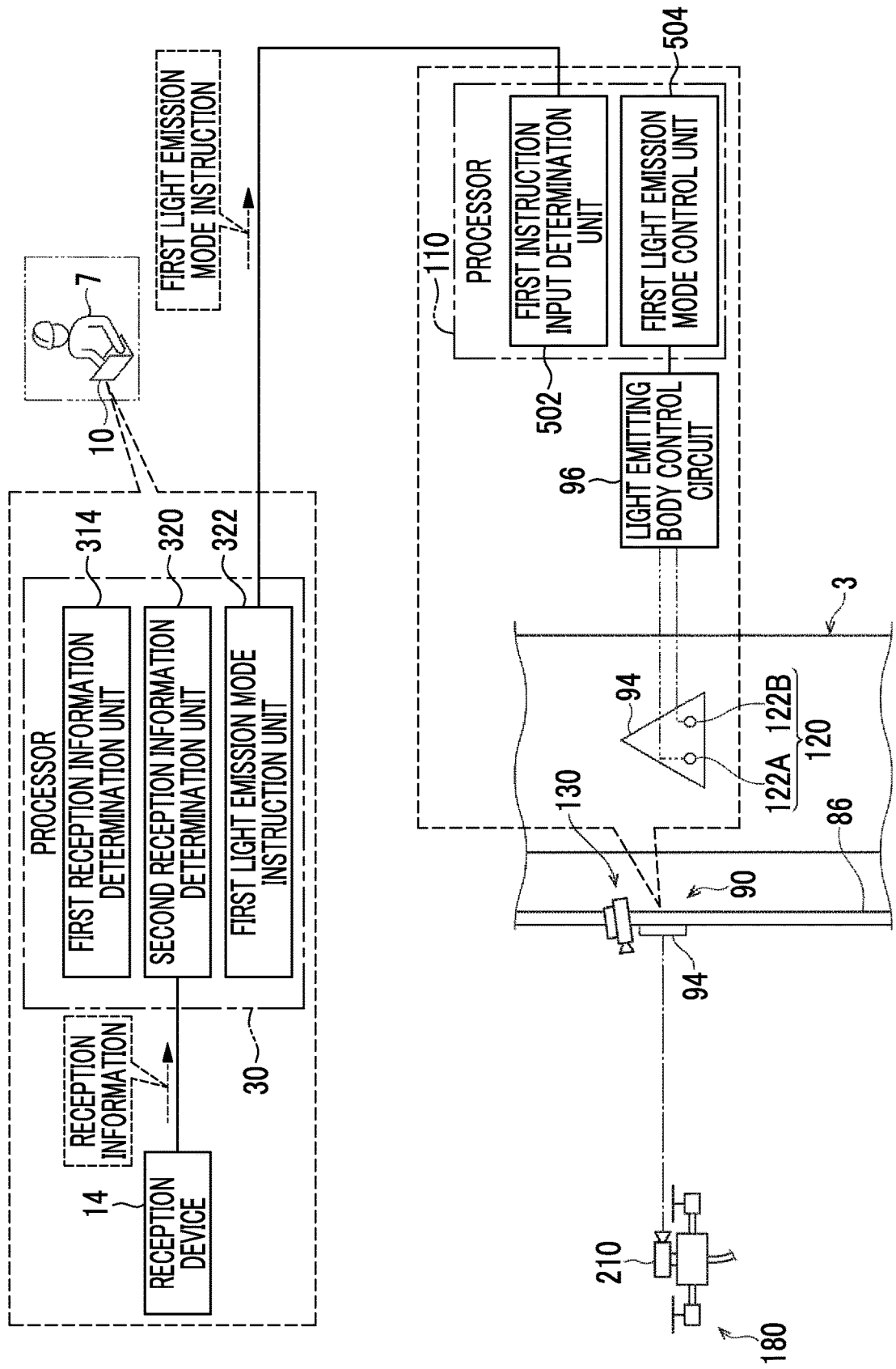
FIG. 17 is a block diagram showing an example of an operation in which a light emitting body emits light in a first light emission mode based on the control performed by the imaging support apparatus according to the present embodiment.

As an example shown in FIG. 17, in the imaging support apparatus 10, in a case where the first reception information determination unit 314 determines that the "ascending/descending instruction for ascending/descending apparatus" as the reception information is not received by the reception device 14, the second reception information determination unit 320 determines whether or not the "movement instruction for flying object" as the reception information is received by the reception device 14.

In a case where the second reception information determination unit 320 determines that the "movement instruction for flying object" as the reception information is received by the reception device 14, the first light emission mode instruction unit 322 outputs a first light emission mode instruction corresponding to the movement instruction to the marker apparatus 90. Specifically, in a case where the movement instruction includes the second ascending instruction, the first light emission mode instruction unit 322 outputs the first light emission mode instruction corresponding to the second ascending instruction to the marker apparatus 90. In a case where the movement instruction includes the second descending instruction, the first light emission mode instruction unit 322 outputs the first light emission mode instruction corresponding to the second descending instruction to the marker apparatus 90. In a case where the movement instruction includes the right movement instruction, the first light emission mode instruction unit 322 outputs the first light emission mode instruction corresponding to the right movement instruction to the marker apparatus 90. In a case where the movement instruction includes the left movement instruction, the first light emission mode instruction unit 322 outputs the first light emission mode instruction corresponding to the left movement instruction to the marker apparatus 90. In a case where the movement instruction includes the forward instruction, the first light emission mode instruction unit 322 outputs the first light emission mode instruction corresponding to the forward instruction to the marker apparatus 90. In a case where the movement instruction includes the backward instruction, the first light emission mode instruction unit 322 outputs the first light emission mode instruction corresponding to the backward instruction to the marker apparatus 90. The first light emission mode instruction unit 322 includes an instruction, which corresponds to the movement speed designated by the movement instruction, in the first light emission mode instruction.

In the marker apparatus 90, the first instruction input determination unit 502 determines whether or not the first light emission mode instruction from the imaging support apparatus 10 is input to the marker apparatus 90. In a case where the first instruction input determination unit 502 determines that the first light emission mode instruction from the imaging support apparatus 10 is input to the marker apparatus 90, the first light emission mode control unit 504 performs control of causing the light emitting body 120 via the light emitting body control circuit 96 to emit light in the first light emission mode in accordance with the first light emission mode instruction.

Figure 18:
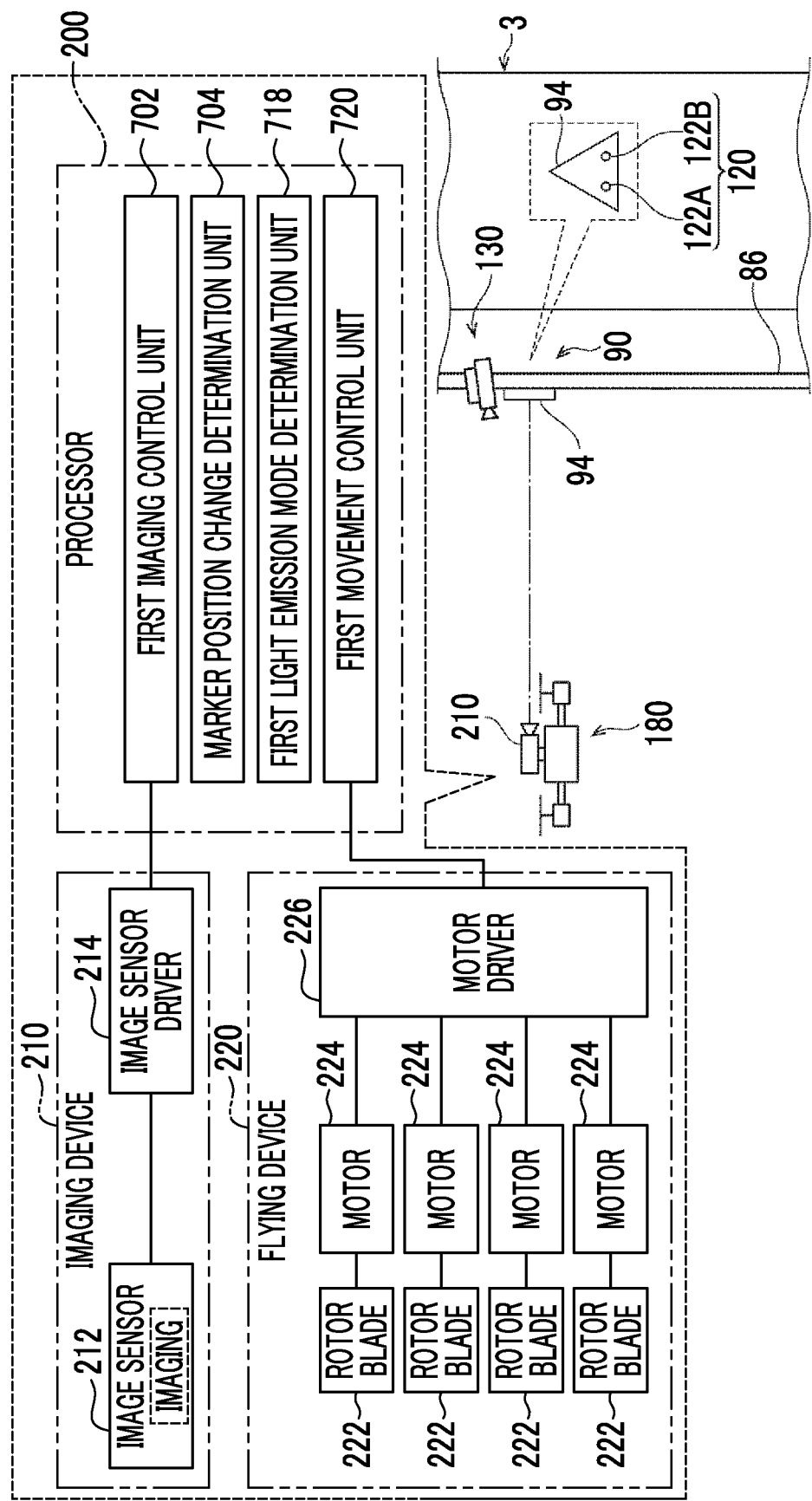
FIG. 18 is a block diagram showing an example of an operation in which the flying object flies based on light emission due to the first light emission mode of the light emitting body according to the present embodiment.

As an example shown in FIG. 18, in the flying object 180, in a case where the marker position change determination unit 704 determines that the position of the marker 94 is not changed, the first light emission mode determination unit 718 determines whether or not the light emission mode of the light emitting body 120 is the first light emission mode based on the image obtained by being captured with the image sensor 212 in accordance with the instruction from the first imaging control unit 702. The first light emission mode of the light emitting body 120 will be described in detail later with reference to FIGS. 19 to 24. In a case where the first light emission mode determination unit 718 determines that the light emission mode of the light emitting body 120 is the first light emission mode, the first movement control unit 720 performs control of adjusting the rotation speeds with respect to the plurality of motors 224 via the motor driver 226 such that the flying object 180 moves according to the first light emission mode. The control performed by the first movement control unit 720 according to the first light emission mode is an example of a "first control" according to the present disclosed technology.

Figure 19:
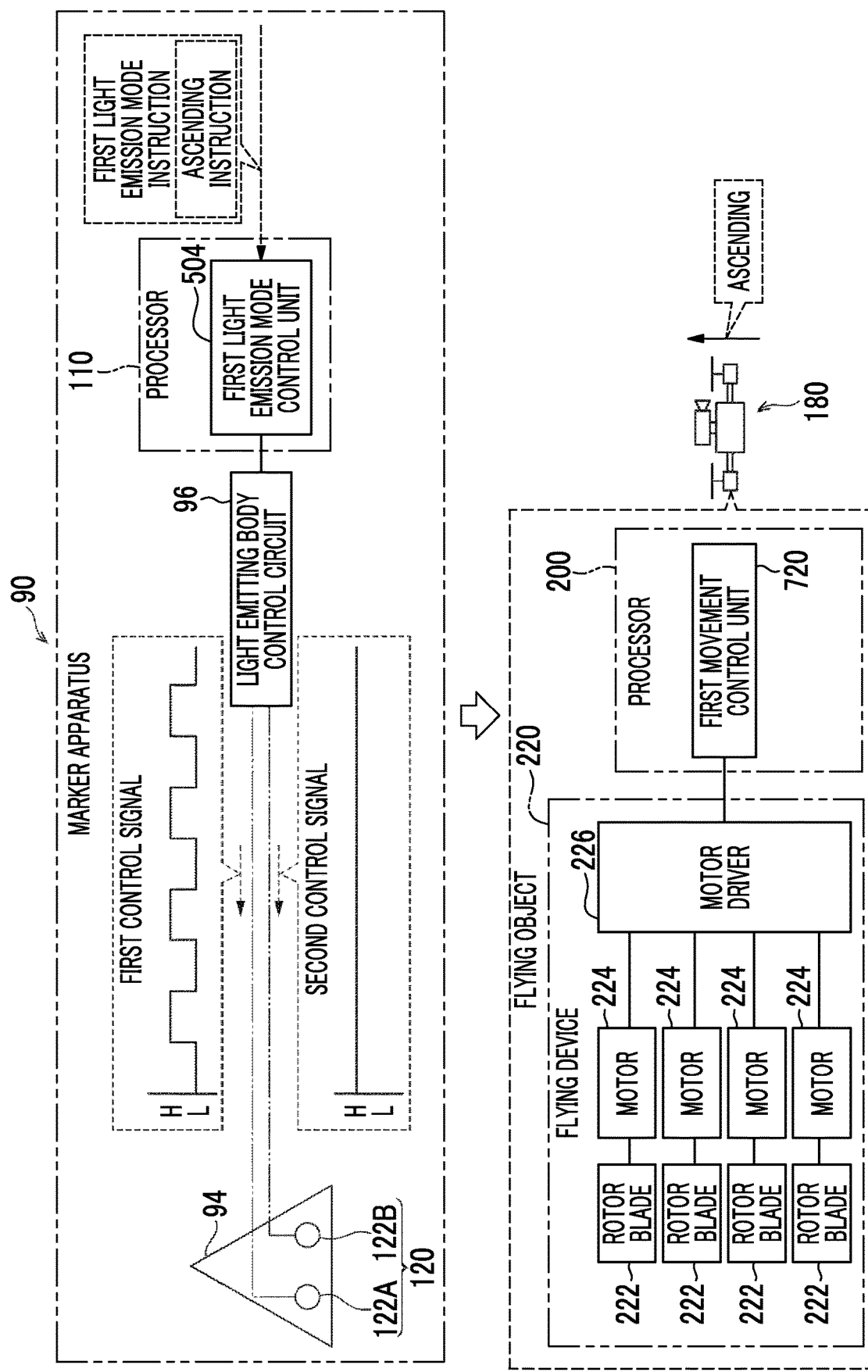
FIG. 19 is a block diagram showing an example of an operation in which the flying object ascends based on a first example of the first light emission mode of the light emitting body according to the present embodiment.

As an example shown in FIG. 19, in the marker apparatus 90, in a case where the first light emission mode instruction corresponding to the second ascending instruction is received as the first light emission mode instruction, the first light emission mode control unit 504 causes the light emitting body control circuit 96 to output a rectangular signal as the first control signal and maintains a level of the second control signal at an H level. Further, the first light emission mode control unit 504 causes the light emitting body control circuit 96 to output a rectangular signal as the first control signal at a frequency corresponding to the movement speed designated by the first light emission mode instruction. Accordingly, in a case where the first light emission mode control unit 504 receives the first light emission mode instruction corresponding to the ascending instruction, as the first light emission mode of the light emitting body 120, the first light source 122A is turned on and off and the second light source 122B is turned on at a frequency corresponding to the movement speed designated by the first light emission mode instruction.

In the flying object 180, the first movement control unit 720 performs control of causing the plurality of motors 224 via the motor driver 226 to increase the rotation speeds as the first light source 122A is turned on and off and the second light source 122B is turned on. In a case where the rotation speeds of the plurality of motors 224 are increased, the thrust by the plurality of rotor blades 222 is increased, and then the flying object 180 ascends. As the flying object 180 ascends, the position of the flying object 180 in the vertical direction is changed to the upper side. Further, the first movement control unit 720 performs control of adjusting the rotation speeds with respect to the plurality of motors 224 via the motor driver 226 such that the flying object 180 ascends at a movement speed according to the frequency at which the first light source 122A is turned on and off. In a case where the frequency at which the first light source 122A is turned on and off is constant, the first movement control unit 720 maintains an ascending speed of the flying object 180. On the other hand, in a case where the frequency at which the first light source 122A is turned on and off is changed, the first movement control unit 720 changes the ascending speed of the flying object 180. As an example, the first movement control unit 720 increases the ascending speed of the flying object 180 by increasing the rotation speeds of the plurality of motors 224 as the frequency at which the first light source 122A is turned on and off is higher.

Figure 20:
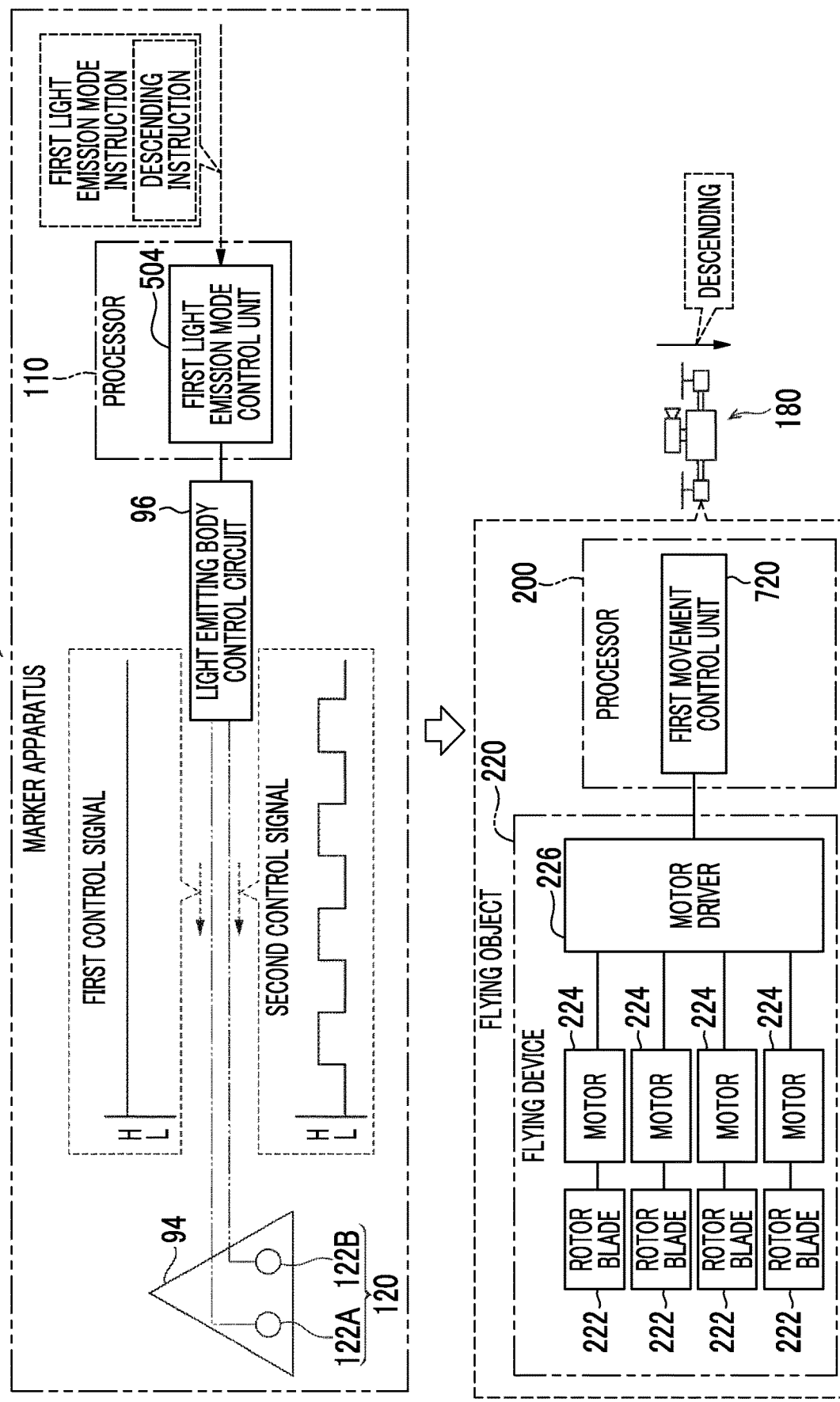
FIG. 20 is a block diagram showing an example of an operation in which the flying object descends based on a second example of the first light emission mode of the light emitting body according to the present embodiment.

As an example shown in FIG. 20, in the marker apparatus 90, in a case where the first light emission mode instruction corresponding to the second descending instruction is received as the first light emission mode instruction, the first light emission mode control unit 504 causes the light emitting body control circuit 96 to maintain the level of the first control signal at an H level and output a rectangular signal as the second control signal. Further, the first light emission mode control unit 504 causes the light emitting body control circuit 96 to output a rectangular signal as the second control signal at a frequency corresponding to the movement speed designated by the first light emission mode instruction. Accordingly, in a case where the first light emission mode control unit 504 receives the first light emission mode instruction corresponding to the descending instruction, as the first light emission mode of the light emitting body 120, the first light source 122A is turned on, and the second light source 122B is turned on and off at the frequency corresponding to the movement speed designated by the first light emission mode instruction.

In the flying object 180, the first movement control unit 720 performs control of causing the plurality of motors 224 via the motor driver 226 to decrease the rotation speeds as the first light source 122A is turned on and the second light source 122B is turned on and off. In a case where the rotation speeds of the plurality of motors 224 are decreased, the thrust by the plurality of rotor blades 222 is decreased, and then the flying object 180 descends. As the flying object 180 descends, the position of the flying object 180 in the vertical direction is changed to the lower side. Further, the first movement control unit 720 performs control of adjusting the rotation speeds with respect to the plurality of motors 224 via the motor driver 226 such that the flying object 180 descends at the movement speed according to the frequency at which the second light source 122B is turned on and off. In a case where the frequency at which the second light source 122B is turned on and off is constant, the first movement control unit 720 maintains a descending speed of the flying object 180. On the other hand, in a case where the frequency at which the second light source 122B is turned on and off is changed, the first movement control unit 720 changes the descending speed of the flying object 180. As an example, the first movement control unit 720 increases the descending speed of the flying object 180 by decreasing the rotation speeds of the plurality of motors 224 as the frequency at which the second light source 122B is turned on and off is higher.

Figure 21:
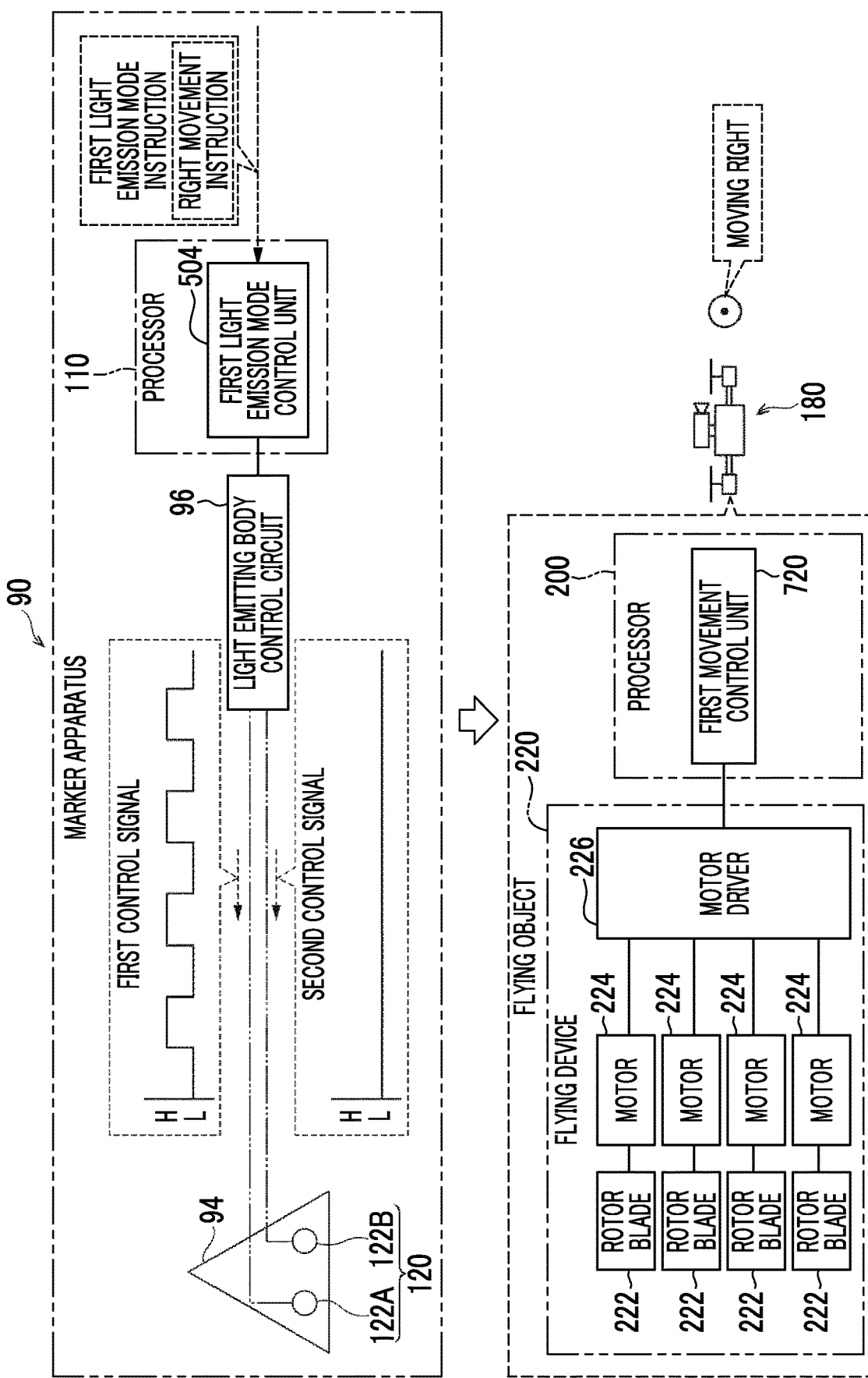
FIG. 21 is a block diagram showing an example of an operation in which the flying object moves to the right based on a third example of the first light emission mode of the light emitting body according to the present embodiment.

As an example shown in FIG. 21, in the marker apparatus 90, in a case where the first light emission mode instruction corresponding to the right movement instruction is received as the first light emission mode instruction, the first light emission mode control unit 504 causes the light emitting body control circuit 96 to output a rectangular signal as the first control signal and maintain the level of the second control signal at an L level. Further, the first light emission mode control unit 504 causes the light emitting body control circuit 96 to output a rectangular signal as the first control signal at a frequency corresponding to the movement speed designated by the first light emission mode instruction. Accordingly, in a case where the first light emission mode control unit 504 receives the first light emission mode instruction corresponding to the right movement instruction, as the first light emission mode of the light emitting body 120, the first light source 122A is turned on and off and the second light source 122B is turned off at the frequency corresponding to the movement speed designated by the first light emission mode instruction.

In the flying object 180, the first movement control unit 720 performs control of adjusting the rotation speeds with respect to the plurality of motors 224 via the motor driver 226 such that the flying object 180 moves to the right as the first light source 122A is turned on and off and the second light source 122B is turned off. As the flying object 180 moves to the right, the position of the flying object 180 in the horizontal direction is changed to the right side. Further, the first movement control unit 720 performs control of adjusting the rotation speeds with respect to the plurality of motors 224 via the motor driver 226 such that the flying object 180 moves to the right at the movement speed according to the frequency at which the first light source 122A is turned on and off. In a case where the frequency at which the first light source 122A is turned on and off is constant, the first movement control unit 720 maintains the movement speed of the flying object 180 to the right. On the other hand, in a case where the frequency at which the first light source 122A is turned on and off is changed, the first movement control unit 720 changes the movement speed of the flying object 180 to the right. As an example, the first movement control unit 720 increases the movement speed of the flying object 180 to the right as the frequency at which the first light source 122A is turned on and off is higher. The control of moving the flying object 180 to the right by the first movement control unit 720 is an example of a "movement control" according to the present disclosed technology.

Figure 22:
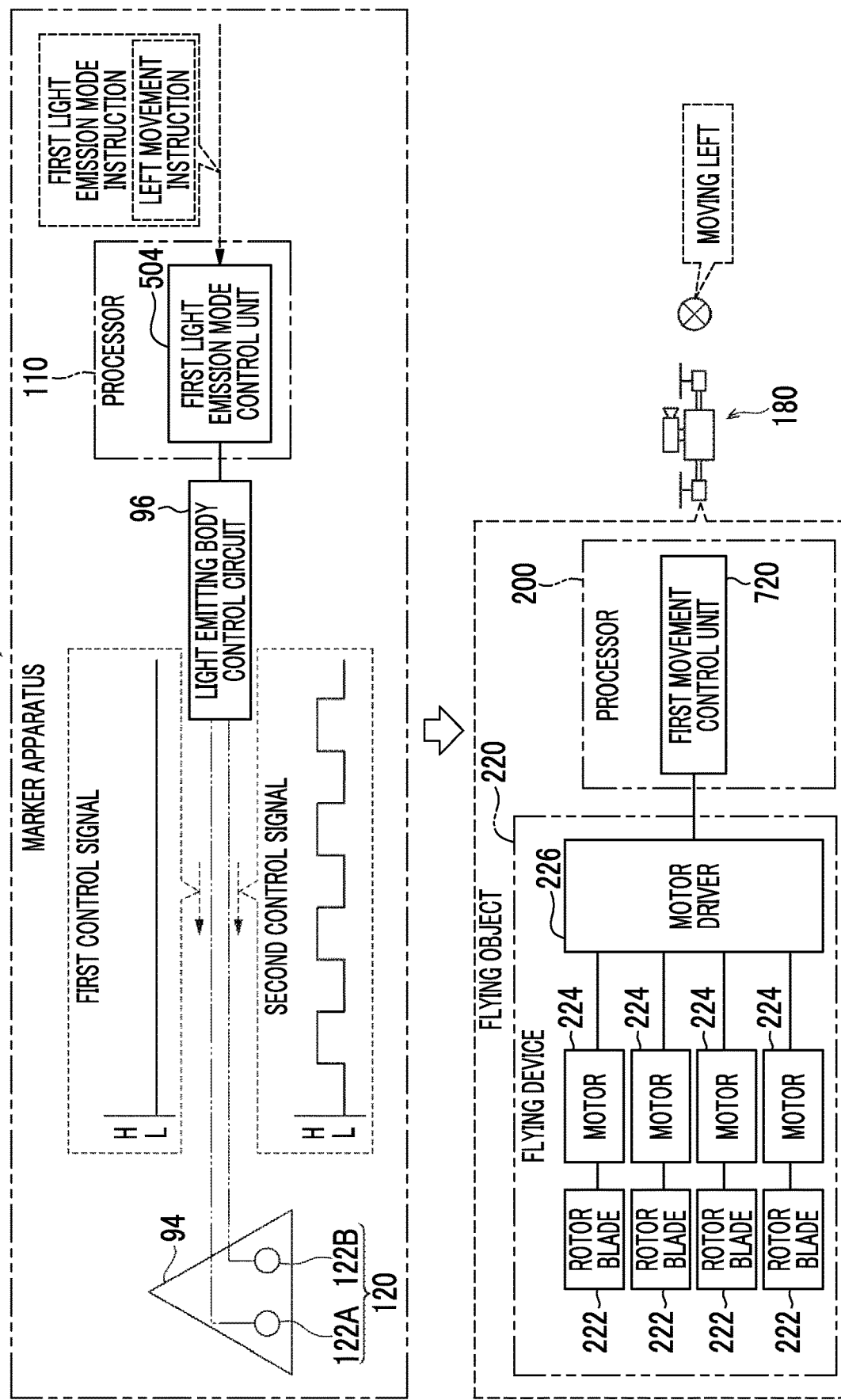
FIG. 22 is a block diagram showing an example of an operation in which the flying object moves to the left based on a fourth example of the first light emission mode of the light emitting body according to the present embodiment.

As an example shown in FIG. 22, in the marker apparatus 90, in a case where the first light emission mode instruction corresponding to the left movement instruction is received as the first light emission mode instruction, the first light emission mode control unit 504 causes the light emitting body control circuit 96 to maintain the level of the first control signal at an L level and output a rectangular signal as the second control signal. Further, the first light emission mode control unit 504 causes the light emitting body control circuit 96 to output a rectangular signal as the second control signal at a frequency corresponding to the movement speed designated by the first light emission mode instruction. Accordingly, in a case where the first light emission mode control unit 504 receives the first light emission mode instruction corresponding to the left movement instruction, as the first light emission mode of the light emitting body 120, the first light source 122A is turned off, and the second light source 122B is turned on and off at the frequency corresponding to the movement speed designated by the first light emission mode instruction.

In the flying object 180, the first movement control unit 720 performs control of adjusting the rotation speeds with respect to the plurality of motors 224 via the motor driver 226 such that the flying object 180 moves to the left as the first light source 122A is turned off and the second light source 122B is turned on and off. As the flying object 180 moves to the left, the position of the flying object 180 in the horizontal direction is changed to the left side. Further, the first movement control unit 720 performs control of adjusting the rotation speeds with respect to the plurality of motors 224 via the motor driver 226 such that the flying object 180 moves to the left at the movement speed according to the frequency at which the second light source 122B is turned on and off. In a case where the frequency at which the second light source 122B is turned on and off is constant, the first movement control unit 720 maintains the movement speed of the flying object 180 to the left. On the other hand, in a case where the frequency at which the second light source 122B is turned on and off is changed, the first movement control unit 720 changes the movement speed of the flying object 180 to the left. As an example, the first movement control unit 720 increases the movement speed of the flying object 180 to the left as the frequency at which the second light source 122B is turned on and off is higher. The control of moving the flying object 180 to the left by the first movement control unit 720 is an example of a "movement control" according to the present disclosed technology.

Figure 23:
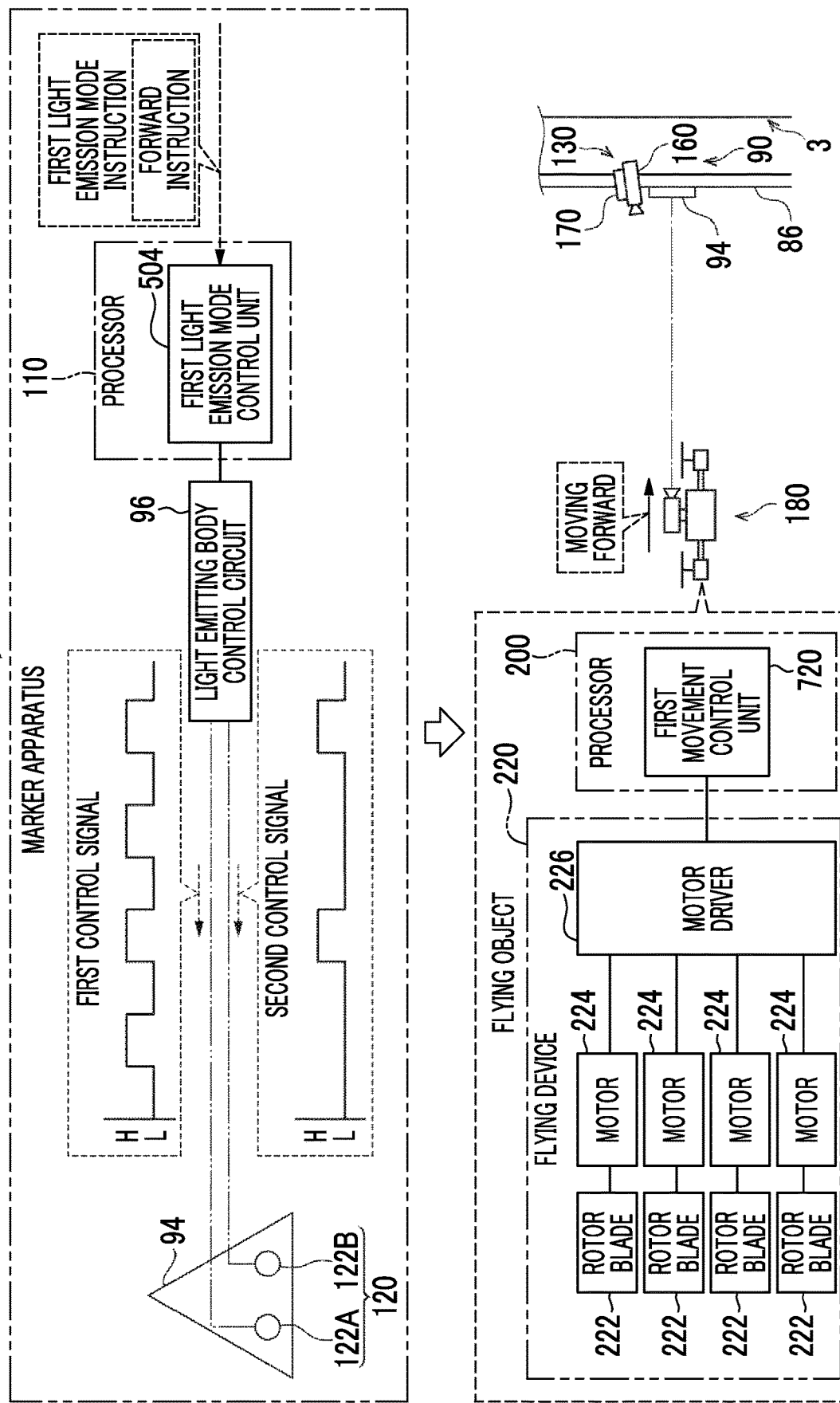
FIG. 23 is a block diagram showing an example of an operation in which the flying object moves forward based on a fifth example of the first light emission mode of the light emitting body according to the present embodiment.

As an example shown in FIG. 23, in the marker apparatus 90, in a case where the first light emission mode instruction corresponding to the forward instruction is received as the first light emission mode instruction, the first light emission mode control unit 504 causes the light emitting body control circuit 96 to output a first rectangular signal as the first control signal and outputs a second rectangular signal having a period twice as long as that of the first rectangular signal as the second control signal. Further, the first light emission mode control unit 504 causes the light emitting body control circuit 96 to output a first rectangular signal as the first control signal and a second rectangular signal as the second control signal at the frequency corresponding to the movement speed designated by the first light emission mode instruction. Accordingly, in a case where the first light emission mode control unit 504 receives the first light emission mode instruction corresponding to the forward instruction, as the first light emission mode of the light emitting body 120, the first light source 122A is turned on and off, and the second light source 122B is turned on and off at a period twice as long as that of the first light source 122A. Further, the first light source 122A and the second light source 122B are turned on and off at the frequency corresponding to the movement speed designated by the first light emission mode instruction.

In the flying object 180, the first movement control unit 720 performs control of adjusting the rotation speeds with respect to the plurality of motors 224 via the motor driver 226 such that the flying object 180 moves forward as the first light source 122A is turned on and off and the second light source 122B is turned on and off at a period twice as long as that of the first light source 122A. As the flying object 180 moves forward, the position of the flying object 180 in the horizontal direction is changed to the front side, and thereby a distance between the marker 94 and the flying object 180 and a distance between the inspection target 3 and the flying object 180 are decreased. Further, the first movement control unit 720 performs control of adjusting the rotation speeds with respect to the plurality of motors 224 via the motor driver 226 such that the flying object 180 moves forward at the movement speed according to the frequency at which the first light source 122A and the second light source 122B are turned on and off. In a case where the frequency at which the first light source 122A and the second light source 122B are turned on and off is constant, the first movement control unit 720 maintains a forward speed of the flying object 180. On the other hand, in a case where the frequency at which the first light source 122A and the second light source 122B are turned on and off is changed, the first movement control unit 720 changes the forward speed of the flying object 180. As an example, the first movement control unit 720 increases the forward speed of the flying object 180 as the frequency at which the first light source 122A and the second light source 122B are turned on and off is higher. The control of moving the flying object 180 forward by the first movement control unit 720 is an example of a "movement control" according to the present disclosed technology.

Figure 24:
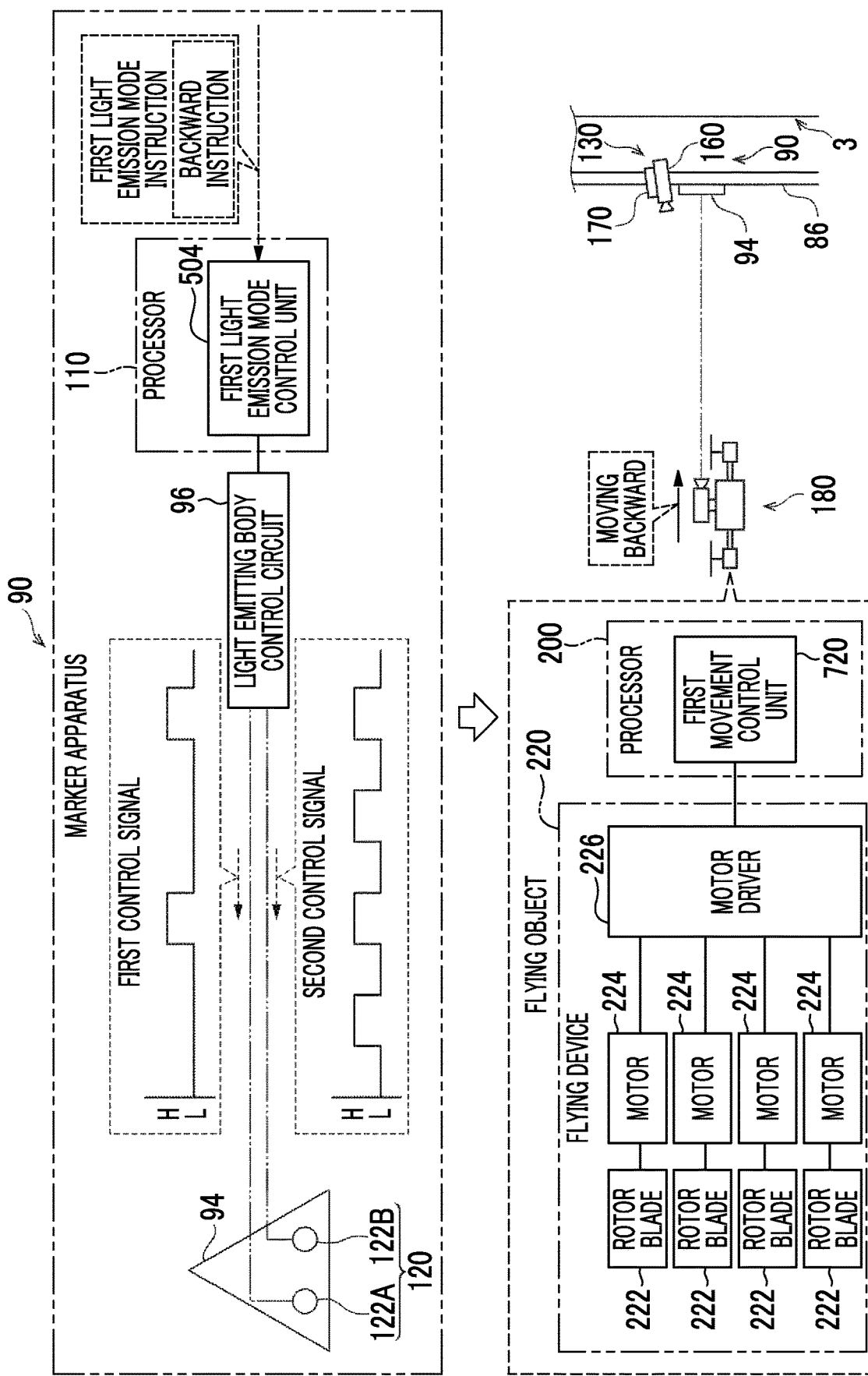
FIG. 24 is a block diagram showing an example of an operation in which the flying object moves backward based on a sixth example of the first light emission mode of the light emitting body according to the present embodiment.

As an example shown in FIG. 24, in the marker apparatus 90, in a case where the first light emission mode instruction corresponding to the backward instruction is received as the first light emission mode instruction, the first light emission mode control unit 504 causes the light emitting body control circuit 96 to output a first rectangular signal as the first control signal and outputs a second rectangular signal having a period half as long as that of the first rectangular signal as the second control signal. Further, the first light emission mode control unit 504 causes the light emitting body control circuit 96 to output a first rectangular signal as the first control signal and a second rectangular signal as the second control signal at the frequency corresponding to the movement speed designated by the first light emission mode instruction. Accordingly, in a case where the first light emission mode control unit 504 receives the first light emission mode instruction corresponding to the backward instruction, as the first light emission mode of the light emitting body 120, the first light source 122A is turned on and off, and the second light source 122B is turned on and off at a period half as long as that of the first light source 122A. Further, the first light source 122A and the second light source 122B are turned on and off at the frequency corresponding to the movement speed designated by the first light emission mode instruction.

In the flying object 180, the first movement control unit 720 performs control of adjusting the rotation speeds with respect to the plurality of motors 224 via the motor driver 226 such that the flying object 180 moves backward as the first light source 122A is turned on and off and the second light source 122B is turned on and off at a period half as long as that of the first light source 122A. As the flying object 180 moves backward, the position of the flying object 180 in the horizontal direction is changed to the rear side, and thereby a distance between the marker 94 and the flying object 180 and a distance between the inspection target 3 and the flying object 180 are increased. Further, the first movement control unit 720 performs control of adjusting the rotation speeds with respect to the plurality of motors 224 via the motor driver 226 such that the flying object 180 moves backward at the movement speed according to the frequency at which the first light source 122A and the second light source 122B are turned on and off. In a case where the frequency at which the first light source 122A and the second light source 122B are turned on and off is constant, the first movement control unit 720 maintains a backward speed of the flying object 180. On the other hand, in a case where the frequency at which the first light source 122A and the second light source 122B are turned on and off is changed, the first movement control unit 720 changes the backward speed of the flying object 180. As an example, the first movement control unit 720 increases the backward speed of the flying object 180 as the frequency at which the first light source 122A and the second light source 122B are turned on and off is higher. The control of moving the flying object 180 backward by the first movement control unit 720 is an example of a "movement control" according to the present disclosed technology.

The operator 7 may provide the forward instruction or the backward instruction to the imaging support apparatus 10 such that the distance between the distance measurement device 170 and the flying object 180 is set to a default distance based on the distance measurement information obtained by measuring the distance with the distance measurement device 170.

Figure 25:
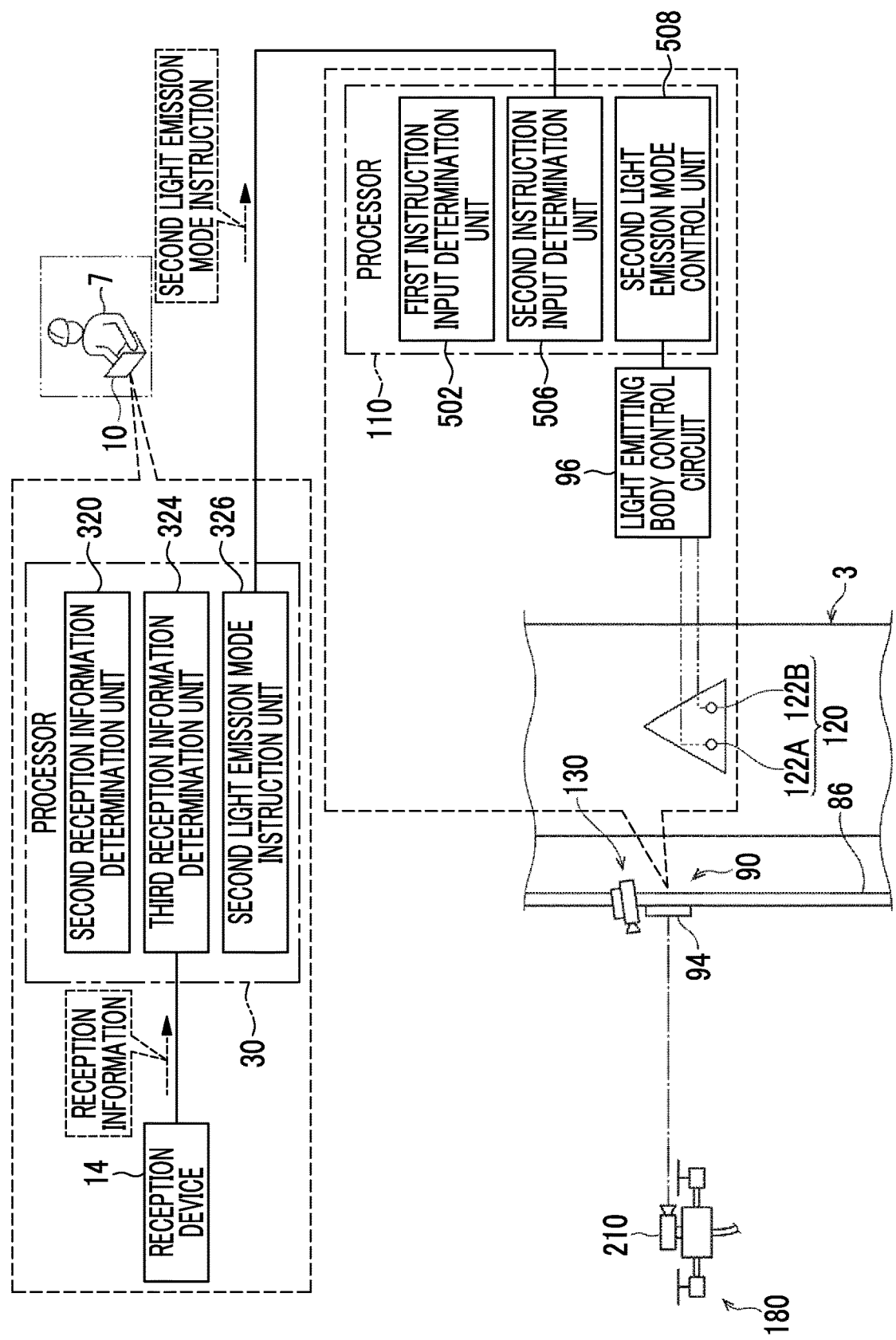
FIG. 25 is a block diagram showing an example of an operation in which the light emitting body emits light in a second light emission mode based on the control performed by the imaging support apparatus according to the present embodiment.

As an example shown in FIG. 25, in the imaging support apparatus 10, in a case where the second reception information determination unit 320 determines that the "movement instruction for flying object" as the reception information is not received by the reception device 14, the third reception information determination unit 324 determines whether or not the "hovering instruction for flying object" as the reception information is received by the reception device 14. In a case where the third reception information determination unit 324 determines that the "hovering instruction for flying object" as the reception information is received by the reception device 14, the second light emission mode instruction unit 326 outputs a second light emission mode instruction corresponding to the hovering instruction to the marker apparatus 90.

In the marker apparatus 90, in a case where the first instruction input determination unit 502 determines that the first light emission mode instruction from the imaging support apparatus 10 is not input to the marker apparatus 90, the second instruction input determination unit 506 determines whether or not the second light emission mode instruction from the imaging support apparatus 10 is input to the marker apparatus 90. In a case where the second instruction input determination unit 506 determines that the second light emission mode instruction from the imaging support apparatus 10 is input to the marker apparatus 90, the second light emission mode control unit 508 performs control of causing the light emitting body 120 via the light emitting body control circuit 96 to emit light in the second light emission mode in accordance with the second light emission mode instruction.

Figure 26:
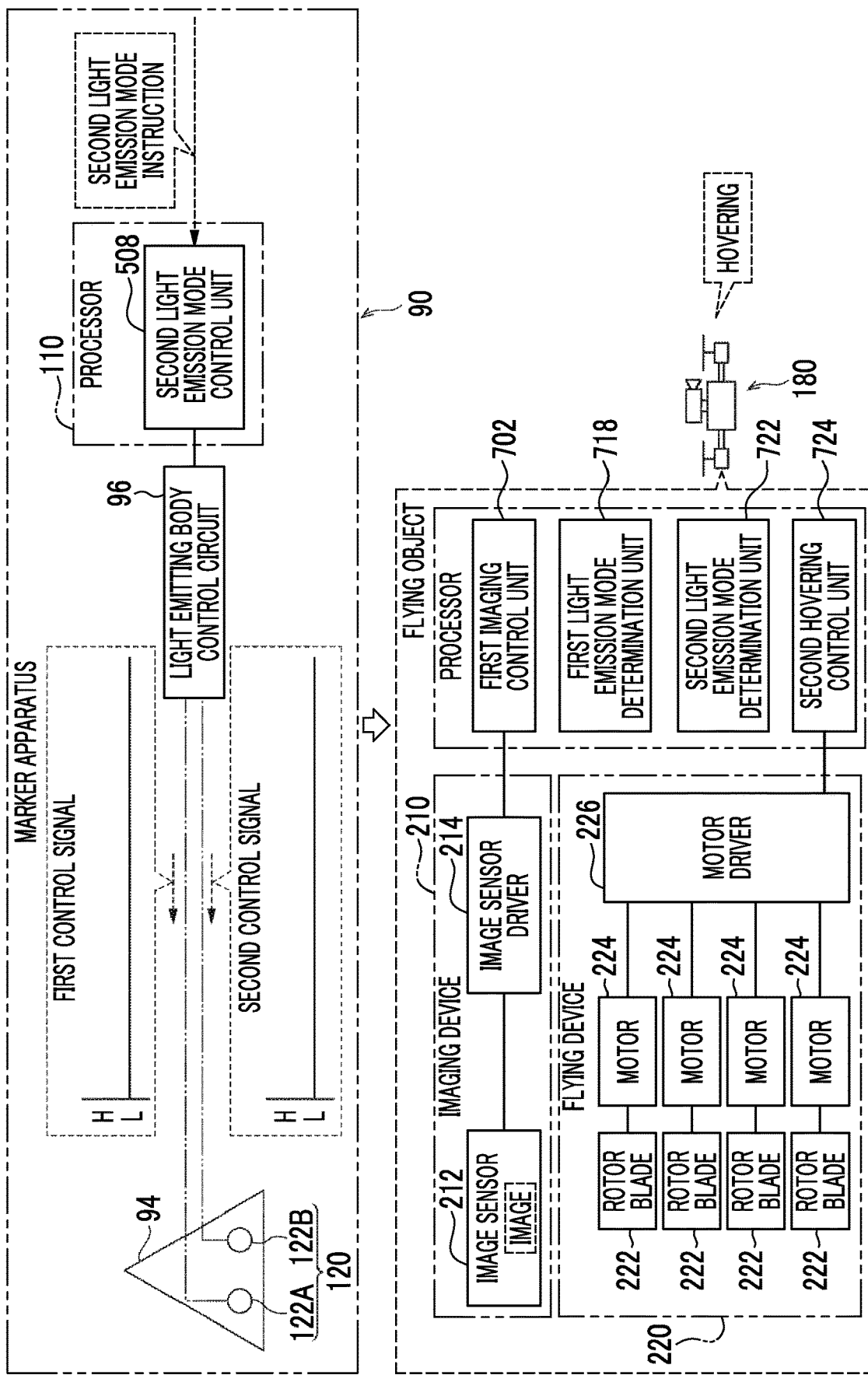
FIG. 26 is a block diagram showing an example of an operation in which the flying object hovers based on the second light emission mode of the light emitting body according to the present embodiment.

As an example shown in FIG. 26, the second light emission mode control unit 508 causes the light emitting body control circuit 96 to maintain the level of the first control signal and the level of the second control signal at an L level in accordance with the second light emission mode instruction. Accordingly, in a case where the second light emission mode control unit 508 receives the second light emission mode instruction, as the second light emission mode of the light emitting body 120, the first light source 122A and the second light source 122B are turned off.

In the flying object 180, in a case where the first light emission mode determination unit 718 determines that the light emission mode of the light emitting body 120 is not the first light emission mode, the second light emission mode determination unit 722 determines whether or not the light emission mode of the light emitting body 120 is the second light emission mode based on the image obtained by being captured with the image sensor 212 in accordance with the instruction from the first imaging control unit 702. In a case where the second light emission mode determination unit 722 determines that the light emission mode of the light emitting body 120 is the second light emission mode, the second hovering control unit 724 performs control of adjusting the rotation speeds with respect to the plurality of motors 224 via the motor driver 226 such that the flying object 180 hovers according to the second light emission mode. That is, the second hovering control unit 724 makes the flying object 180 hover as the first light source 122A and the second light source 122B are turned off. In a case where the flying object 180 hovers, the position of the flying object 180 in the vertical direction is maintained.

Figure 27:
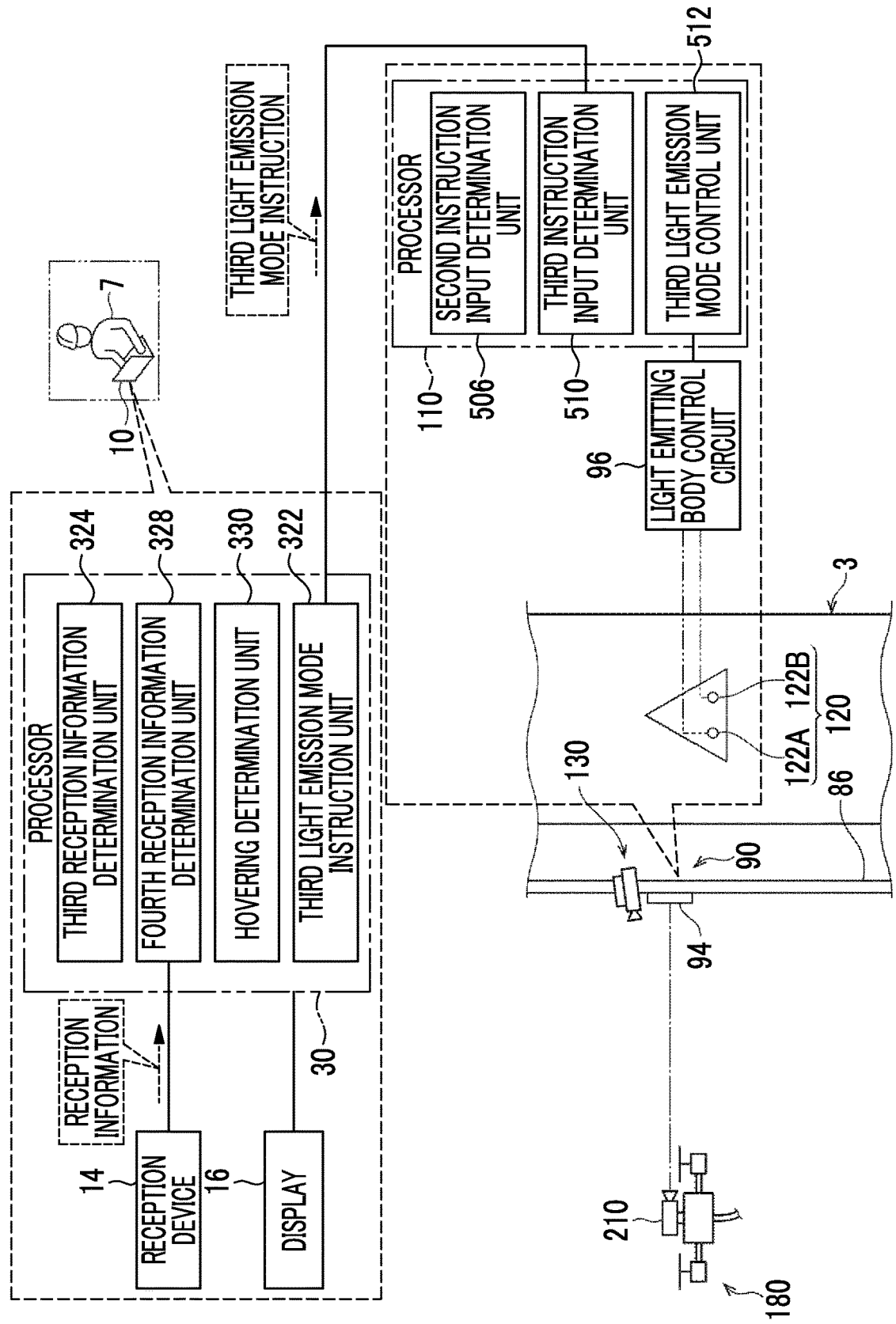
FIG. 27 is a block diagram showing an example of an operation in which the light emitting body emits light in a third light emission mode based on the control performed by the imaging support apparatus according to the present embodiment.

As an example shown in FIG. 27, in the imaging support apparatus 10, in a case where the third reception information determination unit 324 determines that the "hovering instruction for flying object" as the reception information is not received by the reception device 14, the fourth reception information determination unit 328 determines whether or not the "imaging instruction for flying object" as the reception information is received by the reception device 14. The hovering determination unit 330 determines whether or not the flying object 180 hovers. In a case where the hovering determination unit 330 determines that the flying object 180 hovers, the third light emission mode instruction unit 332 outputs a third light emission mode instruction corresponding to the imaging instruction to the marker apparatus 90. In a case where the hovering determination unit 330 determines that the flying object 180 does not hover, information indicating that the flying object 180 hovers may be displayed on the display 16 for the operator 7. As a result, it is possible to prompt the operator 7 to provide the hovering instruction to the reception device 14.

In the marker apparatus 90, in a case where the second instruction input determination unit 506 determines that the second light emission mode instruction from the imaging support apparatus 10 is not input to the marker apparatus 90, the third instruction input determination unit 510 determines whether or not the third light emission mode instruction from the imaging support apparatus 10 is input to the marker apparatus 90. In a case where the third instruction input determination unit 510 determines that the third light emission mode instruction from the imaging support apparatus 10 is input to the marker apparatus 90, the third light emission mode control unit 512 performs control of causing the light emitting body 120 via the light emitting body control circuit 96 to emit light in the third light emission mode in accordance with the third light emission mode instruction.

Figure 28:
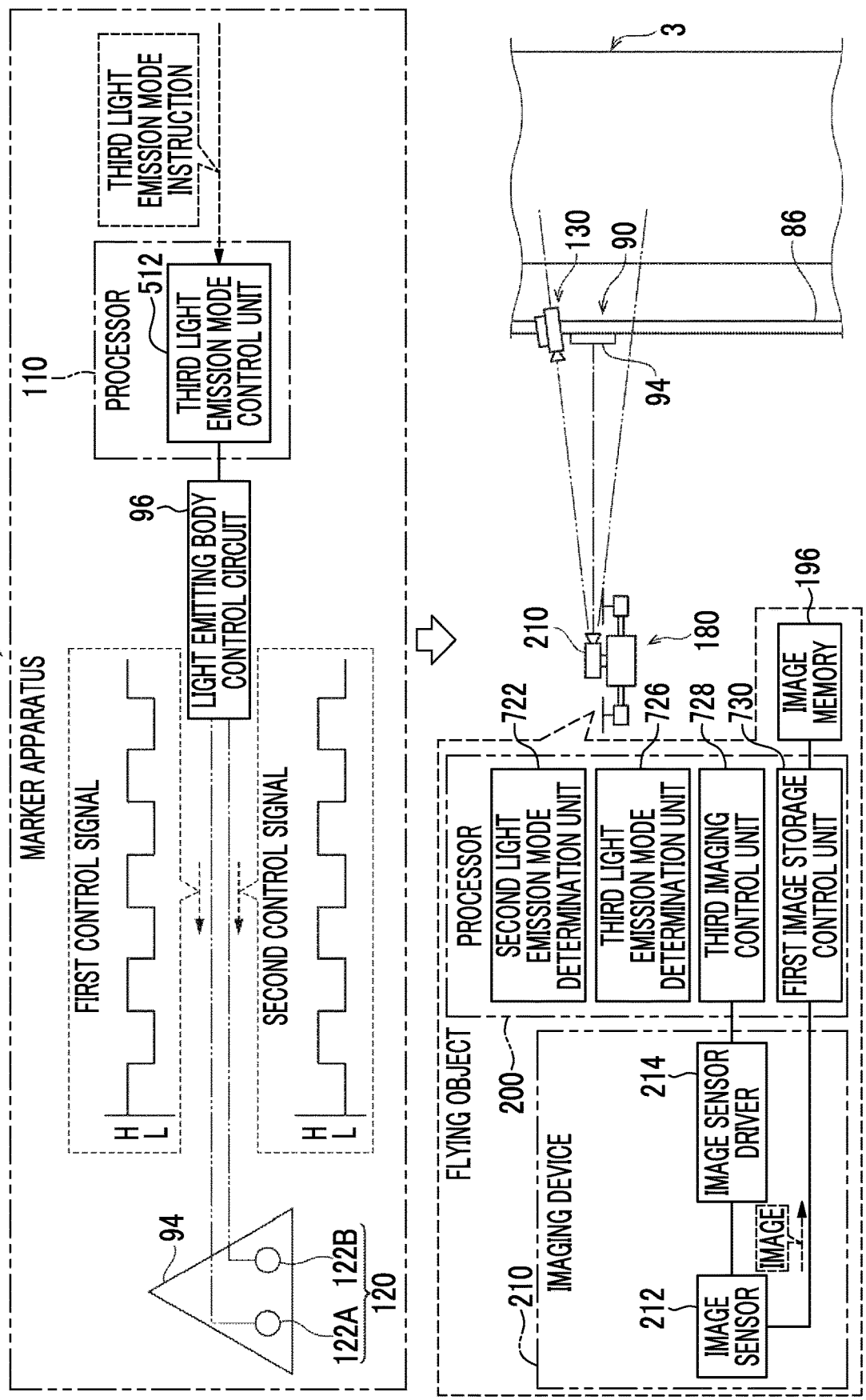
FIG. 28 is a block diagram showing an example of an operation in which the flying object performs imaging based on the third light emission mode of the light emitting body according to the present embodiment.

As an example shown in FIG. 28, the third light emission mode control unit 512 causes the light emitting body control circuit 96 to output a first rectangular signal as the first control signal in accordance with the third light emission mode instruction and outputs a second rectangular signal, which has a phase opposite to that of the first rectangular signal, as the second control signal. Accordingly, in a case where the third light emission mode control unit 512 receives the third light emission mode instruction, as the third light emission mode of the light emitting body 120, the first light source 122A and the second light source 122B are turned on and off alternately. That is, as a blinking mode of the first light source 122A and the second light source 122B, a state in which the second light source 122B is turned off in a case where the first light source 122A is turned on, and a state in which the second light source 122B is turned on in a case where the first light source 122A is turned off are repeated alternately.

In the flying object 180, in a case where the second light emission mode determination unit 722 determines that the light emission mode of the light emitting body 120 is not the second light emission mode, the third light emission mode determination unit 726 determines whether or not the light emission mode of the light emitting body 120 is the third light emission mode based on the image (see FIG. 26) obtained by being captured with the image sensor 212 in accordance with the instruction from the first imaging control unit 702 (see FIG. 26). In a case where the third light emission mode determination unit 726 determines that the light emission mode of the light emitting body 120 is the third light emission mode, the third imaging control unit 728 performs control of causing the image sensor 212 via the image sensor driver 214 to capture an imaging scene that includes the marker 94 in a part thereof. The imaging scene includes the inspection target 3 positioned in the vicinity of the marker 94. In this case, the third imaging control unit 728 causes the image sensor 212 to perform imaging for a still image. The marker 94 and the inspection target 3 positioned in the vicinity of the marker 94 are reflected as figures in the image obtained by being captured with the image sensor 212.

The first image storage control unit 730 stores the image obtained by being captured with the image sensor 212 in accordance with an instruction from the third imaging control unit 728, in the image memory 196. A still image as an image stored in the image memory 196 is analyzed by the image analysis apparatus 230 (see FIG. 1) later. The control of the third imaging control unit 728 causing the image sensor 212 to perform the imaging is an example of an "imaging control" according to the present disclosed technology.

Figure 29:
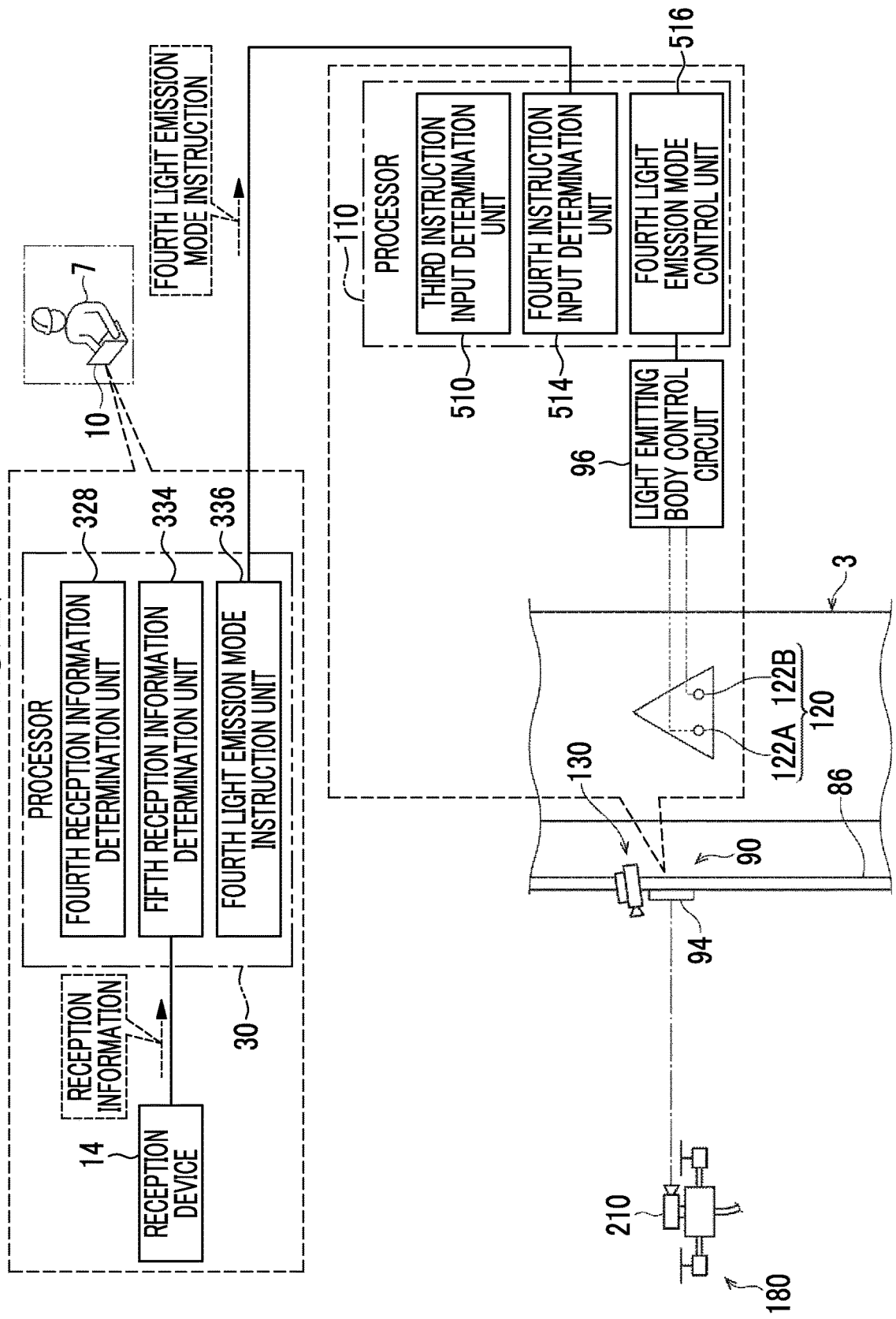
FIG. 29 is a block diagram showing an example of an operation in which the light emitting body emits light in a fourth light emission mode based on the control performed by the imaging support apparatus according to the present embodiment.

As an example shown in FIG. 29, in the imaging support apparatus 10, in a case where the fourth reception information determination unit 328 determines that the "imaging instruction for flying object" as the reception information is not received by the reception device 14, the fifth reception information determination unit 334 determines whether or not the "lateral movement and imaging instruction for flying object" as the reception information is received by the reception device 14. In a case where the fourth reception information determination unit 328 determines that the "lateral movement and imaging instruction for flying object" as the reception information is received by the reception device 14, the fourth light emission mode instruction unit 336 outputs a fourth light emission mode instruction corresponding to the lateral movement and the imaging instruction to the marker apparatus 90.

In the marker apparatus 90, in a case where the third instruction input determination unit 510 determines that the third light emission mode instruction from the imaging support apparatus 10 is not input to the marker apparatus 90, the fourth instruction input determination unit 514 determines whether or not the fourth light emission mode instruction from the imaging support apparatus 10 is input to the marker apparatus 90. In a case where the fourth instruction input determination unit 514 determines that the fourth light emission mode instruction from the imaging support apparatus 10 is input to the marker apparatus 90, the fourth light emission mode control unit 516 performs control of causing the light emitting body 120 via the light emitting body control circuit 96 to emit light in the fourth light emission mode in accordance with the fourth light emission mode instruction.

Figure 30:
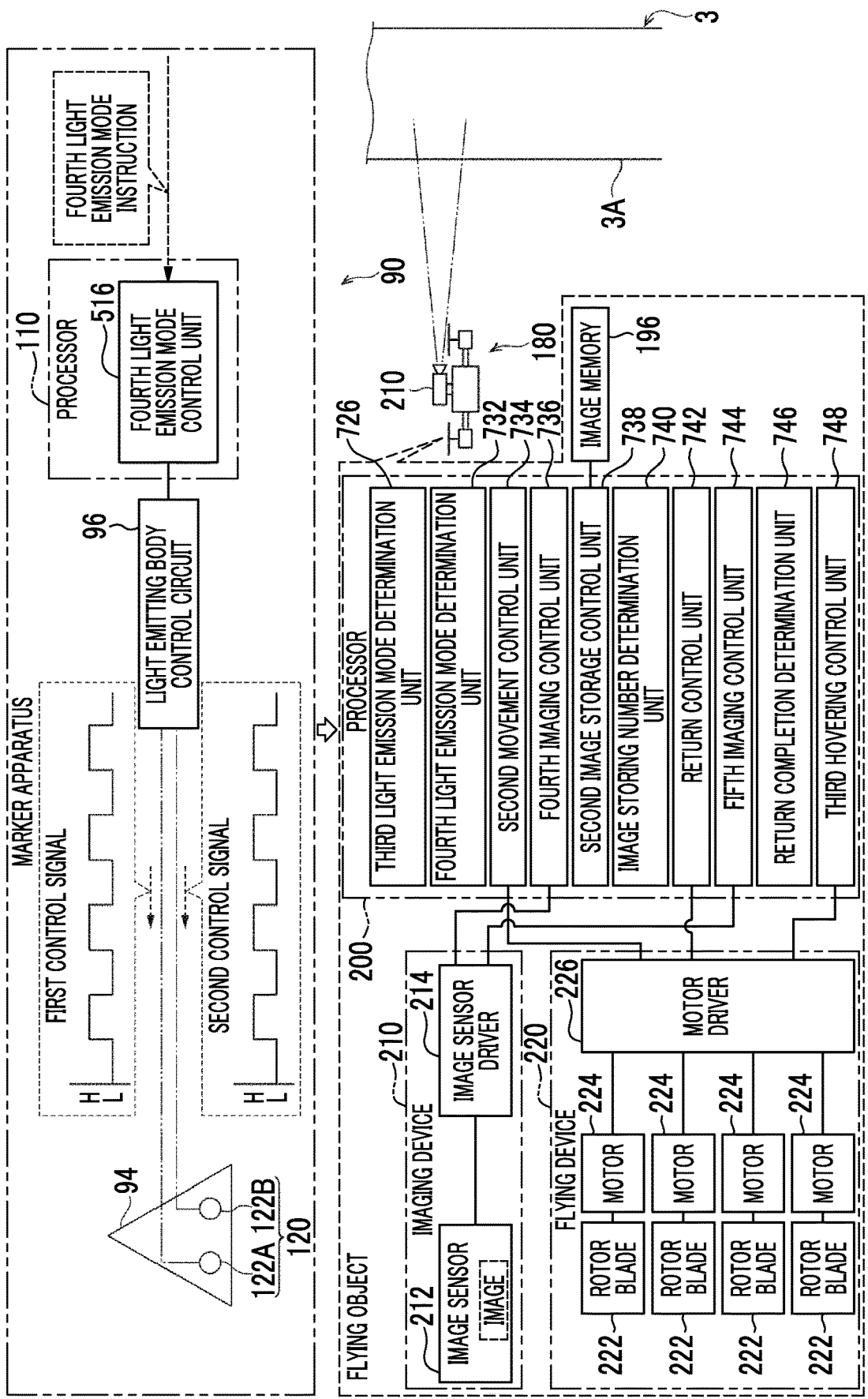
FIG. 30 is a block diagram showing an example of an operation in which the flying object performs lateral movement and imaging based on the fourth light emission mode of the light emitting body according to the present embodiment.

As an example shown in FIG. 30, the fourth light emission mode control unit 516 causes the light emitting body control circuit 96 to output a first rectangular signal as the first control signal in accordance with the fourth light emission mode instruction and outputs a second rectangular signal, which has the same phase with that of the first rectangular signal, as the second control signal. Accordingly, in a case where the fourth light emission mode control unit 516 receives the fourth light emission mode instruction, as the fourth light emission mode of the light emitting body 120, the first light source 122A and the second light source 122B are turned on and off at the same time. That is, as a blinking mode of the first light source 122A and the second light source 122B, a state in which the first light source 122A and the second light source 122B are turned on, and a state in which the first light source 122A and the second light source 122B are turned off are repeated alternately.

In the flying object 180, in a case where the third light emission mode determination unit 726 determines that the light emission mode of the light emitting body 120 is not the third light emission mode, the fourth light emission mode determination unit 732 determines whether or not the light emission mode of the light emitting body 120 is the fourth light emission mode based on the image (see FIG. 26) obtained by being captured with the image sensor 212 in accordance with the instruction from the first imaging control unit 702 (see FIG. 26). In a case where the fourth light emission mode determination unit 732 determines that the light emission mode of the light emitting body 120 is the fourth light emission mode, the second movement control unit 734 performs control of adjusting the rotation speeds with respect to the plurality of motors 224 via the motor driver 226 such that the flying object 180 moves in the lateral direction (in this case, the left direction as an example) by a predetermined movement distance and then hovers while maintaining the position in the vertical direction. In this case, the flying object 180 moves to the left along the surface of the inspection target 3 as an example of movement in the lateral direction. The flying object 180 may move to the right along the surface of the inspection target 3 as an example of movement in the lateral direction. The predetermined movement distance is set to, for example, a distance at which adjacent still images partially overlap each other in a case where the movement in the lateral direction and the imaging for the still image are repeatedly performed, as will be described later.

In a state in which the flying object 180 hovers, the fourth imaging control unit 736 performs control of causing the image sensor 212 via the image sensor driver 214 to image the front of the flying object 180. In this case, the fourth imaging control unit 736 causes the image sensor 212 to perform the imaging for the still image. The inspection target 3 is reflected as a figure in the image obtained by being captured with the image sensor 212. The second image storage control unit 738 stores the image obtained by being captured with the image sensor 212 in accordance with an instruction from the fourth imaging control unit 736, in the image memory 196. A still image as an image stored in the image memory 196 is analyzed by the image analysis apparatus 230 (see FIG. 1) later.

The image storing number determination unit 740 determines whether or not the number of frames of the image stored in the image memory 196 has reached a default number in accordance with the instruction from the second image storage control unit 738. In a case where the image storing number determination unit 740 determines that the number of frames of the image stored in the image memory 196 does not reach the default number, processing performed by the second movement control unit 734, processing performed by the fourth imaging control unit 736, and processing performed by the second image storage control unit 738 are repeatedly executed. That is, the left movement of the flying object 180, the imaging performed by the flying object 180, and the storage of the image are repeatedly executed. As a result, a plurality of images are obtained by imaging a plurality of regions of the inspection target 3 in the horizontal direction, and the plurality of images are stored in the image memory 196.

In a case where the image storing number determination unit 740 determines that the number of frames of the image stored in the image memory 196 has reached the default number in accordance with the instruction from the second image storage control unit 738, the return control unit 742 performs control of adjusting the rotation speeds with respect to the plurality of motors 224 via the motor driver 226 such that the flying object 180 moves toward the position in front of the marker 94 in the lateral direction (that is, such that returns to an original position). In this case, the flying object 180 moves to the right along the surface of the inspection target 3 as an example of movement in the lateral direction. The fifth imaging control unit 744 controls the image sensor 212, via the image sensor driver 214, to image the front of the flying object 180. In a case where the flying object 180 is not moved to the position in front of the marker 94, the marker 94 is not reflected as a figure in the image obtained by being captured with the image sensor 212. On the other hand, in a case where the flying object 180 has moved to the position in front of the marker 94, the marker 94 is reflected as a figure in the image obtained by being captured with the image sensor 212.

The return completion determination unit 746 determines whether or not the flying object 180 has moved to the position in front of the marker 94 by determining whether or not the marker 94 is reflected as a figure in the image obtained by being captured with the image sensor 212 in accordance with an instruction from the fifth imaging control unit 744. In a case where the return completion determination unit 746 determines that the flying object 180 has moved to the position in front of the marker 94, the third hovering control unit 748 performs control of adjusting the rotation speeds with respect to the plurality of motors 224 via the motor driver 226 such that the flying object 180 hovers.

Figure 31:
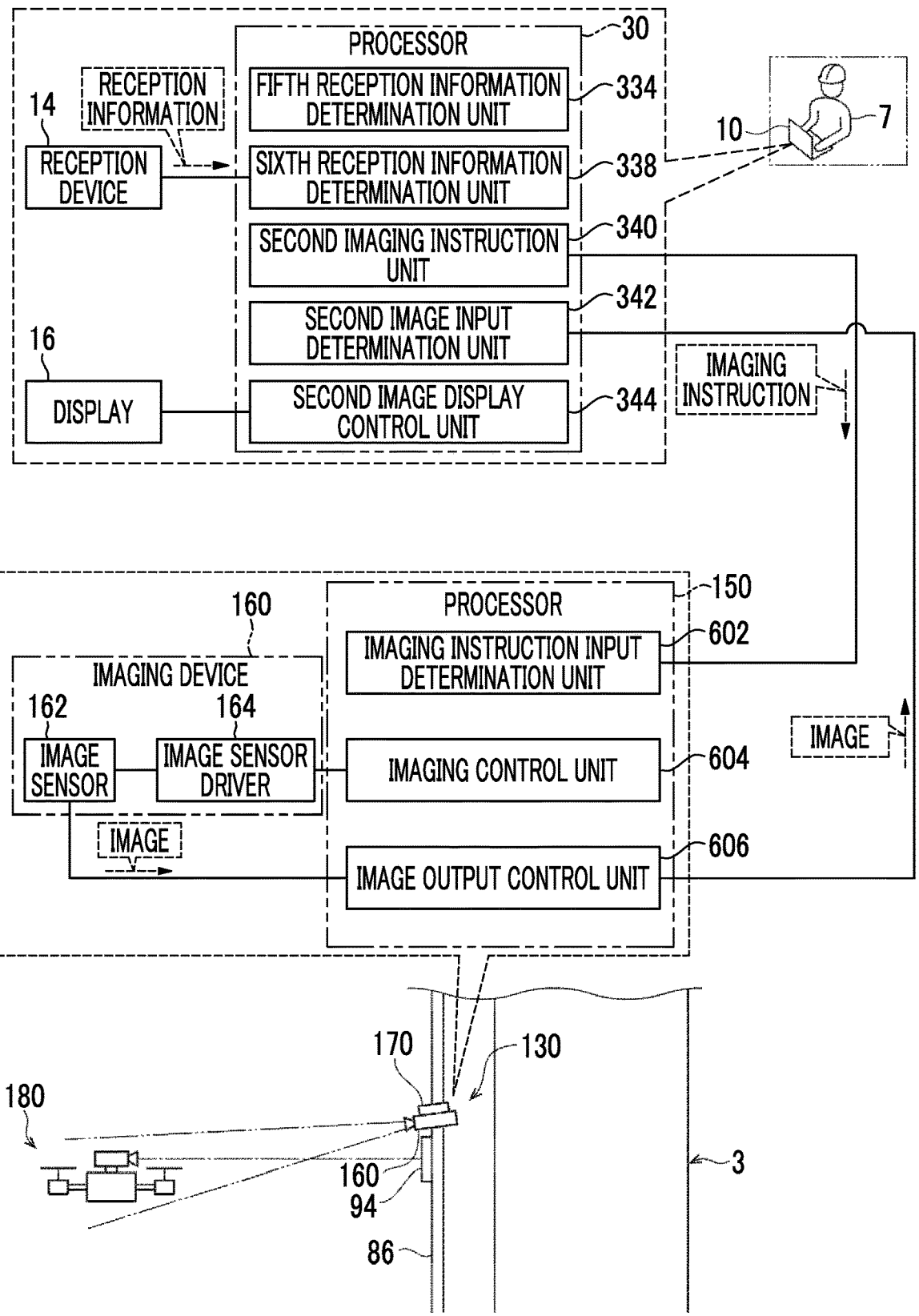
FIG. 31 is a block diagram showing an example of an operation in which the imaging distance measurement apparatus images the flying object based on control performed by the imaging support apparatus according to the present embodiment.

As an example shown in FIG. 31, in the imaging support apparatus 10, in a case where the fifth reception information determination unit 334 determines that the "lateral movement and imaging instruction for flying object" as the reception information is not received by the reception device 14, the sixth reception information determination unit 338 determines whether or not the "position correction instruction for flying object" as the reception information is received by the reception device 14. In a case where the sixth reception information determination unit 338 determines that the "position correction instruction for the flying object" as the reception information is received by the reception device 14, the second imaging instruction unit 340 outputs the imaging instruction to the imaging distance measurement apparatus 130.

In the imaging distance measurement apparatus 130, the imaging instruction input determination unit 602 determines whether or not the imaging instruction is input to the imaging distance measurement apparatus 130. In a case where the imaging instruction input determination unit 602 determines that the imaging instruction is input to the imaging distance measurement apparatus 130, the imaging control unit 604 performs control of causing the image sensor 162 via the image sensor driver 164 to image the flying object 180. The image output control unit 606 outputs an image obtained by imaging the flying object 180 by the image sensor 162 to the imaging support apparatus 10.

In the imaging support apparatus 10, the second image input determination unit 342 determines whether or not the image from the imaging distance measurement apparatus 130 is input to the imaging support apparatus 10. In a case where the second image input determination unit 342 determines that the image from the imaging distance measurement apparatus 130 is input to the imaging support apparatus 10, the second image display control unit 344 performs control of displaying the image on the display 16. The operator 7 can check a posture and/or position of the flying object 180 based on the image displayed on the display 16.

Figure 32:
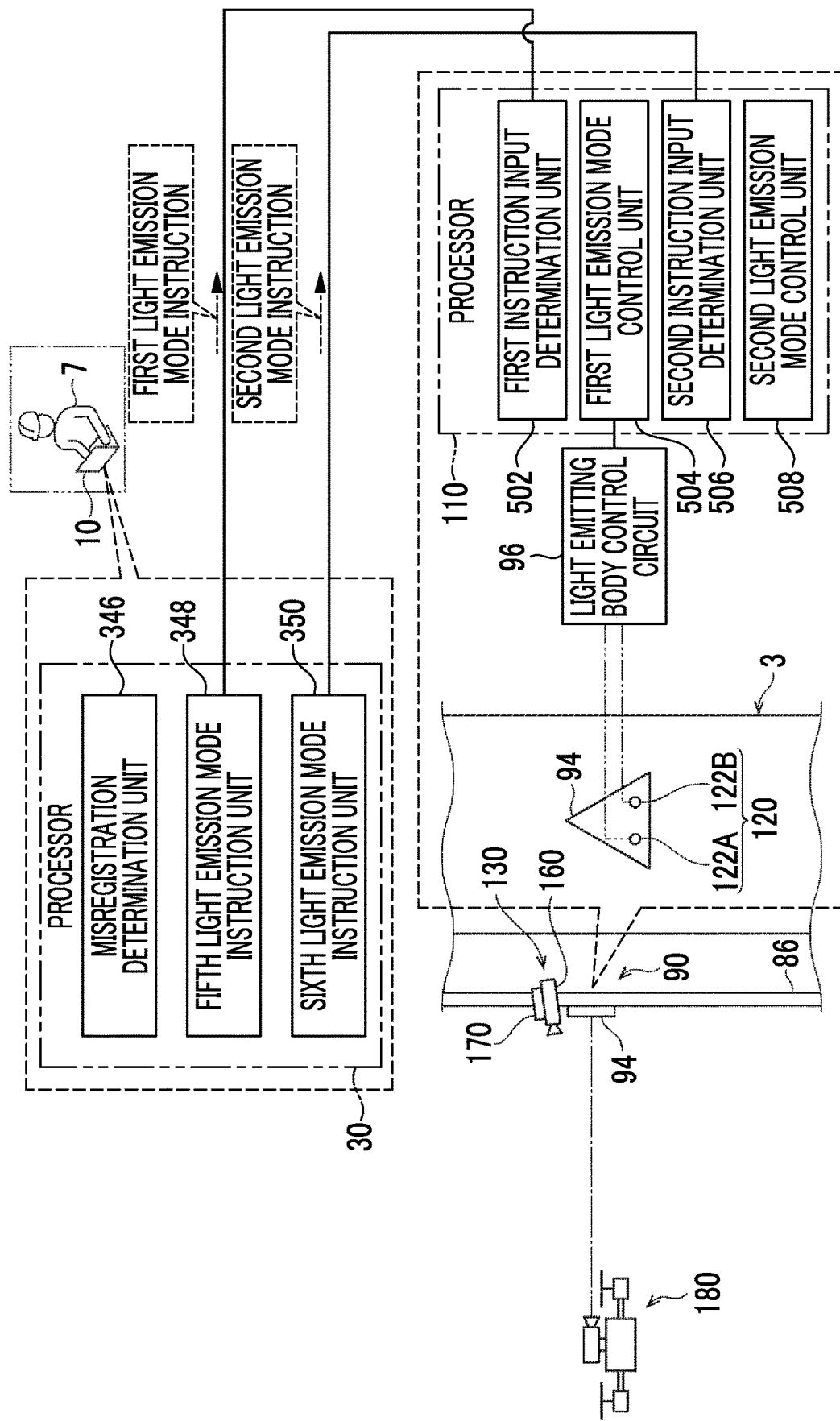
FIG. 32 is a block diagram showing an example of an operation in which the light emitting body emits light in the first light emission mode or the second light emission mode based on a misregistration determination result performed by the imaging support apparatus according to the present embodiment.

As an example shown in FIG. 32, in the imaging support apparatus 10, the misregistration determination unit 346 determines whether or not the position of the flying object 180, which is reflected as a figure in the image, is shifted with respect to the center part of an angle of view of the imaging device 160 based on the image (see FIG. 31) input from the imaging distance measurement apparatus 130 to the imaging support apparatus 10. In a case where the misregistration determination unit 346 determines that the position of the flying object 180 is shifted with respect to the center part of the angle of view of the imaging device 160, the fifth light emission mode instruction unit 348 outputs, to the marker apparatus 90, the first light emission mode instruction corresponding to the movement instruction for correcting the misregistration.

In the marker apparatus 90, the first instruction input determination unit 502 determines whether or not the first light emission mode instruction from the imaging support apparatus 10 is input to the marker apparatus 90. In a case where the first instruction input determination unit 502 determines that the first light emission mode instruction from the imaging support apparatus 10 is input to the marker apparatus 90, the first light emission mode control unit 504 performs control of causing the light emitting body 120 via the light emitting body control circuit 96 to emit light in the first light emission mode in accordance with the first light emission mode instruction. As a result, as the flying object 180 moves according to the first light emission mode of the light emitting body 120, the misregistration is corrected. That is, the flying object 180 moves to the center part of the angle of view of the imaging device 160.

In the imaging support apparatus 10, in a case where the misregistration determination unit 346 determines that the position of the flying object 180 is shifted with respect to the center part of the angle of view of the imaging device 160, the sixth light emission mode instruction unit 350 outputs, to the marker apparatus 90, the second light emission mode instruction corresponding to the hovering instruction.

In the marker apparatus 90, in a case where the first instruction input determination unit 502 determines that the first light emission mode instruction from the imaging support apparatus 10 is not input to the marker apparatus 90, the second instruction input determination unit 506 determines whether or not the second light emission mode instruction from the imaging support apparatus 10 is input to the marker apparatus 90. In a case where the second instruction input determination unit 506 determines that the second light emission mode instruction from the imaging support apparatus 10 is input to the marker apparatus 90, the second light emission mode control unit 508 performs control of causing the light emitting body 120 via the light emitting body control circuit 96 to emit light in the second light emission mode in accordance with the second light emission mode instruction. As a result, the flying object 180 hovers according to the second light emission mode of the light emitting body 120.

Next, the action of the imaging system S will be described with reference to FIGS. 33 to 42.

Figure 33:
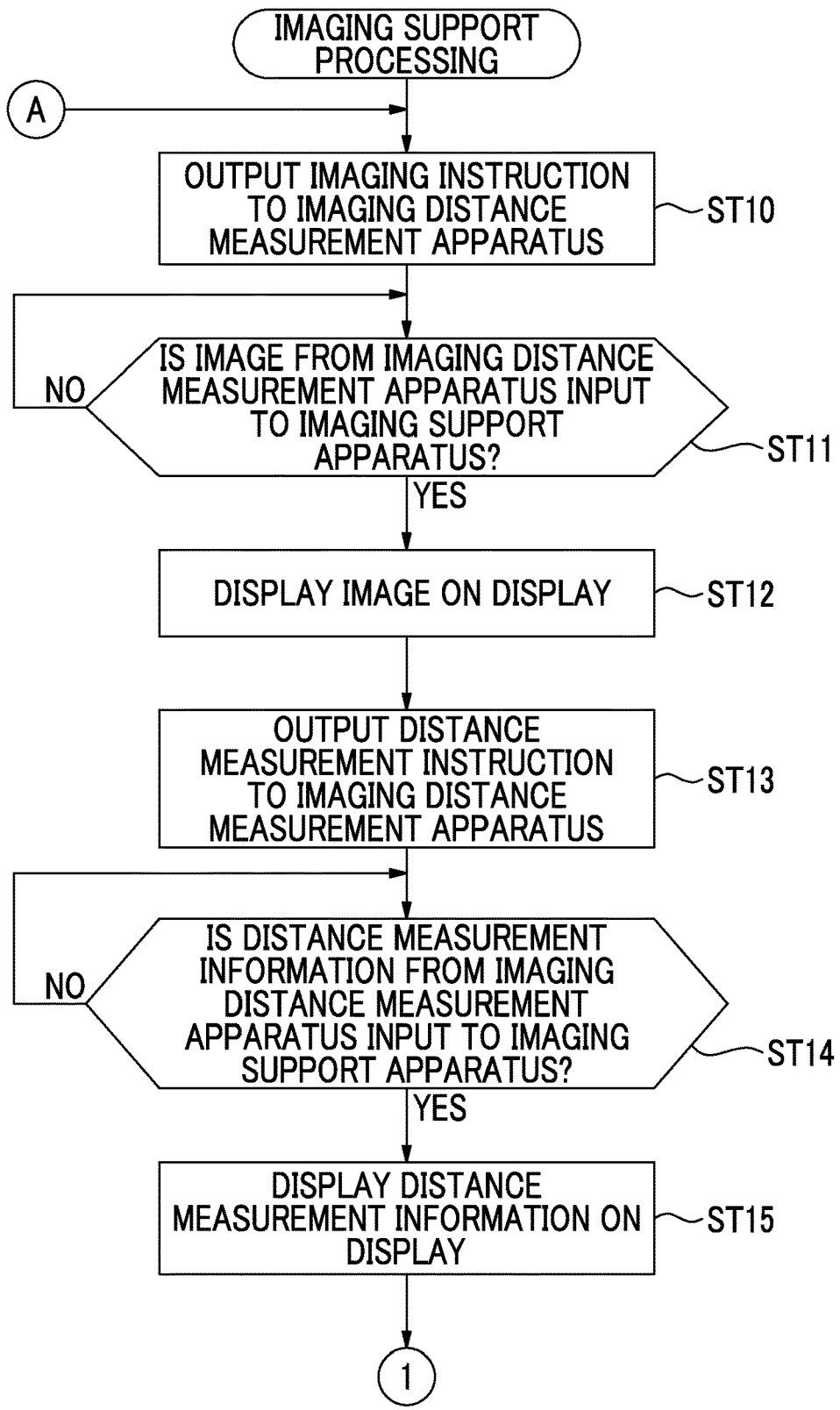
FIG. 33 is a flowchart showing an example of a flow of first processing of imaging support processing according to the present embodiment.
Figure 36:
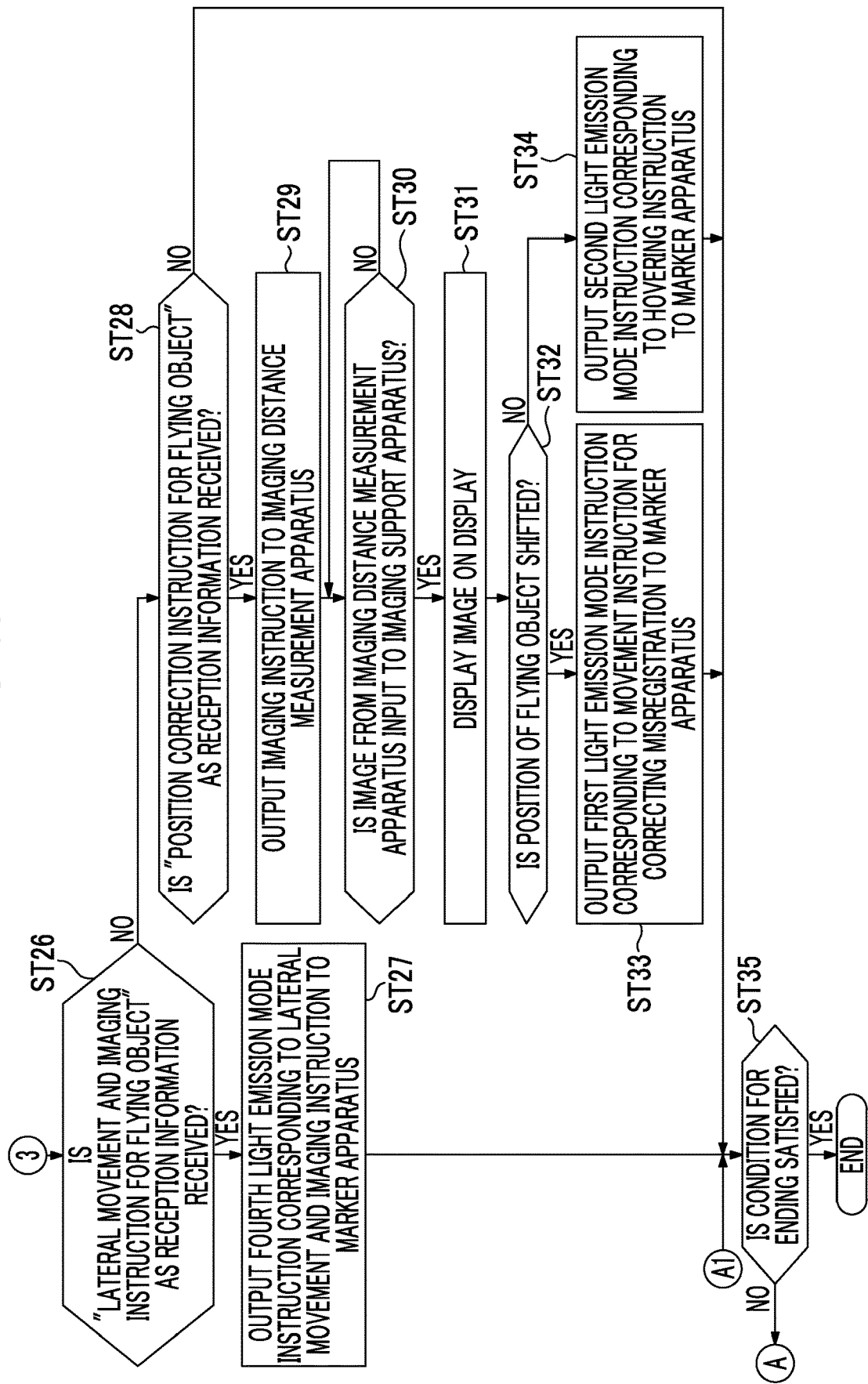
FIG. 36 is a flowchart showing an example of a flow of fourth processing of the imaging support processing according to the present embodiment.

First, an example of a flow of the imaging support processing performed by the processor 30 of the imaging support apparatus 10 will be described with reference to FIGS. 33 and 36. In the imaging support processing shown in FIG. 33, first, in step ST10, the first imaging instruction unit 302 outputs the imaging instruction to the imaging distance measurement apparatus 130. After the processing in step ST10 is executed, the imaging support processing shifts to step ST11.

In step ST11, the first image input determination unit 304 determines whether or not the image from the imaging distance measurement apparatus 130 is input to the imaging support apparatus 10. In step ST11, in a case where the image from the imaging distance measurement apparatus 130 is not input to the imaging support apparatus 10, the determination is set as negative, and the determination in step ST11 is performed again. In step ST11, in a case where the image from the imaging distance measurement apparatus 130 is input to the imaging support apparatus 10, the determination is set as positive, and the imaging support processing shifts to step ST12.

In step ST12, the first image display control unit 306 displays the image that is input from the imaging distance measurement apparatus 130 to the imaging support apparatus 10 on the display 16. After the processing in step ST12 is executed, the imaging support processing shifts to step ST13.

In step ST13, the distance measurement instruction unit 308 outputs the distance measurement instruction to the imaging distance measurement apparatus 130. After the processing in step ST13 is executed, the imaging support processing shifts to step ST14.

In step ST14, the distance measurement information input determination unit 310 determines whether or not the distance measurement information from the imaging distance measurement apparatus 130 is input to the imaging support apparatus 10. In step ST14, in a case where the distance measurement information from the imaging distance measurement apparatus 130 is not input to the imaging support apparatus 10, the determination is set as negative, and the determination in step ST14 is performed again. In step ST15, in a case where the distance measurement information is input to the imaging support apparatus 10, the determination is set as positive, and the imaging support processing shifts to step ST15.

In step ST15, the distance measurement information display control unit 312 displays the distance measurement information that is input from the imaging distance measurement apparatus 130 to the imaging support apparatus 10 on the display 16. After the processing in step ST15 is executed, the imaging support processing shifts to step ST16 shown in FIG. 34.

Figure 34:
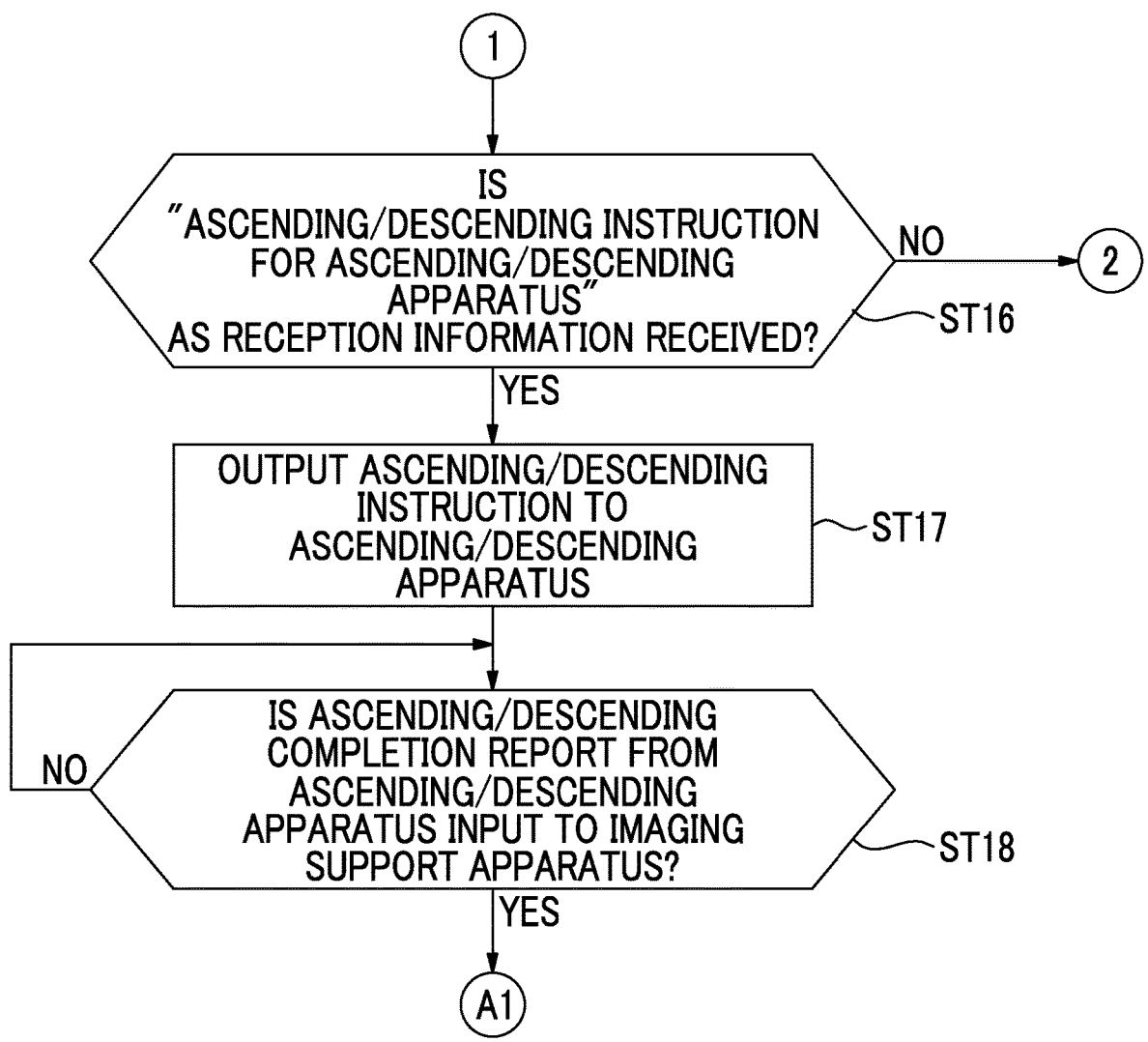
FIG. 34 is a flowchart showing an example of a flow of second processing of the imaging support processing according to the present embodiment.
Figure 35:
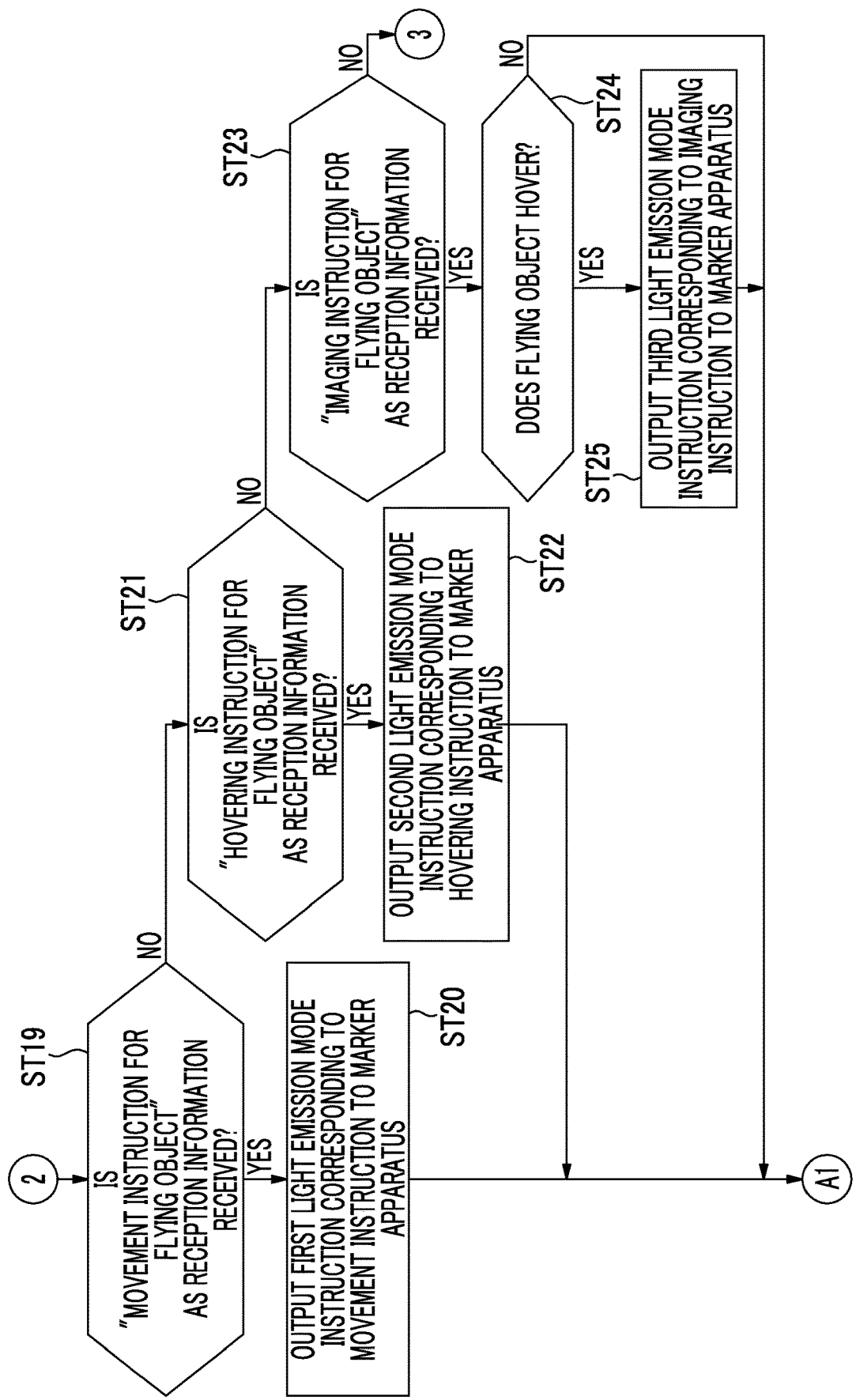
FIG. 35 is a flowchart showing an example of a flow of third processing of the imaging support processing according to the present embodiment.

In step ST16 shown in FIG. 34, the first reception information determination unit 314 determines whether or not the "ascending/descending instruction for ascending/descending apparatus" as the reception information is received by the reception device 14. In step ST16, in a case where the "ascending/descending instruction for ascending/descending apparatus" as the reception information is not received by the reception device 14, the determination is set as negative, and the imaging support processing shifts to step ST19. In step ST16, in a case where the "ascending/descending instruction for ascending/descending apparatus" as the reception information is received by the reception device 14, the determination is set as positive, and the imaging support processing shifts to step ST17.

In Step ST17, the ascending/descending instruction unit 316 outputs the ascending/descending instruction to the ascending/descending apparatus 50. After the processing in step ST17 is executed, the imaging support processing shifts to step ST18.

In step ST18, the completion report input determination unit 318 determines whether or not the ascending/descending completion report from the ascending/descending apparatus 50 is input to the imaging support apparatus 10. In step ST18, in a case where the ascending/descending completion report from the ascending/descending apparatus 50 is not input to the imaging support apparatus 10, the determination is set as negative, and the determination in step ST18 is performed again. In step ST18, in a case where the ascending/descending completion report from the ascending/descending apparatus 50 is input to the imaging support apparatus 10, the determination is set as positive, and the imaging support processing shifts to step ST35 shown in FIG. 36.

In step ST19, the second reception information determination unit 320 determines whether or not the "movement instruction for flying object" as the reception information is received by the reception device 14. In step ST19, in a case where the "movement instruction for flying object" as the reception information is not received by the reception device 14, the determination is set as negative, and the imaging support processing shifts to step ST21. In step ST19, in a case where the "movement instruction for flying object" as the reception information is received by the reception device 14, the determination is set as positive, and the imaging support processing shifts to step ST20.

In step ST20, the first light emission mode instruction unit 322 outputs the first light emission mode instruction corresponding to the movement instruction to the marker apparatus 90. After the processing in step ST20 is executed, the imaging support processing shifts to step ST35 shown in FIG. 36.

In step ST21, the third reception information determination unit 324 determines whether or not the "hovering instruction for flying object" as the reception information is received by the reception device 14. In step ST21, in a case where the "hovering instruction for flying object" as the reception information is not received by the reception device 14, the determination is set as negative, and the imaging support processing shifts to step ST23. In step ST21, in a case where the "hovering instruction for flying object" as the reception information is received by the reception device 14, the determination is set as positive, and the imaging support processing shifts to step ST22.

In step ST22, the second light emission mode instruction unit 326 outputs the second light emission mode instruction corresponding to the hovering instruction to the marker apparatus 90. After the processing in step ST22 is executed, the imaging support processing shifts to step ST10.

In step ST23, the fourth reception information determination unit 328 determines whether or not the "imaging instruction for flying object" as the reception information is received by the reception device 14. In step ST23, in a case where the "imaging instruction for flying object" as the reception information is not received by the reception device 14, the determination is set as negative, and the imaging support processing shifts to step ST26. In step ST23, in a case where the "imaging instruction for flying object" as the reception information is received by the reception device 14, the determination is set as positive, and the imaging support processing shifts to step ST24.

In step ST24, the hovering determination unit 330 determines whether or not the flying object 180 hovers. In step ST24, in a case where the flying object 180 does not hover, the determination is set as negative, and the imaging support processing shifts to step ST10. In step ST24, in a case where the flying object 180 hovers, the determination is set as positive, and the imaging support processing shifts to step ST25.

In step ST25, the third light emission mode instruction unit 332 outputs the third light emission mode instruction corresponding to the imaging instruction to the marker apparatus 90. After the processing in step ST25 is executed, the imaging support processing shifts to step ST35 shown in FIG. 36.

In step ST26, the fifth reception information determination unit 334 determines whether or not the "lateral movement and imaging instruction for flying object" as the reception information is received by the reception device 14. In step ST26, in a case where the "lateral movement and imaging instruction for flying object" as the reception information is not received by the reception device 14, the determination is set as negative, and the imaging support processing shifts to step ST28. In step ST26, in a case where the "lateral movement and imaging instruction for flying object" as the reception information is received by the reception device 14, the determination is set as positive, and the imaging support processing shifts to step ST27.

In step ST27, the fourth light emission mode instruction unit 336 outputs the fourth light emission mode instruction corresponding to the lateral movement and imaging instruction to the marker apparatus 90. After the processing in step ST27 is executed, the imaging support processing shifts to step ST35.

In step ST28, the sixth reception information determination unit 338 determines whether or not the "position correction instruction for flying object" as the reception information is received by the reception device 14. In step ST28, in a case where the "position correction instruction for flying object" as the reception information is not received by the reception device 14, the determination is set as negative, and the imaging support processing shifts to step ST10. In step ST28, in a case where the "position correction instruction for flying object" as the reception information is received by the reception device 14, the determination is set as positive, and the imaging support processing shifts to step ST29.

In step ST29, the second imaging instruction unit 340 outputs the imaging instruction to the imaging distance measurement apparatus 130. After the processing in step ST29 is executed, the imaging support processing shifts to step ST30.

In step ST30, the second image input determination unit 342 determines whether or not the image from the imaging distance measurement apparatus 130 is input to the imaging support apparatus 10. In step ST30, in a case where the image from the imaging distance measurement apparatus 130 is not input to the imaging support apparatus 10, the determination is set as negative, and the determination in step ST30 is performed again. In step ST30, in a case where the image from the imaging distance measurement apparatus 130 is input to the imaging support apparatus 10, the determination is set as positive, and the imaging support processing shifts to step ST31.

In step ST31, the second image display control unit 344 displays the image that is input from the imaging distance measurement apparatus 130 to the imaging support apparatus 10 on the display 16. After the processing in step ST31 is executed, the imaging support processing shifts to step ST32.

In step ST32, the misregistration determination unit 346 determines whether or not the position of the flying object 180, which is reflected as a figure in the image, is shifted with respect to the center part of an angle of view of the imaging device 160 based on the image input from the imaging distance measurement apparatus 130 to the imaging support apparatus 10. In step ST32, in a case where the position of the flying object 180 is not shifted with respect to the center part of the angle of view of the imaging device 160, the determination is set as negative, and the imaging support processing shifts to step ST34. In step ST32, in a case where the position of the flying object 180 is shifted with respect to the center part of the angle of view of the imaging device 160, the determination is set as positive, and the imaging support processing shifts to step ST33.

In step ST33, the fifth light emission mode instruction unit 348 outputs the first light emission mode instruction corresponding to the movement instruction for correcting the misregistration to the marker apparatus 90. After the processing in step ST33 is executed, the imaging support processing shifts to step ST35.

In step ST34, the sixth light emission mode instruction unit 350 outputs the second light emission mode instruction corresponding to the hovering instruction to the marker apparatus 90. After the processing in step ST34 is executed, the imaging support processing shifts to step ST35.

In step ST35, the processor 30 determines whether or not a condition for ending the imaging support processing (hereinafter, referred to as an "imaging support processing end condition") is satisfied. Examples of the imaging support processing end condition include a condition that an instruction to end the imaging support processing is received by the reception device 14. In step ST35, in a case where the imaging support processing end condition is not satisfied, the determination is set as negative, and the imaging support processing shifts to step ST10 shown in FIG. 33. In step ST35, in a case where the imaging support processing end condition is satisfied, the determination is set as positive, and the imaging support processing is ended.

The control method described as the action of the imaging system S described above is an example of a "control method" according to the present disclosed technology.

Next, an example of a flow of the ascending/descending processing performed by the processor 70 of the ascending/descending apparatus 50 will be described with reference to FIG. 37.

Figure 37:
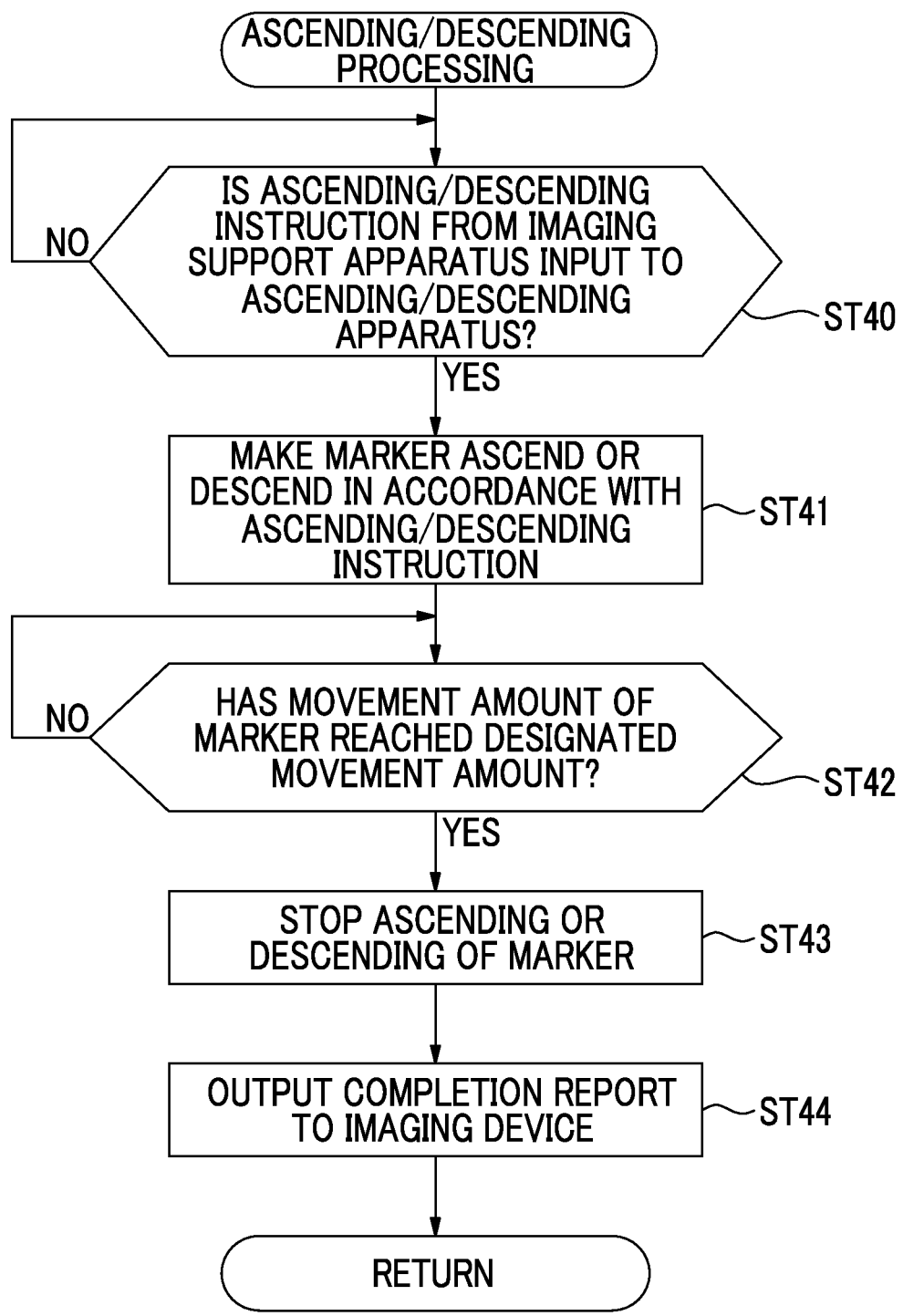
FIG. 37 is a flowchart showing an example of a flow of ascending/descending processing according to the present embodiment.

In the ascending/descending processing shown in FIG. 37, first, in step ST40, the ascending/descending instruction input determination unit 402 determines whether or not the ascending/descending instruction from the imaging support apparatus 10 is input to the ascending/descending apparatus 50. In step ST40, in a case where the ascending/descending instruction from the imaging support apparatus 10 is not input to the ascending/descending apparatus 50, the determination is set as negative, and the determination in step ST40 is performed again. In step ST40, in a case where the ascending/descending instruction from the imaging support apparatus 10 is input to the ascending/descending apparatus 50, the determination is set as positive, and the ascending/descending processing shifts to step ST41.

In step ST41, the ascending/descending control unit 404 makes the marker 94 ascend or descend in accordance with the ascending/descending instruction. After the processing in step ST41 is executed, the ascending/descending processing shifts to step ST42.

In step ST42, the movement amount determination unit 406 determines whether or not the movement amount of the marker 94 has reached the designated movement amount that is designated through the ascending/descending instruction. In step ST42, in a case where the movement amount of the marker 94 has not reached the designated movement amount, the determination is set as negative, and the determination in step ST42 is performed again. In step ST42, in a case where the movement amount of the marker 94 has reached the designated movement amount, the determination is set as positive, and the ascending/descending processing shifts to step ST43.

In step ST43, the ascending/descending stop control unit 408 stops ascending or descending of the marker 94 by stopping the rotation of the motor 84. After the processing in step ST43 is executed, the ascending/descending processing shifts to step ST44.

In step ST44, the completion report output control unit 410 outputs an ascending/descending completion report of the fact that the ascending/descending of the marker 94 is completed to the imaging support apparatus 10. After the processing in step ST44 is executed, the ascending/descending processing shifts to step ST40.

Next, an example of a flow of the light emission mode control processing performed by the processor 110 of the marker apparatus 90 will be described with reference to FIG. 38.

Figure 38:
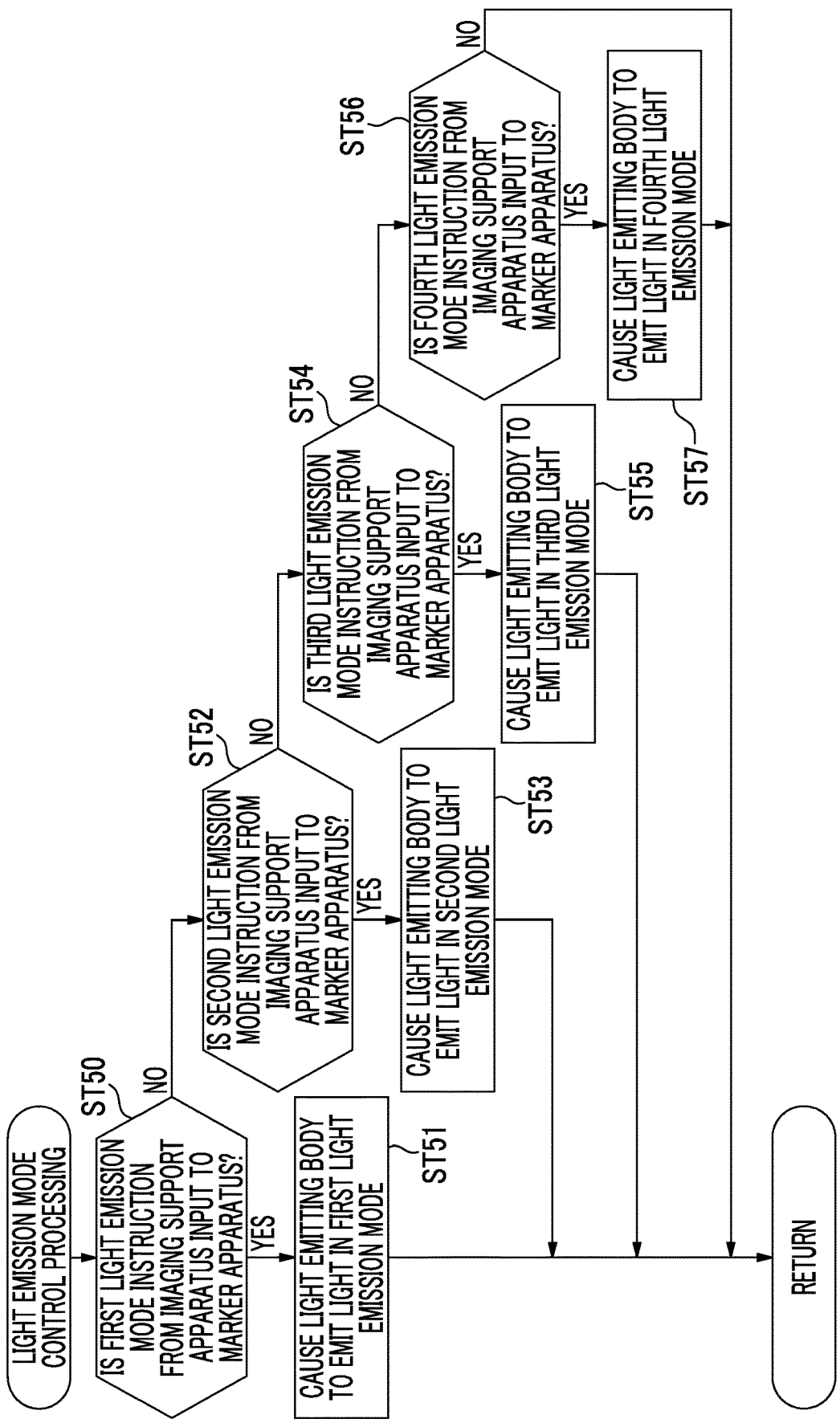
FIG. 38 is a flowchart illustrating an example of a flow of light emission mode control processing according to the present embodiment.

In the light emission mode control processing shown in FIG. 38, first, in step ST50, the first instruction input determination unit 502 determines whether or not the first light emission mode instruction from the imaging support apparatus 10 is input to the marker apparatus 90. In step ST50, in a case where the first light emission mode instruction from the imaging support apparatus 10 is not input to the marker apparatus 90, the determination is set as negative, and the light emission mode control processing shifts to step ST52. In step ST50, in a case where the first light emission mode instruction from the imaging support apparatus 10 is input to the marker apparatus 90, the determination is set as positive, and the light emission mode control processing shifts to step ST51.

In step ST51, the first light emission mode control unit 504 causes the light emitting body 120 to emit light in the first light emission mode in accordance with the first light emission mode instruction. After the processing in step ST51 is executed, the light emission mode control processing shifts to step ST50.

In step ST52, the second instruction input determination unit 506 determines whether or not the second light emission mode instruction from the imaging support apparatus 10 is input to the marker apparatus 90. In step ST52, in a case where the second light emission mode instruction from the imaging support apparatus 10 is not input to the marker apparatus 90, the determination is set as negative, and the light emission mode control processing shifts to step ST54. In step ST52, in a case where the second light emission mode instruction from the imaging support apparatus 10 is input to the marker apparatus 90, the determination is set as positive, and the light emission mode control processing shifts to step ST53.

In step ST53, the second light emission mode control unit 508 causes the light emitting body 120 to emit light in the second light emission mode in accordance with the second light emission mode instruction. After the processing in step ST53 is executed, the light emission mode control processing shifts to step ST50.

In step ST54, the third instruction input determination unit 510 determines whether or not the third light emission mode instruction from the imaging support apparatus 10 is input to the marker apparatus 90. In step ST54, in a case where the third light emission mode instruction from the imaging support apparatus 10 is not input to the marker apparatus 90, the determination is set as negative, and the light emission mode control processing shifts to step ST56. In step ST54, in a case where the third light emission mode instruction from the imaging support apparatus 10 is input to the marker apparatus 90, the determination is set as positive, and the light emission mode control processing shifts to step ST55.

In step ST55, the third light emission mode control unit 512 causes the light emitting body 120 to emit light in the third light emission mode in accordance with the third light emission mode instruction. After the processing in step ST55 is executed, the light emission mode control processing shifts to step ST50.

In step ST56, the fourth instruction input determination unit 514 determines whether or not the fourth light emission mode instruction from the imaging support apparatus 10 is input to the marker apparatus 90. In step ST56, in a case where the fourth light emission mode instruction from the imaging support apparatus 10 is not input to the marker apparatus 90, the determination is set as negative, and the light emission mode control processing shifts to step ST50. In step ST56, in a case where the fourth light emission mode instruction from the imaging support apparatus 10 is input to the marker apparatus 90, the determination is set as positive, and the light emission mode control processing shifts to step ST57.

In step ST57, the fourth light emission mode control unit 516 causes the light emitting body 120 to emit light in the fourth light emission mode in accordance with the fourth light emission mode instruction. After the processing in step ST57 is executed, the light emission mode control processing shifts to step ST50.

Next, an example of a flow of the imaging distance measurement processing performed by the processor 150 of the imaging distance measurement apparatus 130 will be described with reference to FIG. 39.

Figure 39:
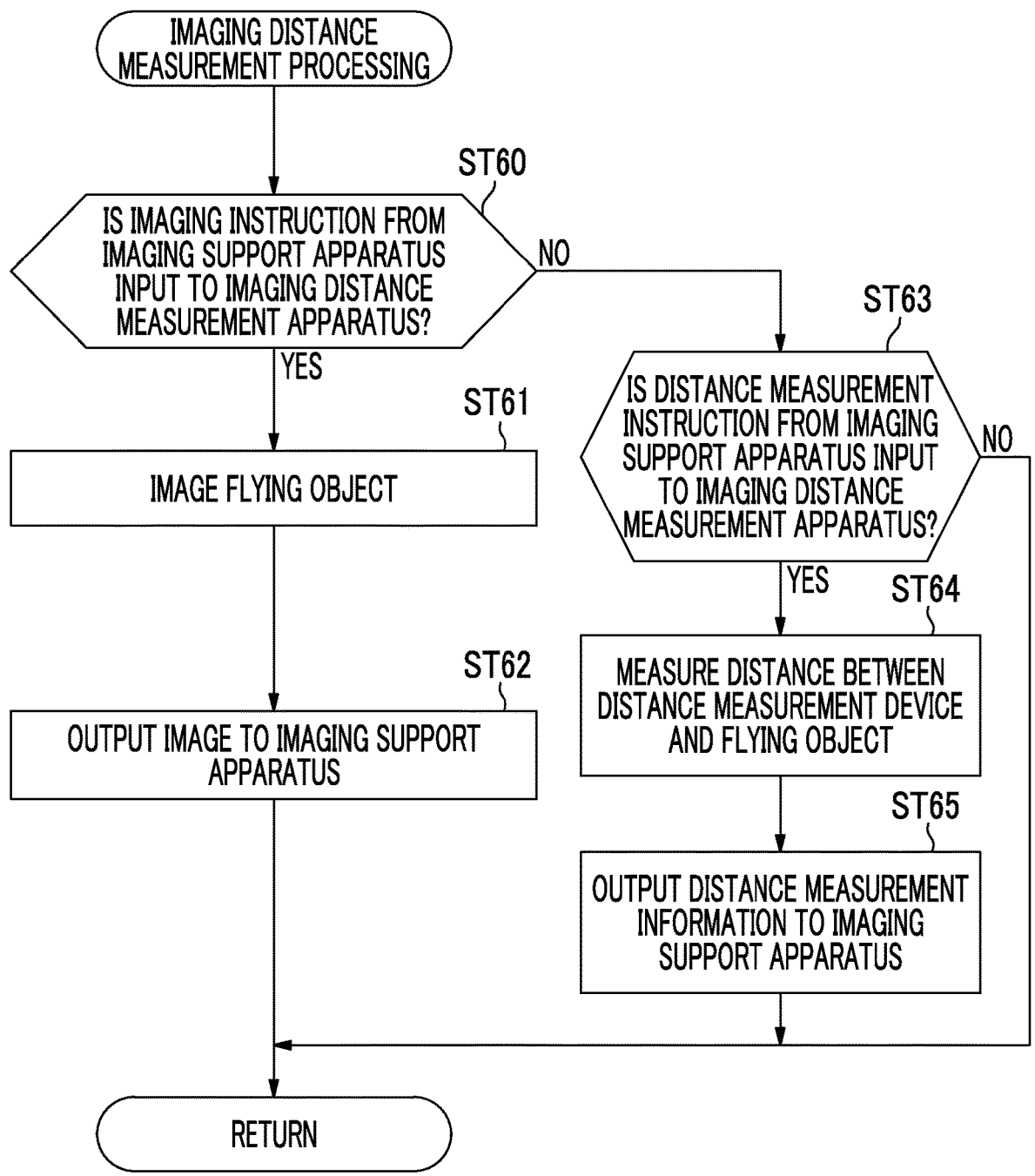
FIG. 39 is a flowchart showing an example of a flow of imaging distance measurement processing according to the present embodiment.

In the imaging distance measurement processing shown in FIG. 39, first, in step ST60, the imaging instruction input determination unit 602 determines whether or not the imaging instruction from the imaging support apparatus 10 is input to the imaging distance measurement apparatus 130. In step ST60, in a case where the imaging instruction from the imaging support apparatus 10 is not input to the imaging distance measurement apparatus 130, the determination is set as negative, and the imaging distance measurement processing shifts to step ST63. In step ST60, in a case where the imaging instruction from the imaging support apparatus 10 is input to the imaging distance measurement apparatus 130, the determination is set as positive, and the imaging support processing shifts to step ST61.

In step ST61, the imaging control unit 604 causes the image sensor 162 to image the flying object 180. After the processing in step ST61 is executed, the imaging distance measurement processing shifts to step ST62.

In step ST62, the image output control unit 606 outputs the image obtained in step ST61 to the imaging support apparatus 10. After the processing in step ST62 is executed, the imaging distance measurement processing shifts to step ST60.

In step ST63, the distance measurement instruction input determination unit 608 determines whether or not the distance measurement instruction from the imaging support apparatus 10 is input to the imaging distance measurement apparatus 130. In step ST63, in a case where the distance measurement instruction from the imaging support apparatus 10 is not input to the imaging distance measurement apparatus 130, the determination is set as negative, and the imaging distance measurement processing shifts to step ST60. In step ST63, in a case where the distance measurement instruction from the imaging support apparatus 10 is input to the imaging distance measurement apparatus 130, the determination is set as positive, and the imaging support processing shifts to step ST64.

In step ST64, the distance measurement control unit 610 causes the distance-measuring sensor 172 to measure a distance between the distance measurement device 170 and the flying object 180. After the processing in step ST64 is executed, the imaging distance measurement processing shifts to step ST65.

In step ST65, the distance measurement information output control unit 612 outputs the distance measurement information obtained in step ST65 to the imaging support apparatus 10. After the processing in step ST65 is executed, the imaging distance measurement processing shifts to step ST60.

Next, an example of a flow of the flight imaging processing performed by the processor 200 of the flying object 180 will be described with reference to FIG. 40.

Figure 40:
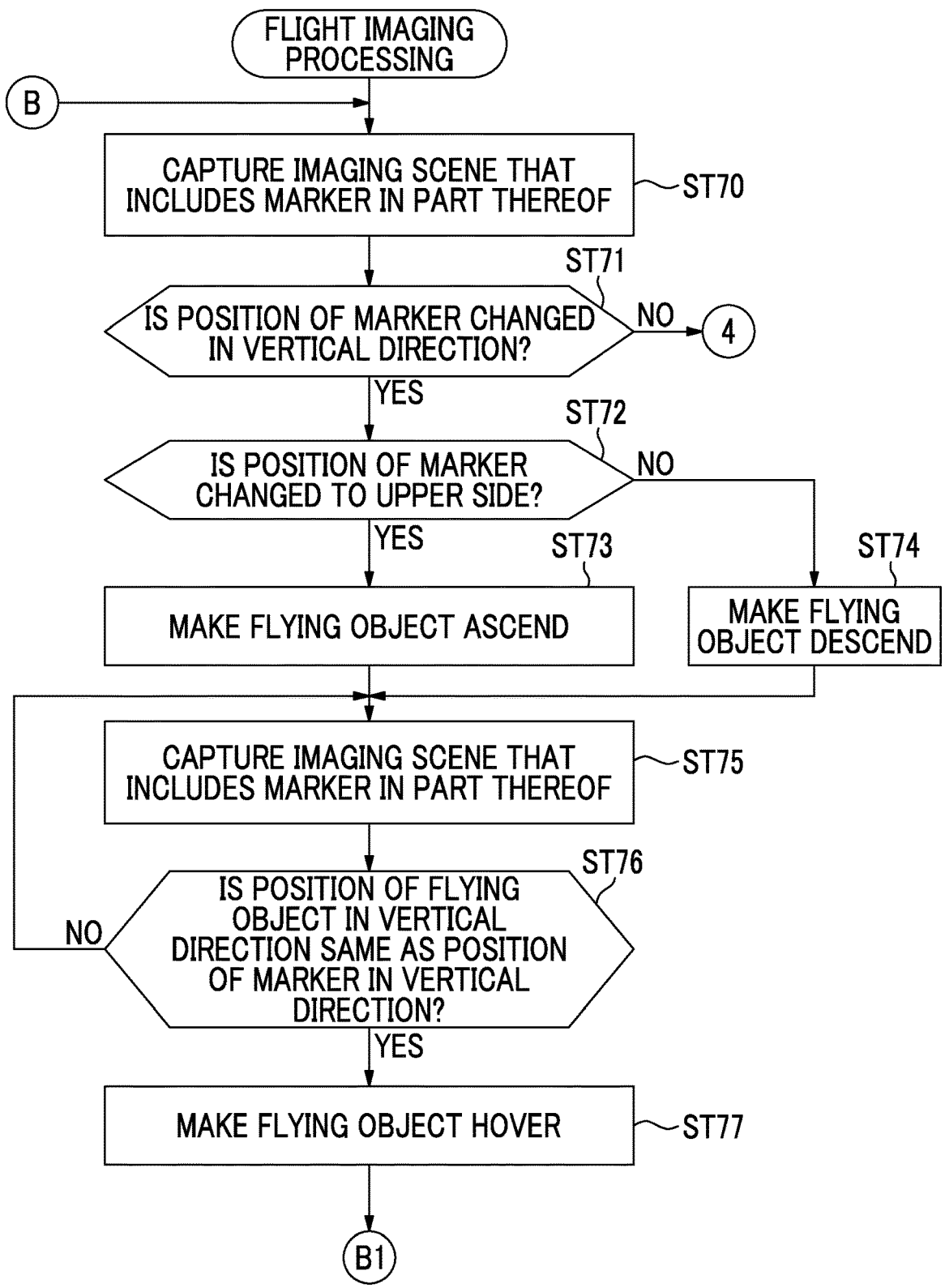
FIG. 40 is a flowchart showing an example of a flow of first processing of flight imaging processing according to the present embodiment.
Figure 41:
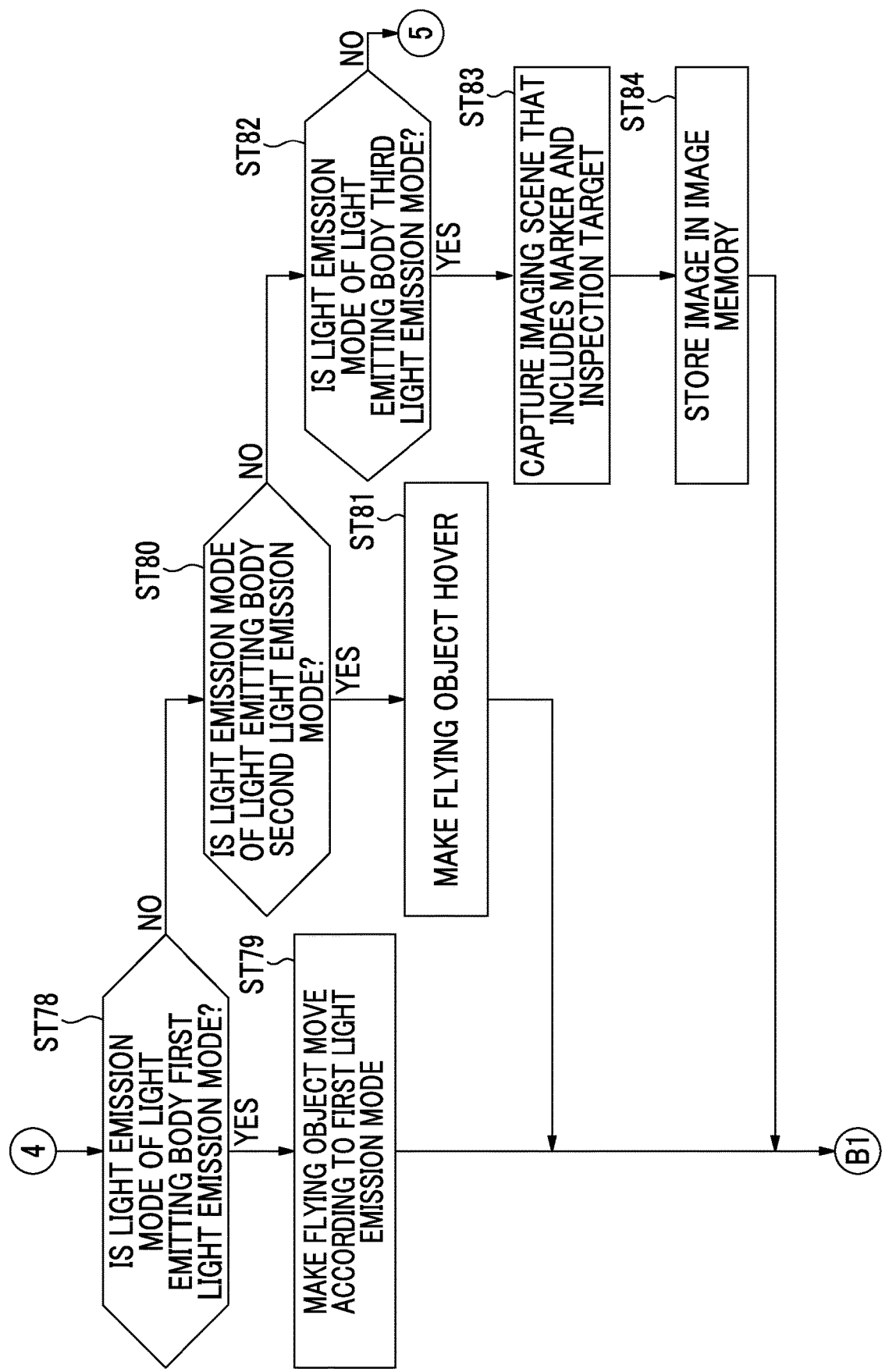
FIG. 41 is a flowchart showing an example of a flow of second processing of the flight imaging processing according to the present embodiment.
Figure 42:
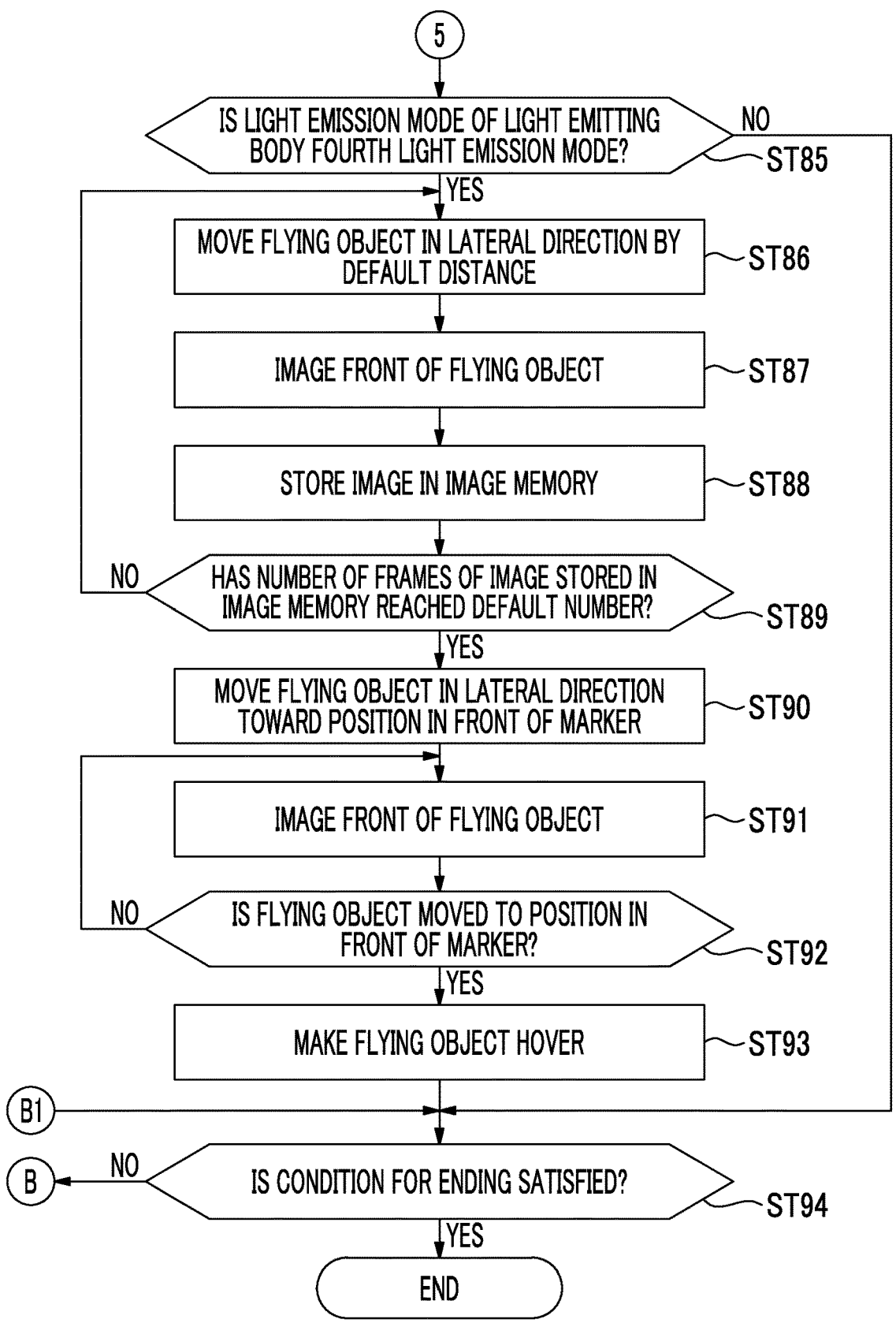
FIG. 42 is a flowchart showing an example of a flow of third processing of the flight imaging processing according to the present embodiment.

In the flight imaging processing shown in FIG. 40, first, in step ST70, the first imaging control unit 702 causes the image sensor 212 to capture an imaging scene that includes the marker 94 in a part thereof. After the processing in step ST70 is executed, the flight imaging processing shifts to step ST71.

In step ST71, the marker position change determination unit 704 determines whether or not the position of the marker 94 is changed in the vertical direction by comparing the image (hereinafter, referred to as the previous image) obtained in step ST70 of the previous flight imaging processing with the image (referred to as the current image) obtained in step ST70 of the current flight imaging processing. In step ST71, in a case where the position of the marker 94 is not changed in the vertical direction, the determination is set as negative, and the flight imaging processing shifts to step ST78. In step ST71, in a case where the position of the marker 94 is changed in the vertical direction, the determination is set as positive, and the flight imaging processing shifts to step ST72.

In step ST72, the change direction determination unit 706 determines whether or not the position of the marker 94 is changed to the upper side based on the previous image and the current image. In step ST72, in a case where the position of the marker 94 is not changed to the upper side, the determination is set as negative, and the flight imaging processing shifts to step ST74. In step ST72, in a case where the position of the marker 94 is changed to the upper side, the determination is set as positive, and the flight imaging processing shifts to step ST73.

In step ST73, the ascending control unit 708 makes the flying object 180 ascend by increasing the rotation speeds of the plurality of motors 224. After the processing in step ST73 is executed, the flight imaging processing shifts to step ST75.

In step ST74, the descending control unit 710 makes the flying object 180 descend by reducing the rotation speeds of the plurality of motors 224. After the processing in step ST74 is executed, the flight imaging processing shifts to step ST75.

In step ST75, the second imaging control unit 712 causes the image sensor 212 to capture an imaging scene that includes the marker 94 in a part thereof. After the processing in step ST75 is executed, the flight imaging processing shifts to step ST76.

In step ST76, the flying object position determination unit 714 determines whether or not the position of the flying object 180 in the vertical direction is the same as the position of the marker 94 in the vertical direction based on the image obtained in step ST75. In step ST76, in a case where the position of the flying object 180 in the vertical direction is not the same as the position of the marker 94 in the vertical direction, the determination is set as negative, and the flight imaging processing shifts to step ST75. In step ST76, in a case where the position of the flying object 180 in the vertical direction is the same as the position of the marker 94 in the vertical direction, the determination is set as positive, and the flight imaging processing shifts to step ST77. As an example, the position of the flying object 180 in the vertical direction is the same as the position of the marker 94 in the vertical direction preferably means that the position includes an error within 10 cm or less in the vertical direction, in a case where the number of pixels of the image sensor 212 in the vertical direction is 1000 pixels, and in a case where the distance between the imaging device 210 and the marker 94 is substantially 100 cm, and more preferably, means that the position includes an error within 10 mm or less in the vertical direction.

In step ST77, the first hovering control unit 716 makes the flying object 180 hover by adjusting the rotation speeds of the plurality of motors 224. After the processing in step ST77 is executed, the flight imaging processing shifts to step ST94 shown in FIG. 42.

In step ST78, the first light emission mode determination unit 718 determines whether or not the light emission mode of the light emitting body 120 is the first light emission mode based on the image obtained in step ST70. In step ST78, in a case where the light emission mode of the light emitting body 120 is not the first light emission mode, the determination is set as negative, and the flight imaging processing shifts to step ST80. In step ST78, in a case where the light emission mode of the light emitting body 120 is the first light emission mode, the determination is set as positive, and the flight imaging processing shifts to step ST79.

In step ST79, the first movement control unit 720 adjusts the rotation speeds of the plurality of motors 224 such that the flying object 180 moves according to the first light emission mode. After the processing in step ST79 is executed, the flight imaging processing shifts to step ST94 shown in FIG. 42.

In step ST80, the second light emission mode determination unit 722 determines whether or not the light emission mode of the light emitting body 120 is the second light emission mode based on the image obtained in step ST70. In step ST80, in a case where the light emission mode of the light emitting body 120 is not the second light emission mode, the determination is set as negative, and the flight imaging processing shifts to step ST82. In step ST80, in a case where the light emission mode of the light emitting body 120 is the second light emission mode, the determination is set as positive, and the flight imaging processing shifts to step ST81.

In step ST81, the second hovering control unit 724 adjusts the rotation speeds of the plurality of motors 224 such that the flying object 180 hovers according to the second light emission mode. After the processing in step ST81 is executed, the flight imaging processing shifts to step ST94 shown in FIG. 42.

In step ST82, the third light emission mode determination unit 726 determines whether or not the light emission mode of the light emitting body 120 is the third light emission mode based on the image obtained in step ST70. In step ST82, in a case where the light emission mode of the light emitting body 120 is not the third light emission mode, the determination is set as negative, and the flight imaging processing shifts to step ST85. In step ST82, in a case where the light emission mode of the light emitting body 120 is the third light emission mode, the determination is set as positive, and the flight imaging processing shifts to step ST83.

In step ST83, the third imaging control unit 728 causes the image sensor 212 to capture the imaging scene that includes the marker 94 and the inspection target 3. After the processing in step ST83 is executed, the flight imaging processing shifts to step ST84.

In step ST84, the first image storage control unit 730 stores the image obtained in step ST83 in the image memory 196. After the processing in step ST84 is executed, the flight imaging processing shifts to step ST94 shown in FIG. 42.

In step ST85, whether or not the light emission mode of the light emitting body 120 is the fourth light emission mode is determined based on the image obtained in step ST70. In step ST85, in a case where the light emission mode of the light emitting body 120 is not the fourth light emission mode, the determination is set as negative, and the flight imaging processing shifts to step ST94. In step ST85, in a case where the light emission mode of the light emitting body 120 is the fourth light emission mode, the determination is set as positive, and the flight imaging processing shifts to step ST86.

In step ST86, the second movement control unit 734 moves the flying object 180 in the lateral direction by a predetermined movement distance while maintaining the position of the flying object 180 in the vertical direction and then makes the flying object 180 hover by adjusting the rotation speeds of the plurality of motors 224. After the processing in step ST86 is executed, the flight imaging processing shifts to step ST87.

In step ST87, the fourth imaging control unit 736 causes the image sensor 212 to image the front of the flying object 180. After the processing in step ST87 is executed, the flight imaging processing shifts to step ST88.

In step ST88, the second image storage control unit 738 stores the image obtained in Step ST87 in the image memory 196. After the processing in step ST88 is executed, the flight imaging processing shifts to step ST89.

In step ST89, the image storing number determination unit 740 determines whether or not the number of frames of the image stored in the image memory 196 in step ST88 has reached a default number, as the flight imaging processing is repeated. In step ST89, in a case where the number of frames of the image stored in the image memory 196 has not reached the default number, the determination is set as negative, and the flight imaging processing shifts to step ST86. In step ST89, in a case where the number of frames of the image stored in the image memory 196 has reached the default number, the determination is set as positive, and the flight imaging processing shifts to step ST90.

In step ST90, the return control unit 742 moves the flying object 180 in the lateral direction toward the position in front of the marker 94 by adjusting the rotation speeds of the plurality of motors 224. After the processing in step ST90 is executed, the flight imaging processing shifts to step ST91.

In step ST91, the fifth imaging control unit 744 causes the image sensor 212 to image the front of the flying object 180. After the processing in step ST91 is executed, the flight imaging processing shifts to step ST92.

In step ST92, the return completion determination unit 746 determines whether or not the marker 94 is reflected as a figure in the image obtained in step ST91. In step ST92, in a case where the marker 94 is not reflected as a figure in the image, the determination is set as negative, and the flight imaging processing shifts to step ST91. In step ST92, in a case where the marker 94 is reflected as a figure in the image, the determination is set as positive, and the flight imaging processing shifts to step ST93.

In step ST93, the third hovering control unit 748 makes the flying object 180 hover by adjusting the rotation speeds of the plurality of motors 224. After the processing in step ST93 is executed, the flight imaging processing shifts to step ST94.

In step ST94, the processor 200 determines whether or not a condition for ending the flight imaging processing (hereinafter, referred to as a "flight imaging processing end condition") is satisfied. Examples of the flight imaging processing end condition include a condition that an instruction to end the flight imaging processing is received by the reception device 14. In step ST94, in a case where the flight imaging processing end condition is not satisfied, the determination is set as negative, and the flight imaging processing shifts to step ST70 shown in FIG. 40. In step ST94, in a case where the flight imaging processing end condition is satisfied, the determination is set as positive, and the flight imaging processing is ended.

As described above, in the imaging system S according to the present embodiment, the processor 200 of the flying object 180 acquires the position of the marker 94 in the vertical direction, which is detected based on the image obtained by being captured with the imaging device 210, for the marker 94 of which the position in the vertical direction is variable by the ascending/descending apparatus 50 and performs control of maintaining or changing the position of the flying object 180 in the vertical direction, with respect to the flying object 180, based on the position of marker 94 in the vertical direction. Accordingly, for example, the flying object 180 can be positioned in the vertical direction without using a satellite positioning system. Further, for example, even in a case where communication cannot be performed between the imaging support apparatus 10 and the flying object 180, the flying object 180 can be moved in the vertical direction by changing the position of the marker 94 in the vertical direction.

Further, the flying object 180 includes the imaging device 210 in order to acquire the position of the marker 94 in the vertical direction. Accordingly, for example, the size and cost of the flying object 180 can be reduced as compared with a case where the LiDAR scanner is included in order to acquire the position of the marker 94 in the vertical direction.

Further, the position of the marker 94 in the vertical direction is detected based on the image obtained by being captured with the marker 94 by the imaging device 210. Accordingly, for example, the size and cost of the flying object 180 can be reduced as compared with a case where the flying object 180 includes a detection device that detects the position of the marker 94 in the vertical direction separately from the imaging device 210.

Further, the processor 200 of the flying object 180 performs control of causing the imaging device 210 to capture an imaging scene that includes the marker 94 in a part thereof. Accordingly, the position of the marker 94 in the vertical direction can be detected based on the image obtained by being captured with the imaging device 210.

Further, the imaging scene includes the inspection target 3 positioned in the vicinity of the marker 94. Accordingly, an image in which the inspection target 3 is reflected can be obtained as a figure.

Further, the processor 200 of the flying object 180 performs control of setting the position of the flying object 180 in the vertical direction at a height at which the marker 94 is disposed at the center part of the image in the longitudinal direction on the image, with respect to the flying object 180. Accordingly, for example, as compared with a case where the position of the flying object 180 in the vertical direction is set at a height at which the marker 94 is disposed at an end part of the image in the longitudinal direction on the image, even in a case where the marker 94 is moved to the upper side or the lower side after the position of the flying object 180 is set in the vertical direction, the figure corresponding to the marker 94 can be suppressed from being out of the image immediately.

Further, the processor 200 of the flying object 180 performs control of setting the position of the flying object 180 in the vertical direction to the same position as the position of the marker 94 in the vertical direction, with respect to the flying object 180. Accordingly, for example, as compared with a case where the position of the flying object 180 in the vertical direction is set to a position different from the position of the marker 94 in the vertical direction, control of changing the position of the flying object 180 in the vertical direction can be easily performed according to the movement of the marker 94 to the upper side or the lower side. Further, since the flying object 180 is within an imaging range 160A of the imaging device 160 of the imaging distance measurement apparatus 130 by setting the position of the flying object 180 in the vertical direction to the same position as the position of the marker 94 in the vertical direction, the effort of controlling the imaging range 160A of the imaging device 160 can be omitted.

Further, the marker 94 includes the light emitting body 120. Accordingly, an instruction can be sent to the flying object 180 with the light emission mode of the light emitting body 120.

Further, the processor 200 of the flying object 180 performs control in accordance with the first light emission mode of the light emitting body 120 with respect to the flying object 180. Accordingly, by setting the light emission mode of the light emitting body 120 to the first light emission mode, it is possible to perform control in accordance with the first light emission mode of the light emitting body 120 with respect to the flying object 180.

Further, the control in accordance with the first light emission mode of the light emitting body 120 includes control of maintaining or changing the position of the flying object 180 in the vertical direction. Accordingly, by setting the light emission mode of the light emitting body 120 to the first light emission mode, the position of the flying object 180 in the vertical direction can be maintained or changed.

Further, the control in accordance with the first light emission mode of the light emitting body 120 includes control of maintaining or changing the movement speed of the flying object 180. Accordingly, by setting a light emission mode of the light emitting body 120 to the first light emission mode, the movement speed of the flying object 180 can be maintained or changed.

Further, the control in accordance with the first light emission mode of the light emitting body 120 includes control of moving the flying object 180 in the horizontal direction (that is, the front-rear direction and the lateral direction). Accordingly, by setting a light emission mode of the light emitting body 120 to the first light emission mode, the flying object 180 can be moved in the horizontal direction.

Further, the control in accordance with the first light emission mode of the light emitting body 120 includes control of adjusting the distance between the marker 94 and the flying object 180 by moving the flying object 180 in the front-rear direction. Accordingly, by setting the light emission mode of the light emitting body 120 to the first light emission mode and moving the flying object 180 in the front-rear direction, the distance between the marker 94 and the flying object 180 can be adjusted.

Further, the first light emission mode of the light emitting body 120 is a mode including blinking of the light emitting body 120. Accordingly, the light emission mode of the light emitting body 120 can be set to the first light emission mode by turning on and off the light emitting body 120.

Further, the processor 200 of the flying object 180 performs control of causing the flying object 180 to hover in accordance with the second light emission mode of the light emitting body 120. Accordingly, by setting the light emission mode of the light emitting body 120 to the second light emission mode, the flying object 180 can be made to hover.

Further, the second light emission mode of the light emitting body 120 is a mode including lighting-out of the light emitting body 120. Accordingly, the light emission mode of the light emitting body 120 can be set to the second light emission mode by turning off the light emitting body 120. Further, by any chance, in a case where the light emitting body 120 is turned off due to a failure or the like by the fact that the second light emission mode of the light emitting body 120 is a mode including lighting-out of the light emitting body 120, the flying object 180 can be made to hover.

Further, the processor 200 of the flying object 180 performs imaging control of causing the imaging device 210, which is mounted on the flying object 180, to perform the imaging for a still image according to the third light emission mode of the light emitting body 120. Accordingly, by setting the light emission mode of the light emitting body 120 to the third light emission mode, it is possible to cause the imaging device 210 to perform the imaging for a still image.

Further, the processor 200 of the flying object 180 causes the imaging device 210 to perform the imaging for a still image in a case where the flying object 180 is hovering. Accordingly, it is possible to suppress the occurrence of image shake in a still image obtained by being captured with the imaging device 210 as compared with a case where the imaging for a still image is performed in a case where the flying object 180 is moving.

Further, the light emitting body 120 includes a plurality of light sources 122A and 122B. Accordingly, for example, a variation of the light emission mode of the light emitting body 120 can be increased as compared with a case where the light emitting body 120 includes only one light source.

Further, the third light emission mode of the light emitting body 120 is a mode including alternate blinking of the plurality of light sources 122A and 122B. Accordingly, the light emission mode of the light emitting body 120 can be set to the third light emission mode by alternately turning on and off the plurality of light sources 122A and 122B.

Further, the processor 200 of the flying object 180 repeatedly performs control of moving the flying object 180 in the lateral direction in a state in which the position of the flying object 180 in the vertical direction is maintained and control of causing the imaging device 210 to image the inspection target 3, according to the fourth light emission mode of the light emitting body 120. Accordingly, an image for each of a plurality of regions of the inspection target 3 in the horizontal direction can be obtained.

Further, the ascending/descending apparatus 50 includes the cable 86 provided with the marker 94 and the reel 82 that performs winding and unwinding with respect to the cable 86. Accordingly, the position of the marker 94 in the vertical direction can be changed by rotating the reel 82.

Further, the ascending/descending apparatus 50 includes the sensor 58 that detects an unwinding amount of the cable 86 with respect to the reel 82. Accordingly, it is possible to understand the position of the marker 94 in the vertical direction based on the detection of the unwinding amount of the cable 86 by using the sensor 58.

Further, the flying object 180 is connected to the cable 86 of the ascending/descending apparatus 50 via a rope 186. Accordingly, the movement range of the flying object 180 can be limited within a range of the length of the rope 186.

The cable 86 and the rope 186 include the power transmission cable 44 that transmits power to the flying object 180. Accordingly, the power can be transmitted to the flying object 180 through the power transmission cable 44.

Further, the cable 86 is provided with the imaging distance measurement apparatus 130, and the imaging device 160 of the imaging distance measurement apparatus 130 images the flying object 180. Accordingly, by being imaged by the imaging device 160, an image in which the flying object 180 is reflected as a figure can be obtained.

Further, the operator 7 provides the movement instruction (that is, the first ascending instruction, the first descending instruction, the second ascending instruction, the second descending instruction, the right movement instruction, the left movement instruction, the forward instruction, and/or the backward instruction) to the imaging support apparatus 10 based on the image obtained by being captured by the imaging device 160. The processor 30 of the imaging support apparatus 10 performs control with respect to the flying object 180 by setting the light emission mode of the light emitting body 120 in accordance with the movement instruction provided by the operator 7. Accordingly, the posture and/or the position of the flying object 180 can be adjusted based on the image obtained by being captured with the imaging device 160.

Further, the processor 30 of the imaging support apparatus 10 performs control with respect to the flying object 180 by setting the light emission mode of the light emitting body 120 such that the flying object 180 moves to the center part of the angle of view of the imaging device 160. Accordingly, the position of the flying object 180, which is reflected in the image as a figure, can be set to the center part of the angle of view of the imaging device 160.

Further, the imaging device 160 is disposed at a position adjacent to the marker 94. Accordingly, for example, the image can include a figure that is similar to the figure of the flying object 180 as seen from the position of marker 94 as compared with a case where the imaging device 160 is disposed at a position away from the marker 94.

Further, the imaging distance measurement apparatus 130, which is provided in the cable 86, includes the distance measurement device 170, and the distance measurement device 170 measures the distance between the distance measurement device 170 and the flying object 180. Accordingly, the distance measurement information can be obtained by measuring the distance between the distance measurement device 170 and the flying object 180 by the distance measurement device 170.

Further, the operator 7 provides the forward instruction or the backward instruction to the imaging support apparatus 10 based on the distance measurement information obtained by measuring the distance with the distance measurement device 170. The processor 30 of the imaging support apparatus 10 performs control with respect to the flying object 180 by setting the light emission mode of the light emitting body 120 in accordance with the forward instruction or the backward instruction provided by the operator 7. Accordingly, the distance between the distance measurement device 170 and the flying object 180 can be adjusted based on the distance measurement information.

Further, the operator 7 may provide the forward instruction or the backward instruction to the imaging support apparatus 10 such that the distance between the distance measurement device 170 and the flying object 180 is set to a default distance based on the distance measurement information obtained by measuring the distance with the distance measurement device 170. In this case, the distance between the distance measurement device 170 and the flying object 180 can be adjusted to a default distance.

Further, the distance measurement device 170 is disposed at a position adjacent to the marker 94. Accordingly, for example, the distance between distance measurement device 170 and flying object 180, which is measured by the distance measurement device 170, can be made to close to the distance between marker 94 and flying object 180 as compared with a case where the distance measurement device 170 is disposed at a position away from the marker 94.

Figure 43:
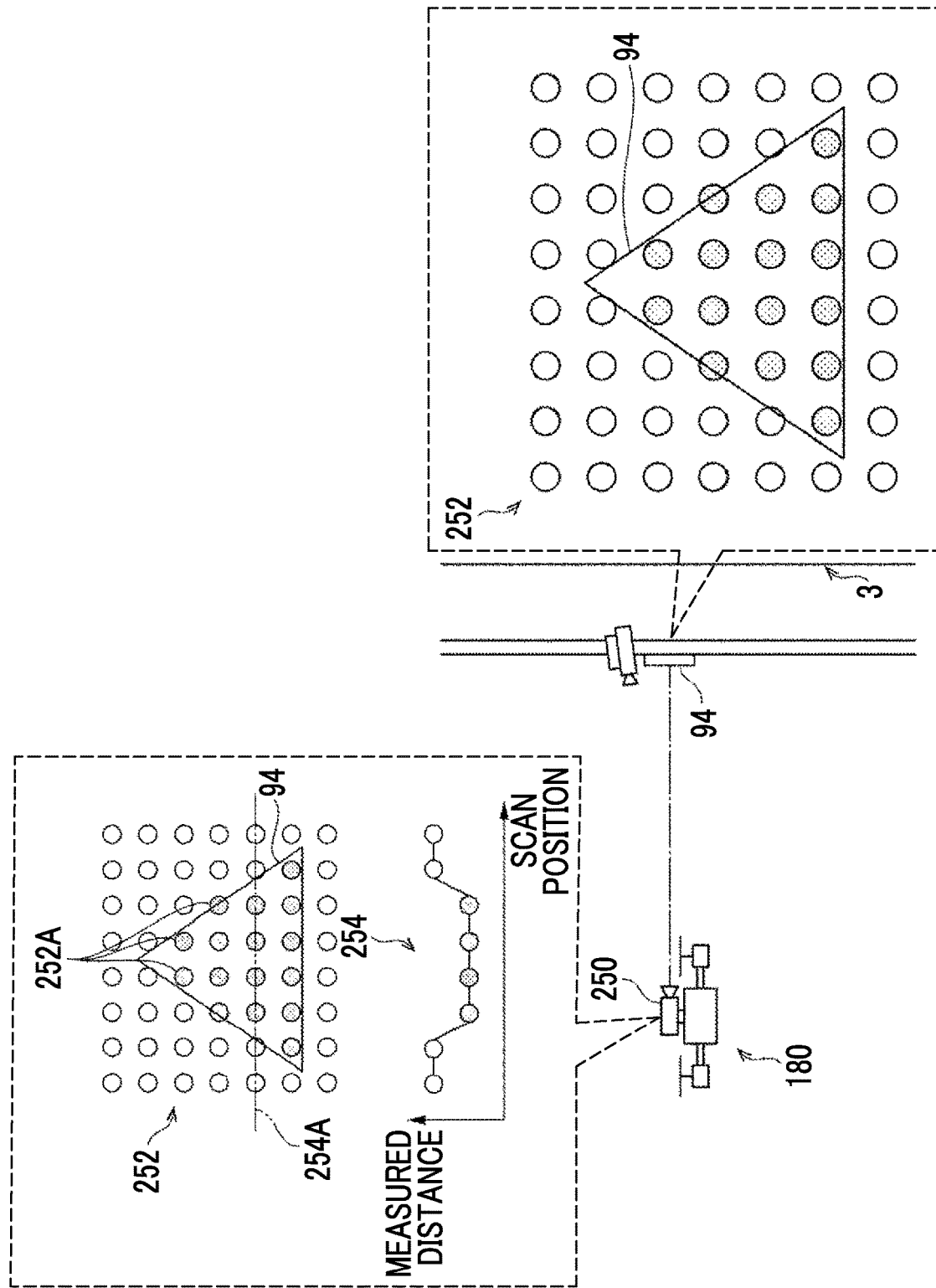
FIG. 43 is a side view showing an example in which a LiDAR scanner is mounted on the flying object as a first modification example of the present embodiment.

As an example shown in FIG. 43, a flying object 180 may include a LiDAR scanner 250. In the example shown in FIG. 43, scan data is obtained by scanning a target region that includes the marker 94 in a part thereof with the LiDAR scanner 250. The processor 200 (see FIG. 6) of the flying object 180 detects the position of the marker 94 in the vertical direction based on the scan data. Hereinafter, a method of detecting the position of the marker 94 in the vertical direction based on the scan data will be described as an example.

In the example shown in FIG. 43, a point group 252 represents a plurality of points scanned by the LiDAR scanner 250. At points on the marker 94, a distance between the marker 94 and the LiDAR scanner 250 is measured by the LiDAR scanner 250, and at points away from the marker 94, a distance between the background in the vicinity of the marker 94 and the LiDAR scanner 250 is measured by the LiDAR scanner 250. By performing scanning with the LiDAR scanner 250, distance information 254 representing a relationship between a scan position and a measured distance is obtained for the point group 252. As an example, FIG. 43 shows the distance information 254 obtained at the scan position 254A.

For example, by executing edge extraction processing (that is, processing of extracting a point corresponding to a distance equal to or less than the default value), for example, on the distance information 254, a first point group 252A (that is, the point group positioned on the marker) corresponding to a shape of the marker 94 is extracted from the point group 252. Further, based on the first point group 252A, a distance measured for each point constituting the first point group 252A, a predetermined shape of the marker 94, and a predetermined size of the marker 94, it is determined whether or not the shape represented by the first point group 252A corresponds to the marker 94. In a case where it is determined that the shape represented by the first point group 252A corresponds to the marker 94, the position of the marker 94 in the vertical direction is derived based on an irradiation angle of a laser corresponding to each point constituting the first point group 252A. As described above, in a case where the flying object 180 includes the LiDAR scanner 250, the position of the marker 94 in the vertical direction is detected based on the scan data obtained by scanning the target region that includes the marker 94 in a part thereof with the LiDAR scanner 250.

The flying object 180 may include the LiDAR scanner 250 instead of the imaging device 210 (see FIG. 1) or may include the LiDAR scanner 250 in addition to the imaging device 210. In a case where the flying object 180 includes the imaging device 210 and the LiDAR scanner 250, the imaging by the imaging device 210 and the measurement by the LiDAR scanner 250 can be separately performed.

Figure 44:
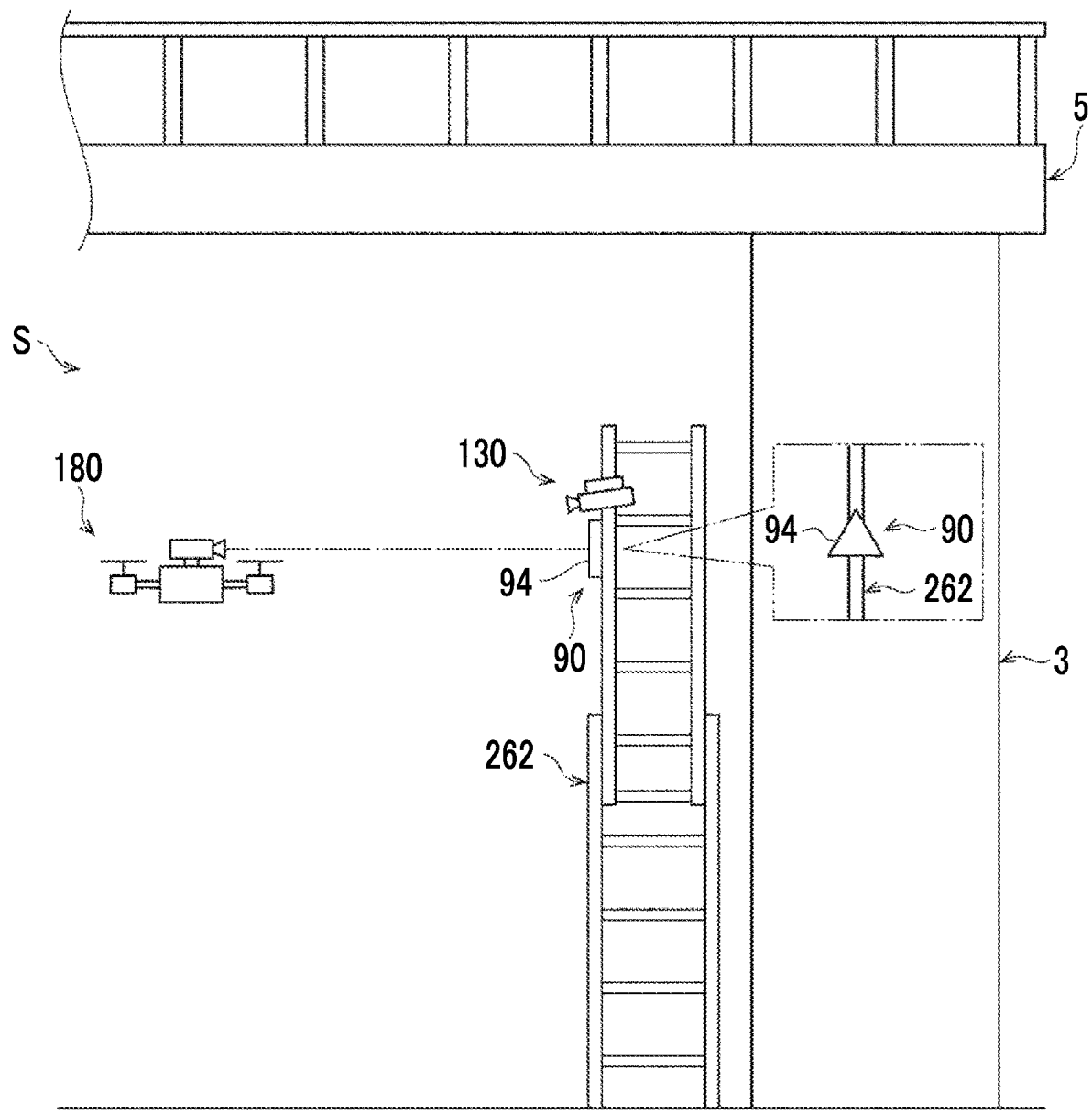
FIG. 44 is a side view showing an example in which the ascending/descending apparatus having a ladder is used as a second modification example of the present embodiment.

Further, as an example shown in FIG. 44, the imaging system S may include an ascending/descending apparatus 260 instead of the ascending/descending apparatus 50 (see FIG. 1). The ascending/descending apparatus 260 includes an expandable ladder 262. As an example, the ladder 262 is placed on the ground. The marker apparatus 90 and an imaging distance measurement apparatus 130 are provided on the upper part of the ladder 262. The ladder 262 may be electrically expanded and contracted or may be manually expanded and contracted. In the example shown in FIG. 44, the marker apparatus 90 and the imaging distance measurement apparatus 130 can be made to ascend or descend as the ladder 262 expands and contracts. In the example shown in FIG. 44, although the ladder 262 is exemplified as one unit that makes the marker apparatus 90 and the imaging distance measurement apparatus 130 ascend or descend, other flexible members or flexible mechanisms such as expandable support may be used. Further, the flexible member or the flexible mechanism may be placed on the ground or may hang down from the bridge girder of the bridge 5.

Further, in the above embodiment, the operator 7 provides the movement instruction (that is, the first ascending instruction, the first descending instruction, the second ascending instruction, the second descending instruction, the right movement instruction, the left movement instruction, the forward instruction, and/or the backward instruction) to the imaging support apparatus 10 based on the image obtained by imaging the flying object 180 with the imaging device 160 by the imaging distance measurement apparatus 130. The processor 30 of the imaging support apparatus 10 performs control with respect to the flying object 180 by setting the light emission mode of the light emitting body 120 in accordance with the movement instruction provided by the operator 7. However, the processor 30 of the imaging support apparatus 10 may determine the posture and/or the position of the flying object 180 based on the image obtained by imaging the flying object 180 with the imaging device 160 and may perform control with respect to the flying object 180 according to the determined result.

Further, in the above embodiment, the operator 7 provides the forward instruction or the backward instruction to the imaging support apparatus 10 based on the distance measurement information obtained by measuring the distance with the distance measurement device 170. The processor 30 of the imaging support apparatus 10 performs control with respect to the flying object 180 by setting the light emission mode of the light emitting body 120 in accordance with the forward instruction or the backward instruction provided by the operator 7. However, the processor 30 of the imaging support apparatus 10 may move the flying object 180 forward or backward by setting the light emission mode of the light emitting body 120 based on the distance measurement information obtained by being measured by the distance measurement device 170. Further, in this case, the processor 30 of the imaging support apparatus 10 may move the flying object 180 forward or backward such that the distance between the distance measurement device 170 and the flying object 180 is set to the default distance.

Further, in the above embodiment, although the ascending/descending apparatus 50 and the marker apparatus 90 are controlled according to the instruction received by the reception device 14, for example, the ascending/descending apparatus 50 and the marker apparatus 90 may be controlled in a predetermined order.

Further, in the above embodiment, although the imaging device 160 is provided on the cable 86 of the ascending/descending apparatus 50, the imaging device 160 may be omitted.

Further, in the above embodiment, although the imaging system S is used for inspection, the imaging system S may be used other than inspection, for example, such as transport, imaging, measurement, spraying of agricultural chemicals, maintenance, or security.

Further, in the above embodiment, although the position of the flying object 180 in the vertical direction is changed in accordance with the change of the position of the marker 94 in the vertical direction, the position of the marker 94 may be changed in a direction other than the vertical direction, and the position of the flying object 180 may be changed accordingly.

Further, in the above embodiment, although an example of the embodiment in which the imaging support processing is executed by the imaging support apparatus 10, the ascending/descending processing is executed by the ascending/descending apparatus 50, the light emission mode control processing is executed by the marker apparatus 90, and the imaging distance measurement processing is executed by the imaging distance measurement apparatus 130 has been described, the present disclosed technology is not limited to this. For example, the imaging support apparatus 10 may collectively execute the imaging support processing, the ascending/descending processing, the light emission mode control processing, and the imaging distance measurement processing, or two or three apparatuses out of the imaging support apparatus 10, the ascending/descending apparatus 50, the marker apparatus 90, and the imaging distance measurement apparatus 130 may distribute and execute the imaging support processing, the ascending/descending processing, the light emission mode control processing, and the imaging distance measurement processing.

Further, in the above embodiment, although an example of the embodiment in which the imaging support processing program 300 is stored in the storage 32 of the imaging support apparatus 10 has been described, the present disclosed technology is not limited to this. For example, the imaging support processing program 300 may be stored in a portable storage medium such as an SSD or a USB memory. The storage medium is a non-temporary storage medium. The imaging support processing program 300 stored in the storage medium is installed in a computer 12 of the imaging support apparatus 10. The processor 30 of the imaging support apparatus 10 executes the imaging support processing according to the imaging support processing program 300.

Further, in the above embodiment, although an example of the embodiment in which the ascending/descending processing program 400 is stored in the storage 72 of the ascending/descending apparatus 50 has been described, the present disclosed technology is not limited to this. For example, the ascending/descending processing program 400 may be stored in a portable storage medium such as an SSD or a USB memory. The storage medium is a non-temporary storage medium. The ascending/descending processing program 400 stored in the storage medium is installed in the computer 52 of the ascending/descending apparatus 50. The processor 70 of the ascending/descending apparatus 50 executes the ascending/descending processing in accordance with the ascending/descending processing program 400.

Further, in the above embodiment, although an example of the embodiment in which the light emission mode control processing program 500 is stored in the storage 112 of the marker apparatus 90 has been described, the present disclosed technology is not limited to this. For example, the light emission mode control processing program 500 may be stored in a portable storage medium, such as an SSD or a USB memory. The storage medium is a non-temporary storage medium. The light emission mode control processing program 500 stored in the storage medium is installed in the computer 92 of the marker apparatus 90. The processor 110 of the marker apparatus 90 executes the light emission mode control processing according to the light emission mode control processing program 500.

Further, in the above embodiment, although an example of the embodiment in which the imaging distance measurement processing program 600 is stored in the storage 152 of the imaging distance measurement apparatus 130 has been described, the present disclosed technology is not limited to this. For example, the imaging distance measurement processing program 600 may be stored in a portable storage medium such as an SSD or a USB memory. The storage medium is a non-temporary storage medium. The imaging distance measurement processing program 600 stored in the storage medium is installed in the computer 132 of the imaging distance measurement apparatus 130. The processor 150 of the imaging distance measurement apparatus 130 executes the imaging distance measurement processing according to the imaging distance measurement processing program 600.

Further, in the above embodiment, although an example of the embodiment in which the flight imaging processing program 700 is stored in the storage 202 of the flying object 180 has been described, the present disclosed technology is not limited to this. For example, the flight imaging processing program 700 may be stored in a portable storage medium such as an SSD or a USB memory. The storage medium is a non-temporary storage medium. The flight imaging processing program 700 stored in the storage medium is installed in the computer 182 of the flying object 180. The processor 200 of the flying object 180 executes the flight imaging processing according to the flight imaging processing program 700.

Further, in the above embodiment, the imaging support processing program 300 may be stored in the storage device such as another computer or a server device connected to the imaging support apparatus 10 via a network, the imaging support processing program 300 may be downloaded in response to a request of the imaging support apparatus 10, and the imaging support processing program 300 may be installed in the computer 12 of the imaging support apparatus 10.

Further, it is not necessary to store all of the imaging support processing programs 300 in the storage device such as another computer or a server device connected to the imaging support apparatus 10, or the storage 32 of the imaging support apparatus 10, and a part of the imaging support processing program 300 may be stored.

Further, in the above embodiment, the ascending/descending processing program 400 may be stored in the storage device such as another computer or a server device connected to the ascending/descending apparatus 50 via a network, the ascending/descending processing program 400 may be downloaded in response to a request of the ascending/descending apparatus 50, and the ascending/descending processing program 400 may be installed in the computer 52 of the ascending/descending apparatus 50.

Further, it is not necessary to store all of the ascending/descending processing program 400 in the storage device such as another computer or a server device connected to the ascending/descending apparatus 50, or the storage 72 of the ascending/descending apparatus 50, and a part of the ascending/descending processing program 400 may be stored.

Further, in the above embodiment, the light emission mode control processing program 500 may be stored in the storage device such as another computer or a server device connected to the marker apparatus 90 via a network, the light emission mode control processing program 500 may be downloaded in response to a request of the marker apparatus 90, and the light emission mode control processing program 500 may be installed in the computer 92 of the marker apparatus 90.

Further, it is not necessary to store all of the light emission mode control processing program 500 in the storage device such as another computer or a server device connected to the marker apparatus 90, or the storage 112 of the marker apparatus 90, and a part of the light emission mode control processing program 500 may be stored.

Further, in the above embodiment, the imaging distance measurement processing program 600 may be stored in the storage device such as another computer or a server device connected to the imaging distance measurement apparatus 130 via a network, the imaging distance measurement processing program 600 may be downloaded in response to a request of the imaging distance measurement apparatus 130, and the imaging distance measurement processing program 600 may be installed in the computer 132 of the imaging distance measurement apparatus 130.

Further, it is not necessary to store all of the imaging distance measurement processing program 600 in the storage device such as another computer or a server device connected to the imaging distance measurement apparatus 130, or the storage 152 of the imaging distance measurement apparatus 130, and a part of the imaging distance measurement processing program 600 may be stored.

Further, in the above embodiment, the flight imaging processing program 700 may be stored in the storage device such as another computer or a server device connected to the flying object 180 via a network, the flight imaging processing program 700 may be downloaded in response to a request of the flying object 180, and the flight imaging processing program 700 may be installed in the computer 182 of the flying object 180.

Further, it is not necessary to store all of the flight imaging processing program 700 in the storage device such as another computer or a server device connected to the flying object 180, or the storage 202 of the flying object 180, and a part of the flight imaging processing program 700 may be stored.

Further, in the above embodiment, although the computer 12 is built into the imaging support apparatus 10, the present disclosed technology is not limited to this, and for example, the computer 12 may be provided outside the imaging support apparatus 10.

Further, in the above embodiment, although the computer 52 is built into the ascending/descending apparatus 50, the present disclosed technology is not limited to this, and for example, the computer 52 may be provided outside the ascending/descending apparatus 50.

Further, in the above embodiment, although the computer 92 is built into the marker apparatus 90, the present disclosed technology is not limited to this, and for example, the computer 92 may be provided outside the marker apparatus 90.

Further, in the above embodiment, although the computer 132 is built into the imaging distance measurement apparatus 130, the present disclosed technology is not limited to this, and for example, the computer 132 may be provided outside the imaging distance measurement apparatus 130.

Further, in the above embodiment, although the computer 182 is built into the flying object 180, the present disclosed technology is not limited to this, and for example, the computer 182 may be provided outside the flying object 180.

Further, in the above embodiment, although the computer 12 is used in the imaging support apparatus 10, the present disclosed technology is not limited to this, and a device including an ASIC, FPGA, and/or PLD may be applied instead of the computer 12. Further, instead of the computer 12, a combination of a hardware configuration and a software configuration may be used.

Further, in the above embodiment, although the computer 52 is used in the ascending/descending apparatus 50, the present disclosed technology is not limited to this, and a device including an ASIC, FPGA, and/or PLD may be applied instead of the computer 52. Further, instead of the computer 52, a combination of a hardware configuration and a software configuration may be used.

Further, in the above embodiment, although the computer 92 is used in the marker apparatus 90, the present disclosed technology is not limited to this, and a device including an ASIC, FPGA, and/or PLD may be applied instead of the computer 92. Further, instead of the computer 92, a combination of a hardware configuration and a software configuration may be used.

Further, in the above embodiment, although the computer 132 is used in the imaging distance measurement apparatus 130, the present disclosed technology is not limited to this, and a device including an ASIC, FPGA, and/or PLD may be applied instead of the computer 132. Further, instead of the computer 132, a combination of a hardware configuration and a software configuration may be used.

Further, in the above embodiment, although the computer 182 is used in the flying object 180, the present disclosed technology is not limited to this, and a device including an ASIC, FPGA, and/or PLD may be applied instead of the computer 182. Further, instead of the computer 182, a combination of a hardware configuration and a software configuration may be used.

The following various processors can be used as hardware resources for executing various pieces of processing described in the above embodiment. Examples of the processor include a CPU which is a general-purpose processor functioning as the hardware resource for executing the various pieces of processing by executing software, that is, a program, and the like. Further, examples of the processor include a dedicated electric circuit, which is a processor having a circuit configuration specially designed for executing specific processing such as FPGA, PLD, ASIC, or the like. Any processor has a memory built into or connected to it, and any processor uses the memory to execute processing.

Further, the hardware resource for executing various pieces of processing may be composed of one of the various processors or may be composed of a combination of two or more processors that are the same type or different types (for example, a combination of a plurality of FPGAs or a combination of a CPU and an FPGA). Further, the hardware resource for executing processing may be one processor.

As a configuring example of one processor, first, there is a form in which one processor is composed of a combination of one or more CPUs and software and the processor functions as the hardware resource for executing the various pieces of processing. A second example of the configuration is an aspect in which a processor that implements the functions of the entire system including a plurality of hardware resources for executing various pieces of processing using one IC chip is used. A representative example of this aspect is an SoC. As described above, various pieces of processing are achieved using one or more of the various processors as the hardware resource.

Further, as the hardware-like structure of these various types of processors, more specifically, an electric circuit in which circuit elements such as semiconductor elements are combined can be used. Further, the various pieces of processing are only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. A flying object system comprising:
    a control device;
    a displacement mechanism;
    a marker; and
    a flying object,
    wherein the displacement mechanism includes
        a cable that is provided with the marker, and
        a reel for performing winding and unwinding with respect to the cable,
    wherein the control device includes
        a processor; and
        a memory connected to or built into the processor,
    wherein the processor is configured to:
        acquire, for the marker of which a position in a vertical direction is variable with the displacement mechanism, the position of the marker in the vertical direction detected by an optical sensor mounted on the flying object; and
        perform control of maintaining or changing a position of the flying object in the vertical direction, with respect to the flying object, based on the position of the marker in the vertical direction.

2. The flying object system according to claim 1, wherein the optical sensor includes a first imaging device.

3. The flying object system according to claim 2, wherein the processor is configured to perform control of causing the first imaging device to capture an imaging scene that includes the marker in a part thereof.

4. The flying object system according to claim 3, wherein the imaging scene includes a first inspection target positioned in a vicinity of the marker.

5. The flying object system according to claim 3, wherein the position of the marker in the vertical direction is a position detected based on an image obtained by capturing the imaging scene with the first imaging device.

6. The flying object system according to claim 5, wherein the processor is configured to perform control of setting the position of the flying object in the vertical direction at a height at which the marker is disposed at a center part of the image in a longitudinal direction on the image, with respect to the flying object.

7. The flying object system according to claim 1, wherein the processor is configured to perform control of setting the position of the flying object in the vertical direction to the same position as the position of the marker in the vertical direction, with respect to the flying object.

8. The flying object system according to claim 1, wherein the optical sensor includes a LiDAR scanner, and the position of the marker in the vertical direction is a position detected based on scan data obtained by scanning a target region that includes the marker in a part thereof with the LiDAR scanner.

9. The flying object system according to claim 1, wherein the marker includes a light emitting body.

10. The flying object system according to claim 9, wherein the processor is configured to perform first control in accordance with a first light emission mode of the light emitting body, with respect to the flying object.

11. The flying object system according to claim 10, wherein the first control includes the control of maintaining or changing the position of the flying object in the vertical direction.

12. The flying object system according to claim 10, wherein the first control includes control of maintaining or changing a movement speed of the flying object.

13. The flying object system according to claim 10, wherein the first control includes movement control of moving the flying object in a horizontal direction.

14. The flying object system according to claim 13, wherein the movement control includes control of adjusting a first distance between the marker and the flying object by moving the flying object in the horizontal direction.

15. The flying object system according to claim 10, wherein the first light emission mode is a mode including blinking.

16. The flying object system according claim 9, wherein the processor is configured to perform control of causing the flying object to hover according to a second light emission mode of the light emitting body.

17. The flying object system according to claim 16, wherein the second light emission mode is a mode including lighting-out.

18. The flying object system according claim 9, wherein the processor is configured to perform imaging control of causing a second imaging device, which is mounted on the flying object, to perform imaging for a still image according to a third light emission mode of the light emitting body.

19. The flying object system according to claim 18, wherein the processor is configured to perform the imaging control in a case where the flying object hovers.

20. The flying object system according to claim 18, wherein the light emitting body includes a plurality of light sources, and the third light emission mode is a mode that includes alternate blinking of the plurality of light sources.

21. The flying object system according to claim 9, wherein the processor is configured to repeatedly perform control of moving the flying object in a horizontal direction in a state in which the position of the flying object in the vertical direction is maintained and control of causing a third imaging device, which is mounted on the flying object, to image a second inspection target, according to a fourth light emission mode of the light emitting body.

22. The flying object system according to claim 1, wherein the displacement mechanism includes a sensor that detects an unwinding amount of the cable with respect to the reel.

23. The flying object system according to claim 1, wherein a rope that connects the displacement mechanism and the flying object is provided.

24. The flying object system according to claim 23, wherein the displacement mechanism and the rope include a power transmission cable that transmits power to the flying object.

25. The flying object system according to claim 1, wherein a fourth imaging device that is provided in the displacement mechanism and that images the flying object, is provided.

26. The flying object system according to claim 25, wherein the processor is configured to perform control with respect to the flying object based on an image obtained by imaging the flying object with the fourth imaging device.

27. The flying object system according to claim 26, wherein the processor is configured to perform control of moving the flying object to a center part of an angle of view of the fourth imaging device, with respect to the flying object.

28. The flying object system according claim 25, wherein the fourth imaging device is disposed at a position adjacent to the marker.

29. The flying object system according to claim 1, wherein a distance measurement device that is provided in the displacement mechanism is included, and the distance measurement device measures a second distance between the distance measurement device and the flying object.

30. The flying object system according to claim 29, wherein the processor is configured to perform second control with respect to the flying object based on distance measurement information obtained by measuring the second distance with the distance measurement device.

31. The flying object system according to claim 30, wherein the second control is control of setting the second distance to a default distance.

32. The flying object system according to 29, wherein the distance measurement device is disposed at a position adjacent to the marker.

33. A flying object system comprising:
a control device;
a displacement mechanism;
a marker; and
a flying object,
wherein the displacement mechanism includes
a cable that is provided with the marker, and
an ascending/descending mechanism that makes the marker ascend or descend,
wherein the control device includes
a processor; and
a memory connected to or built into the processor,
wherein the processor is configured to:
acquire, for the marker of which a position in a vertical direction is variable with the displacement mechanism, the position of the marker in the vertical direction detected by an optical sensor mounted on the flying object; and
perform control of maintaining or changing a position of the flying object in the vertical direction, with respect to the flying object, based on the position of the marker in the vertical direction.

34. A control method comprising:
acquiring, for a marker of which a position in a vertical direction is variable with a displacement mechanism, the position of the marker in the vertical direction detected by an optical sensor mounted on a flying object; and
performing control of maintaining or changing a position of the flying object in the vertical direction, with respect to the flying object, based on the position of the marker in the vertical direction,
wherein the displacement mechanism includes
a cable that is provided with the marker, and
a reel for performing winding and unwinding with respect to the cable.

35. A control method comprising:
acquiring, for a marker of which a position in a vertical direction is variable with a displacement mechanism, the position of the marker in the vertical direction detected by an optical sensor mounted on a flying object; and
performing control of maintaining or changing a position of the flying object in the vertical direction, with respect to the flying object, based on the position of the marker in the vertical direction,
wherein the displacement mechanism includes
a cable that is provided with the marker, and
an ascending/descending mechanism that makes the marker ascend or descend.

36. A non-transitory computer-readable storage medium storing a program causing a computer to execute a process comprising:
acquiring, for a marker of which a position in a vertical direction is variable with a displacement mechanism, the position of the marker in the vertical direction detected by an optical sensor mounted on a flying object; and performing control of maintaining or changing a position of the flying object in the vertical direction, with respect to the flying object, based on the position of the marker in the vertical direction, wherein the displacement mechanism includes
a cable that is provided with the marker, and
a reel for performing winding and unwinding with respect to the cable.

37. A non-transitory computer-readable storage medium storing a program causing a computer to execute a process comprising:

acquiring, for a marker of which a position in a vertical direction is variable with a displacement mechanism, the position of the marker in the vertical direction detected by an optical sensor mounted on a flying object; and performing control of maintaining or changing a position of the flying object in the vertical direction, with respect to the flying object, based on the position of the marker in the vertical direction, wherein the displacement mechanism includes
a cable that is provided with the marker, and
an ascending/descending mechanism that makes the marker ascend or descend.

* * * * *